US008340360B2

(12) United States Patent
Chen et al.

(10) Patent No.: US 8,340,360 B2
(45) Date of Patent: Dec. 25, 2012

(54) SYSTEM AND METHOD FOR FUSING VECTOR DATA WITH IMAGERY

(75) Inventors: Ching-Chien Chen, Temple City, CA (US); Dipsy Kapoor, Redondo Beach, CA (US); Craig A. Knoblock, El Segundo, CA (US); Cyrus Shahabi, Irvine, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 13/158,301

(22) Filed: Jun. 10, 2011

(65) Prior Publication Data

US 2011/0280453 A1 Nov. 17, 2011

Related U.S. Application Data

(63) Continuation of application No. 12/501,242, filed on Jul. 10, 2009, which is a continuation-in-part of application No. 11/169,076, filed on Jun. 28, 2005, now Pat. No. 7,660,441.

(60) Provisional application No. 60/586,623, filed on Jul. 9, 2004.

(51) Int. Cl.
   *G06K 9/46* (2006.01)
(52) U.S. Cl. ........ 382/113; 382/190; 382/103; 382/294; 382/201; 707/727; 707/741; 707/736
(58) Field of Classification Search .................. 382/103, 382/113, 190, 294, 201; 707/727, 741, 736
   See application file for complete search history.

(56) References Cited

U.S. PATENT DOCUMENTS

| 4,891,761 | A | 1/1990 | Gray et al. |
| 5,546,107 | A | 8/1996 | Deretsky et al. |
| 6,597,818 | B2 * | 7/2003 | Kumar et al. ................. 382/294 |
| 7,660,441 | B2 | 2/2010 | Chen et al. |
| 2001/0036302 | A1 | 1/2001 | Miller |
| 2001/0038718 | A1 | 11/2001 | Kumar et al. |
| 2003/0068071 | A1 | 10/2003 | Wilson |
| 2005/0100220 | A1 * | 5/2005 | Keaton et al. ................. 382/191 |
| 2006/0101005 | A1 | 5/2006 | Yang et al. |

(Continued)

OTHER PUBLICATIONS

Chen et al: "Automatically annotating and integrating spatial datasets", Springer-Verlag Berlin Heidelberg, pp. 469-488, Jul. 2003.*

(Continued)

*Primary Examiner* — Matthew Bella
*Assistant Examiner* — Ruiping Li
(74) *Attorney, Agent, or Firm* — Carr & Ferrell LLP

(57) ABSTRACT

Automatic conflation systems and techniques which provide vector-imagery conflation and map-imagery conflation. Vector-imagery conflation is an efficient approach that exploits knowledge from multiple data sources to identify a set of accurate control points. Vector-imagery conflation provides automatic and accurate alignment of various vector datasets and imagery, and is appropriate for GIS applications, for example, requiring alignment of vector data and imagery over large geographical regions. Map-imagery conflation utilizes common vector datasets as "glue" to automatically integrate street maps with imagery. This approach provides automatic, accurate, and intelligent images that combine the visual appeal and accuracy of imagery with the detailed attribution information often contained in such diverse maps. Both conflation approaches are applicable for GIS applications requiring, for example, alignment of vector data, raster maps, and imagery. If desired, the conflated data generated by such systems may be retrieved on-demand.

30 Claims, 74 Drawing Sheets

U.S. PATENT DOCUMENTS

| | | |
|---|---|---|
| 2007/0014488 A1 | 1/2007 | Chen et al. |
| 2009/0089254 A1* | 4/2009 | Von Kaenel et al. ............... 707/3 |
| 2009/0285487 A1 | 11/2009 | Knoblock et al. |
| 2011/0007941 A1 | 1/2011 | Chen et al. |
| 2011/0119265 A1 | 5/2011 | Shahabi et al. |
| 2011/0142347 A1 | 6/2011 | Chen et al. |

OTHER PUBLICATIONS

Doytsher: "A rubber sheeting algorithm for non-rectangle maps", Computer & Geosciences, 26, 2000.*

Zhou, Y. et al, Hybrid index structures for location-based web search, CIKM, 2005.

Hariharan, R. et al, Processing Spatial-Keyword (SK) Queries in Geographic Information Retrieval (GIR) Systems, SSDBM, 2007.

De Felipe, I. et al, Keyword Search on Spatial Databases, ICDE, 2008.

Cong, G. et al, Efficient Retrieval of the Top-k Most Relevant Spatial Web Objects, VLDB 2009.

Zhang, D. et al, Keyword Search in Spatial Databases: Towards Searching by Document, ICDE, 2009.

Chen, Y. et al, Efficient query processing in geographic web search engines, SIGMOD, 2006.

Jones, C.B. et al, The SPIRIT Spatial Search Engine: Architecture, Ontologies and Spatial Indexing, GIS, 2004.

Gianinetto et al. "Fusion of Aerial and Satellite Imagery Over the City of Venezia." 2nd GRSS/ISPRS Joint Workshop on Remote Sensing and Data Fusion over Urban Areas, May 22-23, 2003, pp. 216-219.

Martins et al. "Indexing and Ranking in Geo-IR Systems", Proceedings of the 2005 workshop on Geographic information retrieval, pp. 31-34.

* cited by examiner

Integration of Road Network Vector Data and Imagery

(Without alignment)

(With alignment)

Integration of Street Maps and Imagery

Imagery: area of interest highlighted

ESRI street map

Imagery with aligned map

Map-Imagery Integration Without Alignment

Georeferenced TIGER street map

Georeferenced imagery

Imagery with superimposed map

Finding Road Intersections on the Road Network Vector Data

100

150 Obtain candidate points by examining line segments of road network vector data

155 If the connectivity of a candidate point meets or exceeds a threshold value, then the candidate point is identified as an intersection point.

Edge-detected Image and Road-Classified Image
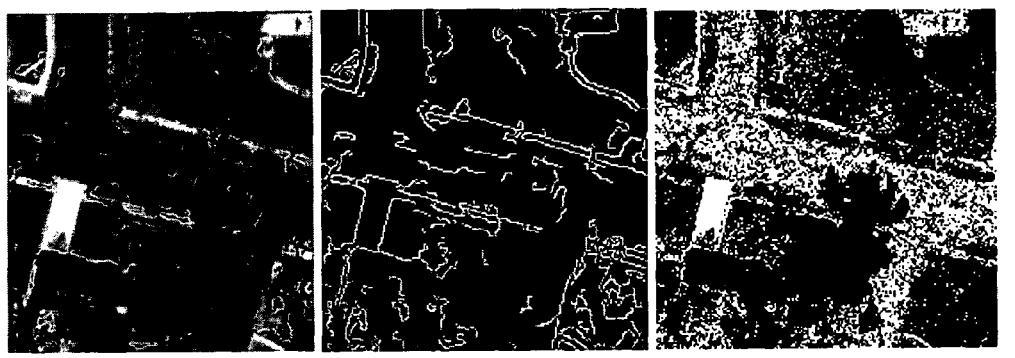
High resolution color orthoimagery
Detected edges by Canny edge detector
Road-classified image (white pixels: image pixels pre-classified as roads)
FIG. 7A  FIG. 7B  FIG. 7C

Learned Density Function on HSV Color Space for On-road/Off-road Pixels

Hue Density Function

Saturation Density Function

Localized Template Matching (LTM)

Original image

Original road network (left)
and template (right)

Road-labeled image

Impact of Area Dimension

Control Point Pairs

Road network intersections (rectangles)
Corresponding intersections on imagery (circles)

Distribution of Control Point Pairs Centered at Pair 1

Distribution of Control Point Pairs

Original road network and detected control point pairs

Delaunay triangulation based on detected control points on road vector data

Corresponding Delaunay triangulation based on detected control points on image

Rubber-Sheeting

Rubber-Sheeting

Region Expansion

Convex hull formed by existing control points
　Dashed lines: partial roads
　Points: control points on vector data
　Triangles: Delaunay triangles New control point pair $Q_v$ and $Q_i$
(focus on a boundary triangle $\triangle ABC$)

Original Road Network Vector Data (white lines) Superimposed With Imagery

Original TIGER/Lines

Original NAVSTREETS

Original MO-DOT

Tested Datasets Used in the Experiments

|  | Test area 1<br>St. Louis, MO | Test area 2<br>St. Louis, MO | Test area 3<br>St. Louis, MO | Test area 4<br>El Segundo, CA |
|---|---|---|---|---|
| Area covered | Latitude:<br>38.5808 to 38.5947<br>Longitude:<br>-90.4049<br>to -90.388<br>Width: 1.5 km<br>Height: 1.5 km | Latitude:<br>38.5703 to 38.5842<br>Longitude:<br>-90.543 to -90.526<br>Width: 1.5 km<br>Height: 1.5km | Latitude:<br>38.5962 to 38.6101<br>Longitude:<br>-90.490 to -90.473<br>Width: 1.5 km<br>Height: 1.5km | Latitude:<br>33.914 to 33.932<br>Longitude:<br>-118.4209 to -118.399<br>Width: 2 km<br>Height: 2 km |
| Total road length of TIGER/Lines (m) | 23534.52 | 21443.96 | 7966.62 | 46580.64 |
| Total road length of NAVSTREETS (m) | 24360.00 | 21921.29 | 9876.02 | N/A** |
| Total road length of MO-DOT (m) | 24759.30 | 21796.92 | 9431.68 | N/A** |
| Total road length of reference roads(m) | 25471.63 | 21999.00 | 9252.01*** | 46660.20 |
| Area features | 0.3 m/pixel color imagery.<br><br>Suburban area (covering some urban area) with high road density (11.3 km/km$^2$) and high house density | 0.3 m/pixel color imagery.<br><br>Suburban area with high road density (9.7 km/km$^2$) and high house density.<br><br>Perceptually, the majority of road color in this area is different from the road color in test area 1. | 0.3 m/pixel color imagery.<br><br>Rural area with medium road density (4 km/km$^2$).<br><br>12% of the roads are highways. | 1 m/pixel gray-scale imagery.<br><br>Urban area with high road density (12.83 km/km$^2$) and high house density. |

** These road vector datasets were inaccessible at the time the experiments were performed.
*** These reference roads are shorter than vector data because some straight reference roads are depicted as curves in vector datasets.

FIG. 20

Buffer Method for Evaluating Completeness and Correctness

Positional Accuracy Evaluation

Precision/Recall of Identified Intersections for TIGER/Lines

|  |  | Test area 1 | Test area 2 | Test area 3 | Test area 4 |
|---|---|---|---|---|---|
| Original road network | Precision | 7.1% | 8.7% | 4.8% | 3.8% |
|  | Recall | 6.7% | 7.7% | 4.5% | 3.7% |
| Without filtering | Precision | 72.3% | 82.1% | 57.9% | 78.9% |
|  | Recall | 68.1% | 24.2% | 52.4% | 52.1% |
| Using VMF filtering | Precision | 87.1% | 83.1% | 69.2% | 94.8% |
|  | Recall | 45.4% | 21.2% | 42.9% | 34.0% |

FIG. 24A

Precision/Recall of Identified Intersections for NAVSTREETS

|  |  | Test area 1 | Test area 2 | Test area 3 |
|---|---|---|---|---|
| Original road network | Precision | 15.6% | 23.3% | 19.1% |
|  | Recall | 15.2% | 23.1% | 18.2% |
| Without filtering | Precision | 87.7% | 82.1% | 64.7% |
|  | Recall | 76.2% | 40.7% | 52.4% |
| Using VMF filtering | Precision | 97.1% | 92.6% | 83.3% |
|  | Recall | 54.1% | 27.5% | 47.6% |

FIG. 24B

Precision/Recall of Identified Intersections for MO-DOT

|  |  | Test area 1 | Test area 2 | Test area 3 |
|---|---|---|---|---|
| Original road network | Precision | 57.1% | 32.2% | 28.6% |
|  | Recall | 55.2% | 31.9% | 27.2% |
| Without filtering | Precision | 83.8% | 82.1% | 83.3% |
|  | Recall | 73.9% | 50.5% | 71.4% |
| Using VMF filtering | Precision | 98.1% | 97.1% | 90% |
|  | Recall | 42.9% | 37.3% | 43% |

FIG. 24C

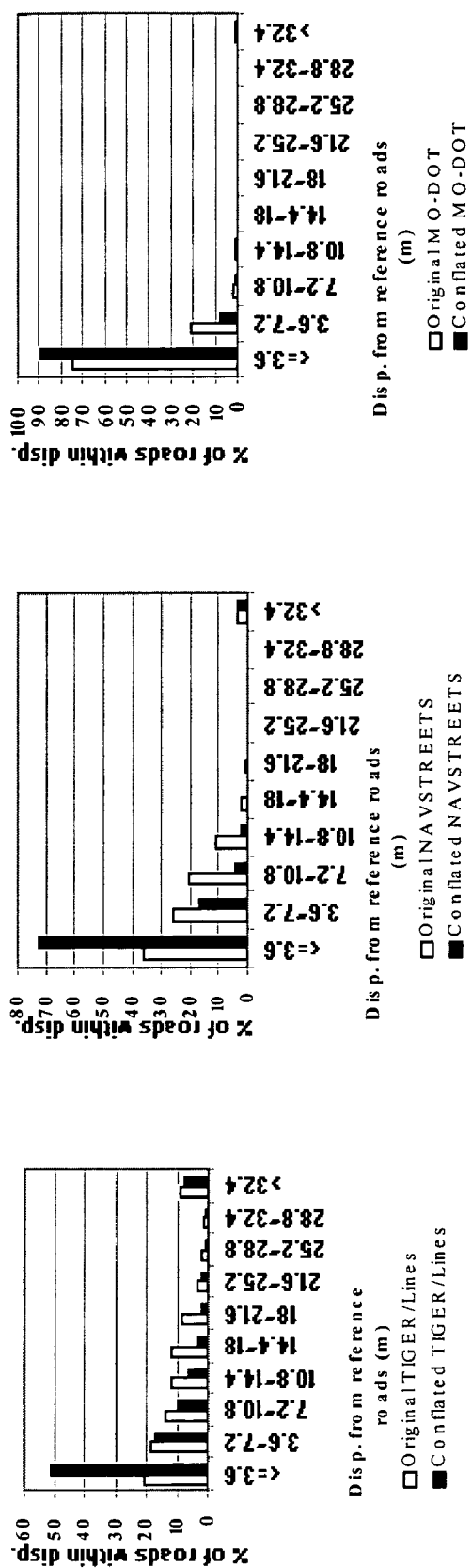

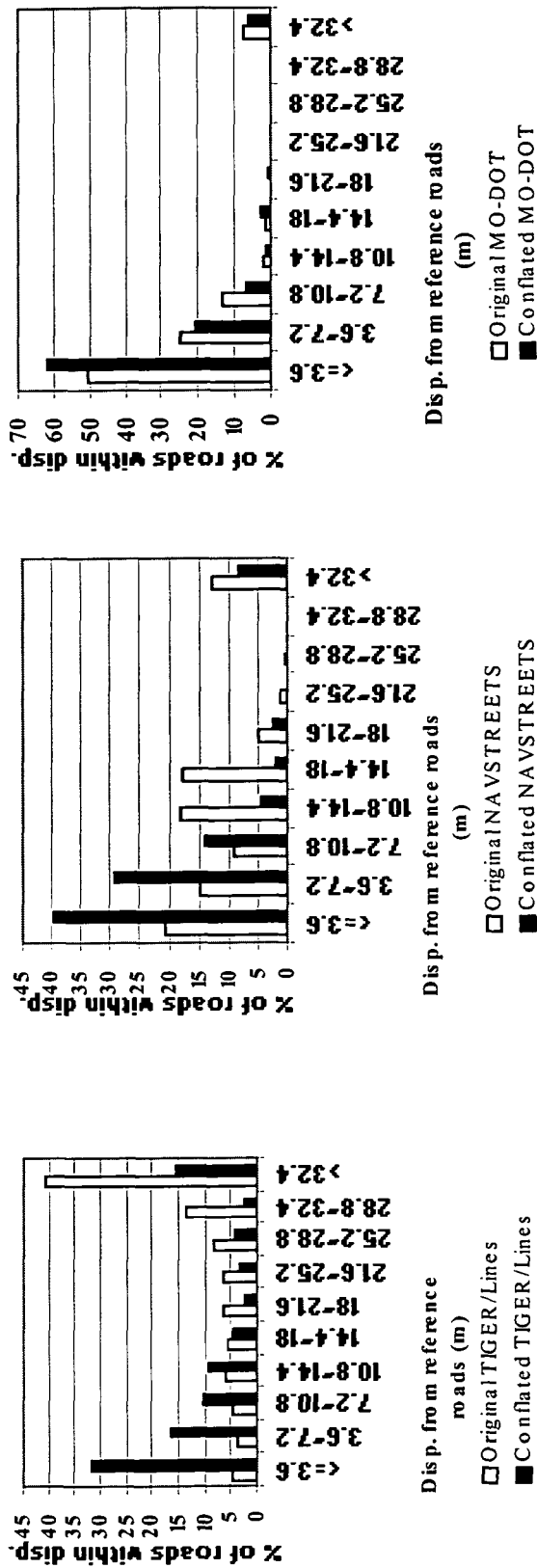

Conflated TIGER/Lines with
Color Imagery

Conflated NAVSTREETS
with Color Imagery

Conflated MO-DOT with
Color Imagery

Conflated TIGER/Lines with
Black-White Imagery

Imagery with Road Network
(before conflation)

Detected Intersection Points on Imagery
(after conflation)

Double Line Map From USGS
Topographic Map

Single Line Map From
TIGER/Line Map

Raster Maps Before and After Segmentation

Grayscale USGS Topographic Map

Binary USGS Topographic Map

Grayscale TIGER/Line map

Binary TIGER/Line map

Number of Pixels in Each Cluster

|  | Cluster 1 | Cluster 2 | Cluster 3 |
|---|---|---|---|
| Cluster Pixels | 316846 | 237876 | 85278 |
| Cluster Pixels/Total Pixels | 0.495072 | 0.371681 | 0.133247 |

Double Line Format Checking and
Parallel Pattern Tracing

RW = 3

RW = 4

RW = 3

Original Binary USGS Topographic Map (full size and detail view)

Binary USGS Topographic Map (full size and detail view)
After Parallel Pattern Tracing TIGER/Line Map Before and After Text/Graphics Separation
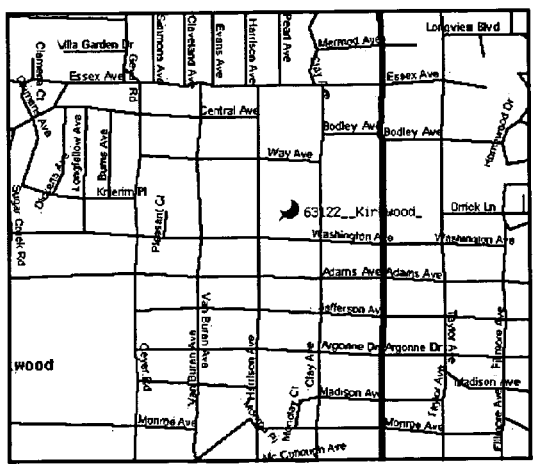 
Binary TIGER/Line map          After text/graphics separation
FIG. 42A          FIG. 42B

Generalized Dilation Operator
(black cells are foreground pixels)
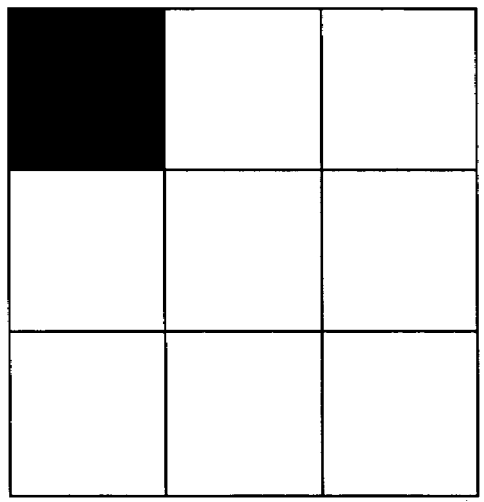  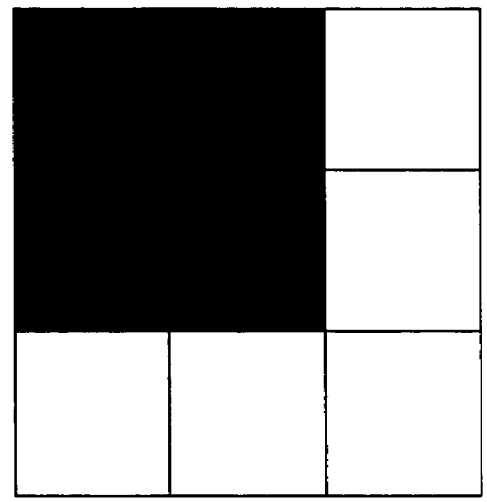
FIG. 43A  FIG. 43B Binary TIGER/Line Map Before and After
Applying Generalized Dilation Operator Before  After

Generalized Erosion Operator
(black cells are foreground pixels)
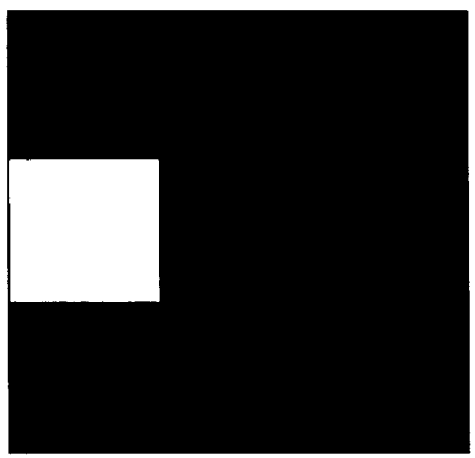  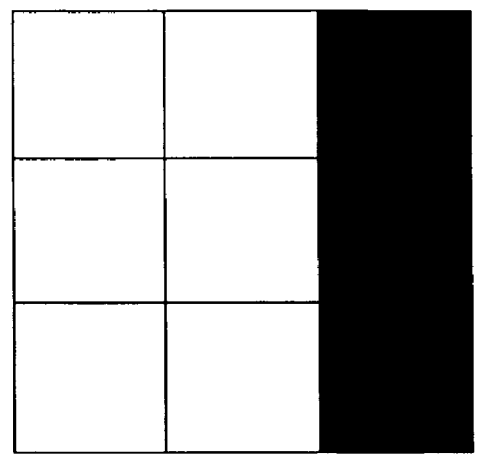
FIG. 45A            FIG. 45B

**Binary TIGER/Line Map Before and After
Applying Generalized Erosion Operator**
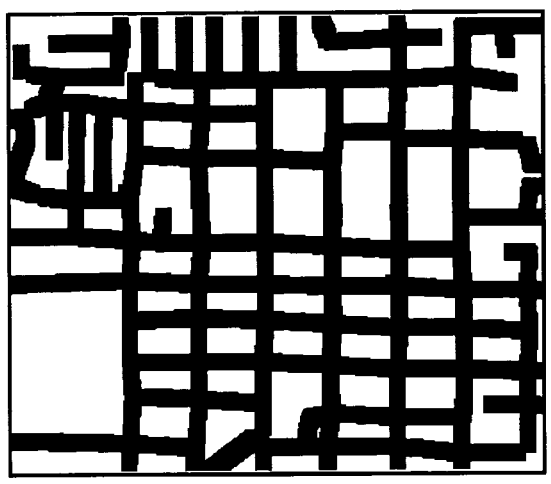 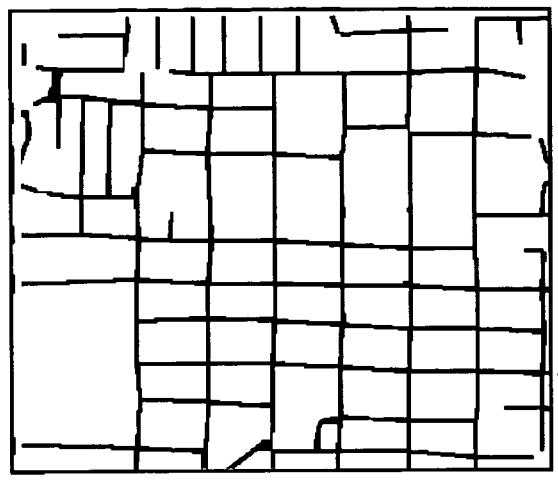
Before — FIG. 46A     After — FIG. 46B

Thinning Operator (black cells are foreground pixels)
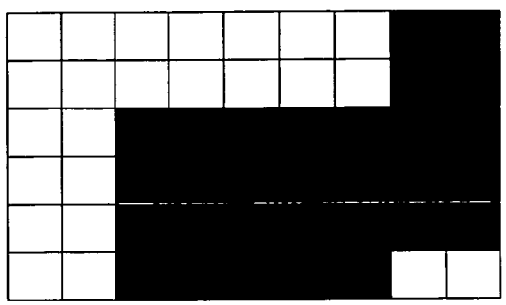
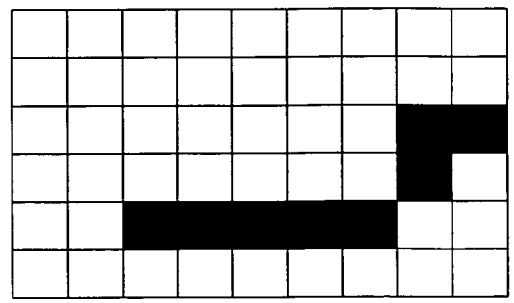
FIG. 47A  FIG. 47B
Skeletonizing Operator (black cells are foreground pixels)
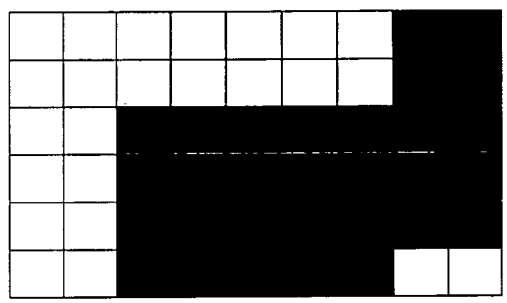
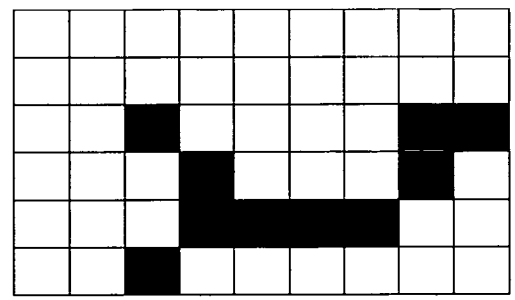
FIG. 47C  FIG. 47D

**Binary TIGER/Line Map Before and After
Applying Thinning Operator**
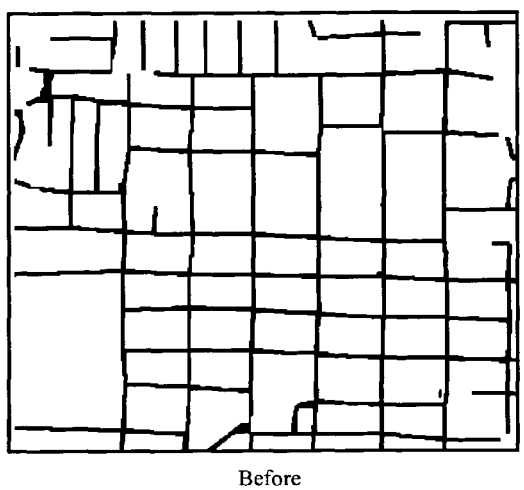 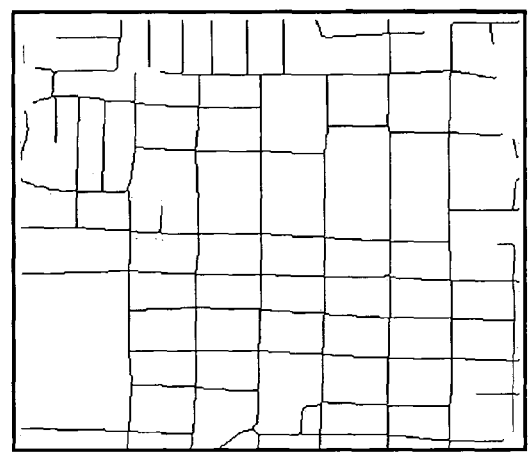
Before　　　　　　　　　　　　After
FIG. 48A　　　　　　　　FIG. 48B

Salient Point Detector

Connectivity to Determine Intersection Points

2 Connectivity, not an intersection point

3 Connectivity, an intersection point

Construct Lines to Compute Orientation

**Experimental Results With Respect to Raster Map Source,
Resolution, and Type of Road Layer**

| Map Source | Map Type | Precision/ Recall by Source | Type of the Road Layers | Precision/ Recall by Type of the Road Layers | Resolution | Precision/ Recall by Resolution | Number of Tested Maps |
|---|---|---|---|---|---|---|---|
| ESRI Map | Computer generated | 0.96/0.64 | Double line | 0.96/0.64 | N/A* | 0.96/0.64 | 10 |
| MapQuest Map | Computer generated | 0.90/0.61 | Double line | 1.00/0.88 | 2 | 1.00/0.85 | 1 |
| | | | | | 2.17 | 1.00/0.89 | 2 |
| | | | Single line | 0.87/0.52 | 4.84 | 0.92/0.75 | 3 |
| | | | | | 5.17 | 0.95/0.65 | 3 |
| | | | | | 11.11 | 0.80/0.20 | 2 |
| | | | | | 11.67 | 0.59/0.09 | 1 |
| TIGER/Line Map | Computer generated | 0.94/0.74 | Single line | 0.94/0.74 | 1.85 | 1.00/1.00 | 1 |
| | | | | | 2.90 | 0.98/0.72 | 1 |
| | | | | | 3.82 | 0.92/0.67 | 4 |
| | | | | | 4.17 | 0.97/0.85 | 2 |
| | | | | | 7.65 | 0.84/0.38 | 1 |
| | | | | | 7.99 | 0.95/0.84 | 1 |
| USGS Topographic Map | Scanned | 0.84/0.74 | Double line | 0.84/0.74 | 2.00 | 0.84/0.74 | 10 |
| Yahoo Map | Computer generated | 0.86/0.64 | Double line | 0.96/0.81 | 1.20 | 1.00/0.96 | 1 |
| | | | | | 1.22 | 0.83/0.90 | 2 |
| | | | Single line | 0.34/0.07 | 4.26 | 0.99/0.76 | 7 |
| | | | | | 14.08 | 0.34/0.07 | 2 |
| Thomas Brothers Map | Scanned | 0.94/0.66 | Single line | 0.94/0.66 | N/A** | 0.94/0.66 | 2 |

\* ERSI Map service was selected since it does not provide resolution

\** Two scanned Thomas Brothers Maps were randomly selected. The scanned resolution was not known

FIG. 52A

Experimental Results With Respect to Resolution

|  | Precision | Recall |
|---|---|---|
| Resolution <=7 m/pixel (8 maps) | 0.923 | 0.77 |
| Resolution >7 m/pixel (8 maps) | 0.664 | 0.267 |

FIG. 52B

Automatically Extracted Road Intersections Marked With "X"

Tiger/Line map

Tiger/Line map

USGS Topographic Map

Low-Resolution Map

Map with Detected Intersections

Image with Detected Intersections

Map with resolution of 4.2 m/pixel

Map with resolution of 14 m/pixel

Map with resolution lower than 16 m/pixel

Point Density to Prune Search Space

Partitioned image space (1059 intersections) having 16 equi-sized cells
(corresponding area to the map is highlighted)

Map with 57 detected intersections

Enlarged overlapping area in the imagery

HiGrid

Matching Point Pair Record

| $d_i$ (meters) / Matching point pairs | $d_0$ | $d_1$ | $d_2$ | ...... | $d_j$ (i.e., $\delta$) | $d_{j+1}$ | ...... | $d_l$ (i.e., 2* $\delta$) |
|---|---|---|---|---|---|---|---|---|
| [($m_2$, $s_2$), ($m_5$, $s_5$)] | 5 | 13 | 25 |  | 45 | 47 |  | 49 |
| [($m_3$, $s_3$), ($m_4$, $s_4$)] | 4 | 12 | 22 |  | 46 | 48 |  | 50 |
| [($m_1$, $s_1$), ($m_6$, $s_6$)] | 5 | 12 | 24 |  | 46 | 47 |  | 49 |
| ⋮ |  |  |  |  |  |  |  |  |

FIG. 62

GeoPPM

Map with matched point pattern
(black circles)

Image with corresponding point pattern
highlighted with black circles

Delaunay triangulation on imagery and map, using matched
point pairs as control point pairs
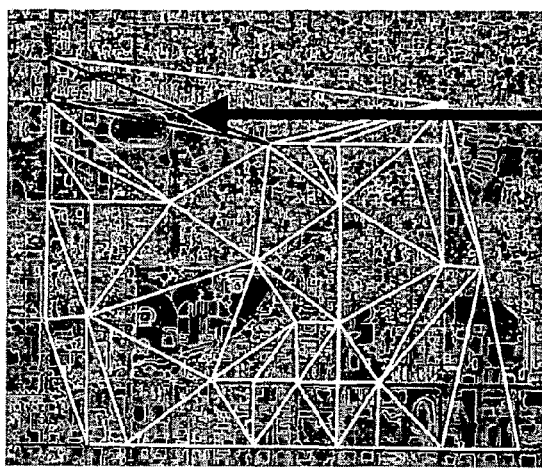
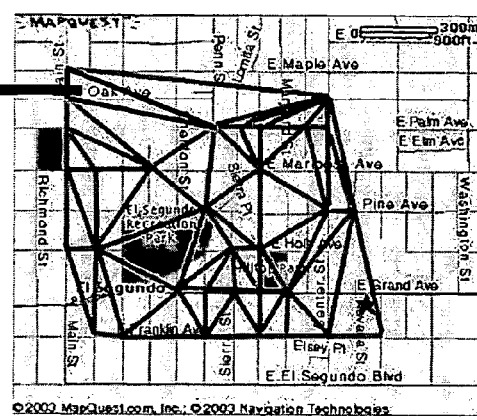
FIG. 64A                    FIG. 64B

Datasets Utilized in Experiments

|  | Test data set 1 (El Segundo, CA) | Test data set 2 (St. Louis, MO) |
|---|---|---|
| Imagery | Geo-referenced USGS DOQ orthoimagery with 1m/pixel resolutions | Geo-referenced USGS high resolution color orthoimagery with 0.3m/pixel resolution |
| Maps (with various sizes/scales) | 5 ESRI maps, 5 MapQuest maps, 5 Yahoo maps, 5 TIGER maps, 5 USGS Topographic maps, | 5 ESRI maps, 5 MapQuest maps, 5 Yahoo maps, 5 TIGER maps, 5 USGS Topographic maps |
| Vector data | U.S. Census TIGER/Lines Length: 84.32km About 300 intersections | USGS MO-DOT road vector Length: 364.28km About 1130 intersections |
| Area covered | Latitude:33.9164 to 33.9301 Longitude:-118.4351 to -118.3702 Width: 5.2km Height: 1.6km | Latitude: 38.5534 to 38.6091 Longitude: -90.4389 to -90.3720 Width: 6 km Height: 6 km |

FIG. 65

Imagery for Test Area 2

ESRI map with unknown map scale

MapQuest map with resolution of 4.8 m/pixel

TIGER map with resolution of 4.17 m/pixel

Topographic map with resolution of 2.0 m/pixel

TIGER/Line road network for test area 1

MO-DOT road network for test area 2

GeoPPM performance with respect to different map services

|  | ESRI map | MapQuest map | Yahoo map | TIGER map | Topographic map |
|---|---|---|---|---|---|
| Precision | 96.0% | 95.2% | 94.0% | 84.2%* | 93.9% |
| Recall | 80.2% | 84.8% | 88.3% | 75.6%* | 80.94% |

* If the misaligned TIGER-map is excluded, precision is 93.6% and recall is 84.2%.

FIG. 69A

GeoPPM performance with respect to different regions

|  | Test data set 1 (El Segundo, CA) | Test data set 2 (St. Louis, MO) |
|---|---|---|
| Precision | 91.9% | 93.4%** |
| Recall | 84.6% | 77.4%** |

** If the misaligned TIGER-map is excluded, precision is 97.2% and recall is 80.6%.

FIG. 69B

GeoPPM performance with respect to different resolution maps

|  | Precision | Recall |
|---|---|---|
| Resolution ≤ 2 m/pixel (15 maps) | 87.4%*** | 78.2%*** |
| 2 m/pixel < Resolution ≤ 4 m/pixel (7 maps) | 92.9% | 84.0% |
| 4 m/pixel < Resolution ≤ 7 m/pixel (13 maps) | 96.4% | 88.6% |
| Resolution > 7 m/pixel (5 maps) | 91.6% | 77.1% |

*** If the misaligned TIGER-map is excluded, precision is 93.2% and recall is 82.5%.

FIG. 69C

Map with point pattern that does not align with corresponding point pattern on imagery

Detected map intersections
(white circles)

Identified point pattern on map after applying GeoPPM
(point pattern marked as black circles)

Identified point pattern on imagery after applying GeoPPM
(point pattern marked as black circles)

Map with point pattern that does align with
corresponding point pattern on imagery Detected 16 map intersections
(white circles)

Identified point pattern on map after applying GeoPPM
(point pattern marked as black circles)

Identified point pattern on imagery after applying GeoPPM
(point pattern marked as black circles)

Identified point pattern after applying GeoPPM

Identified point pattern on imagery after applying GeoPPM

Detailed view of identified point pattern

Raster Map-Imagery Conflation

MapQuest map to imagery conflation

TIGER map to imagery conflation

ESRI map to high resolution imagery conflation

MapQuest map to high resolution imagery conflation

Map-Imagery Conflation Performance Measurements

Completeness and correctness assessment

Positional accuracy assessment

Detected point pattern on the map

Location of detected point is marked as "X," it is two pixels away from actual intersection Black circle represents the matched imagery point Two pixel displacement is amplified due to resizing

Execution Time of GeoPPM

| Number of Imagery Points | Using map scale only | Using map scale and road directions |
|---|---|---|
| 402 imagery points | 171 seconds | 16 seconds |
| 591 imagery points | 317 seconds | 26 seconds |
| 800 imagery points | 540 seconds | 42 seconds |
| 1059 imagery points | 934 seconds | 70 seconds |

First scenario: map scale known (57 map points)

FIG. 76A

| Number of Imagery Points | Brute force algorithm | Using road directions | Using HiGrid and road directions |
|---|---|---|---|
| 402 imagery points | 5 hours 58 minutes | 503 seconds | 11 seconds |
| 591 imagery points | N/A* | 1049 seconds | 17 seconds |
| 800 imagery points | N/A* | 2449 seconds | 26 seconds |
| 1059 imagery points | N/A* | 5298 seconds | 38 seconds |

* Due to the slow performance of the brute-force algorithm, running time was not collected Second scenario: map scale unknown (57 map points)

FIG. 76B

| Point Numbers | Using HiGrid and road directions |
|---|---|
| n = 10 | 38 seconds |
| n = 28 (i.e., half of map point number) | 104 seconds |
| n = 57 (i.e., map point number) | 106 seconds |

Running time using different HiGrid parameter $n$

SYSTEM AND METHOD FOR FUSING VECTOR DATA WITH IMAGERY

CROSS-REFERENCE TO RELATED APPLICATIONS

The present application is a continuation and claims the priority benefit of U.S. patent application Ser. No. 12/501,242 filed Jul. 10, 2009, entitled "Precisely Locating Features on Geospatial Imagery,"which is a continuation-in-part of U.S. patent application Ser. No. 11/169,076 filed Jun. 28, 2005, and entitled "System and Method for Fusing Geospatial Data," now U.S. Pat. No. 7,660,441, which claims priority benefit from U.S. provisional patent application No. 60/586, 623 filed Jul. 9, 2004, the disclosures of which are all hereby incorporated by reference in their entirety.

STATEMENT REGARDING FEDERALLY SPONSORED RESEARCH OR DEVELOPMENT

Research leading to certain embodiments of the present invention has been funded in part by National Science Foundation (NSF) grant numbers EEC-9529152 (IMSC ERC), IIS-0238560 (PECASE), and IIS-0324955 (ITR), in part by U.S. Air Force Office of Scientific Research under grant numbers F49620-01-1-0053 and FA9550-04-1-0105, in part by a grant from the U.S. Geological Survey (USGS) under grant number 03CRSA0631. Accordingly, the United States Government may have certain rights in the present invention.

BACKGROUND OF THE INVENTION

1. Field of the Invention

The present invention related generally to vector data, map, and imagery systems, and in particular to a system for automatically conflating road vector data, street maps, and orthoimagery.

2. Discussion of the Related Art

Over the years, the amount of available geospatial information has dramatically increased, making access possible to various types of spatial data. By integrating diverse spatial datasets, queries are now possible that could have not been previously answered given any of these datasets in isolation. However, accurately integrating different types of geospatial data remains a challenging task because diverse geospatial data have different projections and different accuracy levels, for example. Many types of conflation techniques only provide vector-vector data integration, or require human intervention to accomplish vector-raster or raster-raster data integration.

Conflation refers to the process used to integrate or align different geospatial datasets. The conflation process in accordance with an embodiment may be divided into the following general subtasks: (1) feature matching: find a set of conjugate point pairs, termed control point pairs, in two datasets; (2) match checking: detect inaccurate control point pairs from a set of control point pairs; and (3) alignment: use of accurate control point pairs to align the geospatial objects (such as points or lines) in both datasets using triangulation and rubber-sheeting techniques, for example.

There have been considerable efforts to automatically or semi-automatically accomplish vector to vector conflation. Some of the proposed approaches focus on handling the integration of two road networks. Other proposed strategies utilize a relational matching approach to find matched spatial objects based on the similarity of these spatial objects at the geometry level (e.g., node to node matching based on distance), as well as the relationship between the elements in a dataset. This strategy investigated the "similarity" of spatial objects based on statistical information derived from a random sample of the vector datasets to be integrated. However, this approach requires human intervention to perform an initial affine transformation between datasets.

There have been further attempts to automatically or semi-automatically accomplish raster to raster conflation. For instance, many commercial geographic information systems (GIS) products provide a certain level of functionality relating to the conflation of imagery and maps (i.e., raster to raster registration) using different types of transformation methods. However, these products do not provide automatic conflation, so users are required to manually select control points for conflation. In general, manual conflation techniques are labor intensive, and are subject to undesirable user errors.

SUMMARY OF THE INVENTION

Various conflation systems and techniques are presented herein, including vector-imagery conflation and map-imagery conflation. Vector-imagery conflation is an efficient approach that exploits knowledge from multiple data sources to identify a set of accurate control points. Vector-imagery conflation provides automatic and accurate alignment of various vector datasets and imagery. Map-imagery conflation utilizes common vector datasets as "glue" to automatically integrate street maps with imagery. This approach provides automatic, accurate, and intelligent images that combine the visual appeal and accuracy of imagery with the detailed attribution information often contained in such diverse maps. Both conflation approaches are applicable for GIS applications requiring, for example, alignment of vector data, raster maps, and imagery. If desired, the conflated data generated by such systems may be retrieved on-demand.

BRIEF DESCRIPTION OF THE DRAWING

The above and other aspects, features, and advantages of the present invention will become more apparent upon consideration of the following description of preferred embodiments, taken in conjunction with the accompanying drawing figures, wherein:

FIGS. 7A-7C respectfully depict original, edge-detected, and road-layer classified images;

FIG. 20 is a table providing data associated with tested datasets used for the experiments;

FIG. 24A is a table showing precision and recall of identified intersections for TIGER/Lines;

FIG. 24B is a table showing precision and recall of identified intersections for NAVSTREETS;

FIG. 24C is a table showing precision and recall of identified intersections for MO-DOT;

FIGS. 26A-26I are graphs which illustrate experimental test results of positional accuracy for test areas 1-3;

FIG. 42A depicts a binary TIGER/Line Map, before undergoing a text and graphics separation process;

FIG. 42B depicts the TIGER/Line Map of FIG. 42A, after undergoing a text and graphics separation process;

FIGS. 43A and 43B depict pixel matrices utilized by a generalized dilation operator;

FIGS. 45A and 45B depict pixel matrices utilized by a generalized erosion operator;

FIG. 46A depicts a binary TIGER/Line Map, before applying a generalized erosion operator;

FIG. 46B depicts the TIGER/Line Map of FIG. 46A, after applying a generalized erosion operator;

FIGS. 47A and 47B depict pixel matrices utilized by a thinning operator;

FIGS. 47C and 47D depict pixel matrices utilized by a skeletonizing operator;

FIG. 48A depicts a binary TIGER/Line Map, before applying a thinning operator;

FIG. 48B depicts the TIGER/Line Map of FIG. 48A, after applying a thinning operator;

FIGS. 52A-52B are tables providing data relating to experimental results obtained from various vector-imagery conflation processes;

FIG. 62 is a table showing data collected during an exemplary point pair finding process;

FIGS. 64A and 64B show Delaunay triangulation on imagery and a map, respectively;

FIG. 65 is a table that summarizes the various datasets and test sites used for performance evaluation;

FIG. 69A depicts GeoPPM performance with respect to different map sources;

FIG. 69B depicts GeoPPM performance with respect to two different test regions;

FIG. 69C depicts GeoPPM performance with regard to maps of different resolutions;

FIG. 73D depicts a conflated image for St. Louis, Mo., which resulted from a MapQuest Map to high resolution imagery conflation process;

FIGS. 74A and 74B are graphs providing a quantitative analysis of conflation results;

FIG. 75A depicts a map having an intersection point pattern;

FIG. 75B is an enlarged view of a portion of the map of FIG. 75A;

FIG. 75C depicts an image having a black circle that represents a matched imagery point;

FIG. 75D depicts an image illustrating that displacement error can be amplified by resizing an image;

FIGS. 76A-76C are tables providing data relating to the execution time of GeoPPM, as applied to a Yahoo Map and images of different area sizes; and FIG. 77 depicts a representative network environment suitable for implementing the system and methods of the present invention.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

1.0 Overview

With the rapid improvement of geospatial data collection techniques, the growth of the Internet, and the implementation of Open GIS, a large amount of geospatial data is now readily available. Examples of well-known vector datasets include U.S. Census TIGER/Line files (covering most roads within the United States), NAVSTREETS from NAVTEQ, and the GDT data from Geographic Data Technology. National Map, Geography Network from Environmental Systems Research Institute (ESRI), MapQuest, Yahoo Map service, Google Map/Imagery service, Microsoft TerraService, and Space Imaging, are examples of map and satellite imagery repositories. Users of these data products often desire to display geospatial data, along with related data, in some integrated fashion. Instead of simply being able to display all of the related data in a single framework, fusion of the data is needed to provide additional inferences that cannot be gathered from any single information source.

Figure 1A:
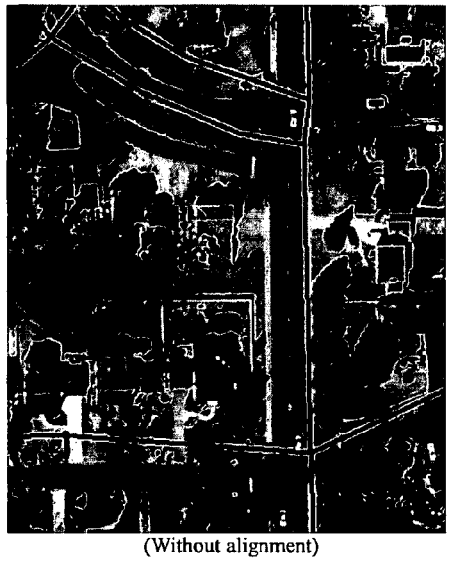
FIGS. 1A and 1B provide an example of the integration of road network vector data with imagery.
Figure 1B:
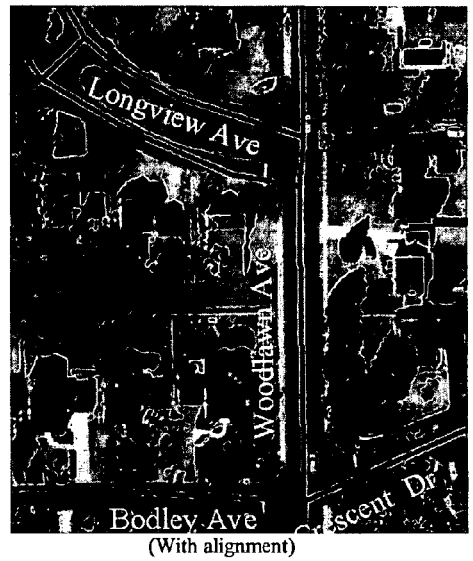

In general, geospatial data fusion requires the integration of various datasets to create, for example, a single composite dataset from the integrated elements. For geospatial data fusion, it is desirable to reduce the spatial inconsistencies among multiple datasets. For instance, FIGS. 1A and 1B provide an example of the integration of road network vector data with imagery. In FIG. 1A, a georeferenced USGS color image, having a resolution of 0.3 m/pixel, is shown combined with a road network (NAVTEQ NAVSTREETS). The road network is depicted by the black lines on this image. By simply superimposing the roads on top of the imagery, certain geospatial inconsistencies become noticeable (FIG. 1A)

In accordance with embodiments of the present invention, FIG. 1B depicts the same image, which has now been aligned with the road network. This figure also shows the image annotated with street names, which may be obtained from the detailed attribution information often contained in vector datasets. Moreover, once the road network is aligned to higher resolution imagery (e.g., 0.3 m/pixel), its positional accuracy may be improved.

Figure 2A:
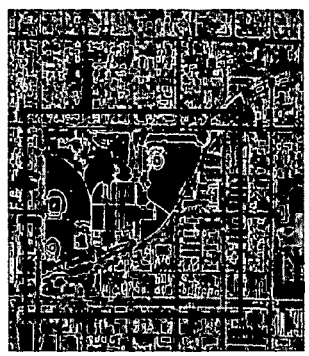
FIGS. 2A-2C provide an example of the integration of street maps and imagery.
Figure 2B:
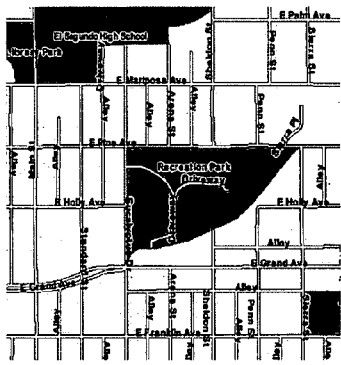
Figure 2C:
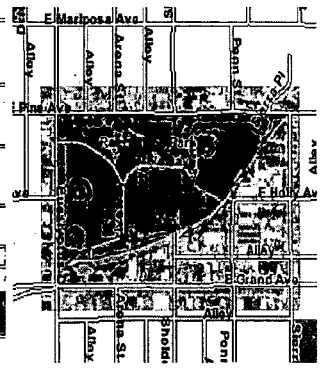

In accordance with alternative embodiments, map and imagery integration is also provided, an example of which is depicted in FIGS. 2A-2C. In particular, FIG. 2A depicts an image, and FIG. 2B depicts a map having a coverage area which corresponds to a portion of this image. FIG. 2C provides an example of the integration of the image of FIG. 2A with the map of FIG. 2B.

Manually aligning diverse geospatial datasets, such as maps and imagery covering the United States or other locations or countries, is a time consuming and error-prone process. Moreover, performing alignment offline on two geospatial datasets is not always a viable option in online GIS-related applications since both datasets may be obtained by querying different information sources at run-time (i.e., the data of an "area of interest" often needs to be processed and integrated on-demand). As will be presented in detail herein, automatic alignment of geospatial datasets, such as road vector data, street maps, and imagery, is a desirable and needed application.

Accurate and automatic alignment of geospatial datasets has several challenges. For instance, different data products do not always align well in their currently available format. This is because they may have been collected at different resolutions; they may use different spheroids, projections, or coordinate systems; they may have been collected in different manners, or collected with different precision or accuracy. If the geographic projections of both datasets are known, then both datasets may be converted to the same geographic projections. However, geographic projections are not known for a wide variety of geospatial data. Furthermore, converting datasets into the same projection does not address the issue of different inaccuracies between two spatial datasets.

Figure 3A:
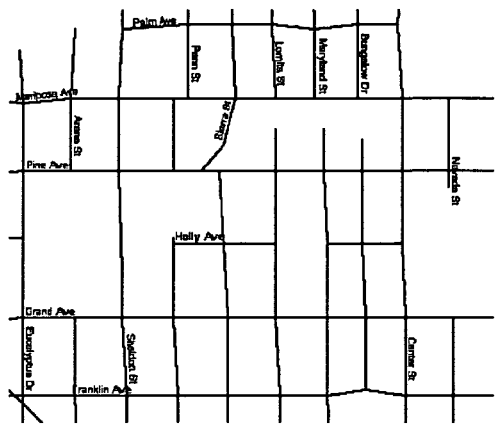
FIGS. 3A-3C provide an example of map-imagery integration without alignment.
Figure 3B:
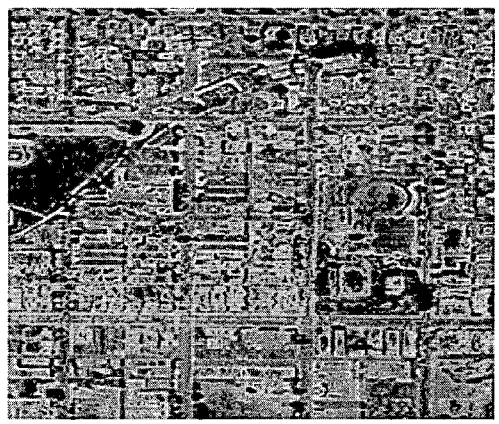
Figure 3C:
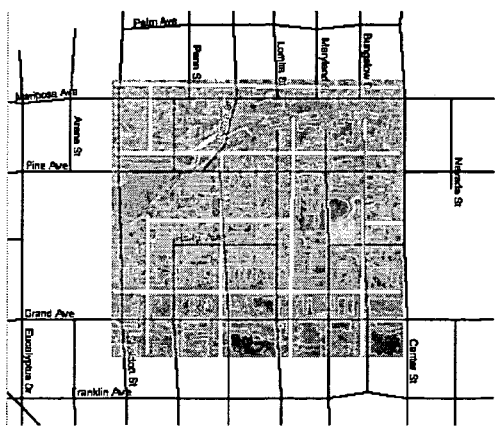

Several currently available online maps have unknown geo-coordinates. For example, many online street maps, such as Yahoo Map service and MapQuest, are not georeferenced. Hence, their geo-coordinates are not known in advance, although general region information is provided. Even though some map services, such as TIGER Maps, provide geo-coordinates, they often do not readily align with imagery, as shown in FIGS. 3A-3C. In particular, FIG. 3A depicts a georeferenced TIGER street map, and FIG. 3B depicts a georeferenced image. FIG. 3C provides an example of misalignment such that the image is not aligned with the superimposed map.

By way of example, the following conflation types will be described herein: vector to vector data conflation (e.g., road vector to road vector conflation); vector to raster data conflation (e.g., road vector to satellite imagery conflation); raster to raster data conflation (e.g., map to satellite imagery conflation).

In vector to vector conflation, there have been a number of efforts to locate counterpart elements from both road network vector data to accomplish vector data integration.

In vector to imagery conflation, accurate imagery may be used to update the vector datasets with poorer positional accuracy. Moreover, in map to imagery conflation, intelligent images may be created that combine the visual appeal and accuracy of imagery with the detailed attribution information often contained in such diverse maps.

Traditionally, problems encountered in vector-imagery and map-imagery conflation have been in the domain of image processing and GIS. The focus of these image processing techniques has been on automatic identification of objects in the image in order to resolve vector-image or map-image inconsistencies. However, these techniques require significant computer processing time to process an image in its entirety, and such a process still may result in inaccurate results. Moreover, various GIS systems, such as ESRI ArcView, MapMerger, ER Mapper Image Web Server, Intergraph I/RASC, and Able R2V, provide the functionality to integrate different layers of geospatial data. However, these products do not provide automatic conflation, nor do they align multiple geospatial datasets.

Embodiments will be described in which the conflation of road network vector data and orthoimagery (i.e., imagery that is altered from original photos so that it has the geometric properties of a map), and the conflation of street maps (i.e., maps showing roads) and orthoimagery.

In one embodiment, referred to herein as automatic multi-source conflation (AMS-conflation), may be used to integrate vector data, imagery (including orthoimagery), and maps. AMS-conflation exploits information from various data sources to assist in the alignment process.

There are three general sources of information for automatically identifying control points: inferences on the data source, metadata and attribution information of the data sources, and other sources of data that can be linked to the source. Each of these information sources will now be described.

With regard to information inferred from a data source, there are a wide variety of techniques that may be applied to geospatial data sources to identify possible control points. For example, road network data can be analyzed to find intersection points. Similarly, image processing techniques (such as edge-detection, corner-detection, region-segmentation, and histogram-based classification) can be used on both images and maps to find points, lines, or homogeneous regions. Any of these image processing techniques may result in some missing points or noisy points. However, these problems can be addressed since the conflation techniques disclosed herein utilize a sparse distribution of accurate points to conflate two datasets.

Metadata and attribution information of the data source will now be addressed. Recently, metadata (i.e., information about data) is increasingly being used in geographic information systems to improve both availability and quality of the spatial information delivered. Metadata from vector data, imagery, and maps, may be exploited to perform the conflation procedure. For example, for imagery, metadata about the coordinates of a data source and resolution is useful in narrowing the search for corresponding control points. For maps, the map scale, map resolution, map legend, and map orientation, may be exploited to improve the performance of locating corresponding control points. Attribution information of the geospatial datasets can also provide helpful information to identify control points. For example, non-spatial attributes of the road network vector data, such as address ranges, road names, or the number of lanes and type of road surface, may be exploited to efficiently and accurately locate control points.

Another useful source of information includes peripheral data sources that can provide additional information. For example, telephone number databases may be used to look up the address of a named or pre-identified point in the imagery. Similarly, with regard to conflation of map and imagery, a third data source (e.g., road vector data) that has relevant information to both sources may be used to support map and imagery alignment.

The above-identified sources of information may be used to accurately identify spatial features, such as road intersections, as control points. By way of example, two scenarios will be considered: vector-imagery conflation and map-imagery conflation.

In vector-imagery conflation, the approximate location of road intersections on the images may be identified based upon the inferred knowledge of the corresponding vector data. For each intersection point, image processing may be performed on a relatively small area around the intersection point to find the corresponding point in the image. In addition to the approximate location of intersections, the information inferred from vector data, such as road-directions, road-widths, and road-shapes, may be used to locate intersections on the images. In particular, this approach generates a template inferred from the vector information, and then matches it against a relatively small area in the image to find the corresponding intersection point on the imagery. The running time for this approach is dramatically lower than traditional image processing techniques because image processing is localized. Furthermore, the road direction and width information may also be used simplify the task of detecting roads in the image.

In map-imagery conflation, auxiliary information sources (i.e., road vector data) that are not part of a map or image may be used. In general, this auxiliary information is relevant to both sources. In other words, the road vector data may be used as the "glue" to align maps and imagery. During this conflation process, the road network vector data may be aligned with imagery using the vector-imagery conflation techniques disclosed herein. As a result, the conflated intersection points on the road network are generally aligned with the intersection points on the imagery. The conflated intersection points may then be used as control points on the imagery. For maps, image processing techniques may be used to detect feature points (e.g., road intersections) as control points. Furthermore, the distributions of the two point sets may be compared by exploiting road directions, map scales, and the like, to determine the transformation between the map and imagery.

Section 2 below describes an efficient approach for vector-imagery conflation that exploits knowledge from each data source to identify a set of accurate control points. This approach provides automatic and accurate alignment of various vector datasets and imagery. Vector-imagery conflation is appropriate for GIS applications, for example, requiring alignment of vector data and imagery over large geographical regions. If desired, the conflated data may be retrieved on-demand.

Section 3 below describes an approach for map-imagery conflation that utilizes common vector datasets as "glue" to automatically integrate street maps with imagery. This approach provides automatic, accurate, and intelligent images that combine the visual appeal and accuracy of imagery with the detailed attribution information often contained in diverse maps. This approach is also applicable for GIS applications requiring, for example, alignment of online maps and imagery. Map-imagery conflation results may also be provided on-demand.

2.0 Automatic Conflation of Road Vectors and Orthoimagery

In accordance with an embodiment, AMS-conflation may be achieved using a multiple operation geospatial data alignment process that involves the identification of matching features as control points, optionally filtering of misidentified control points, and computation of local transformations between two datasets based on the filtered control points. Accordingly, Section 2 will provide detailed techniques which may be used to automatically and accurately conflate road network vector data and orthoimagery.

Figure 4:
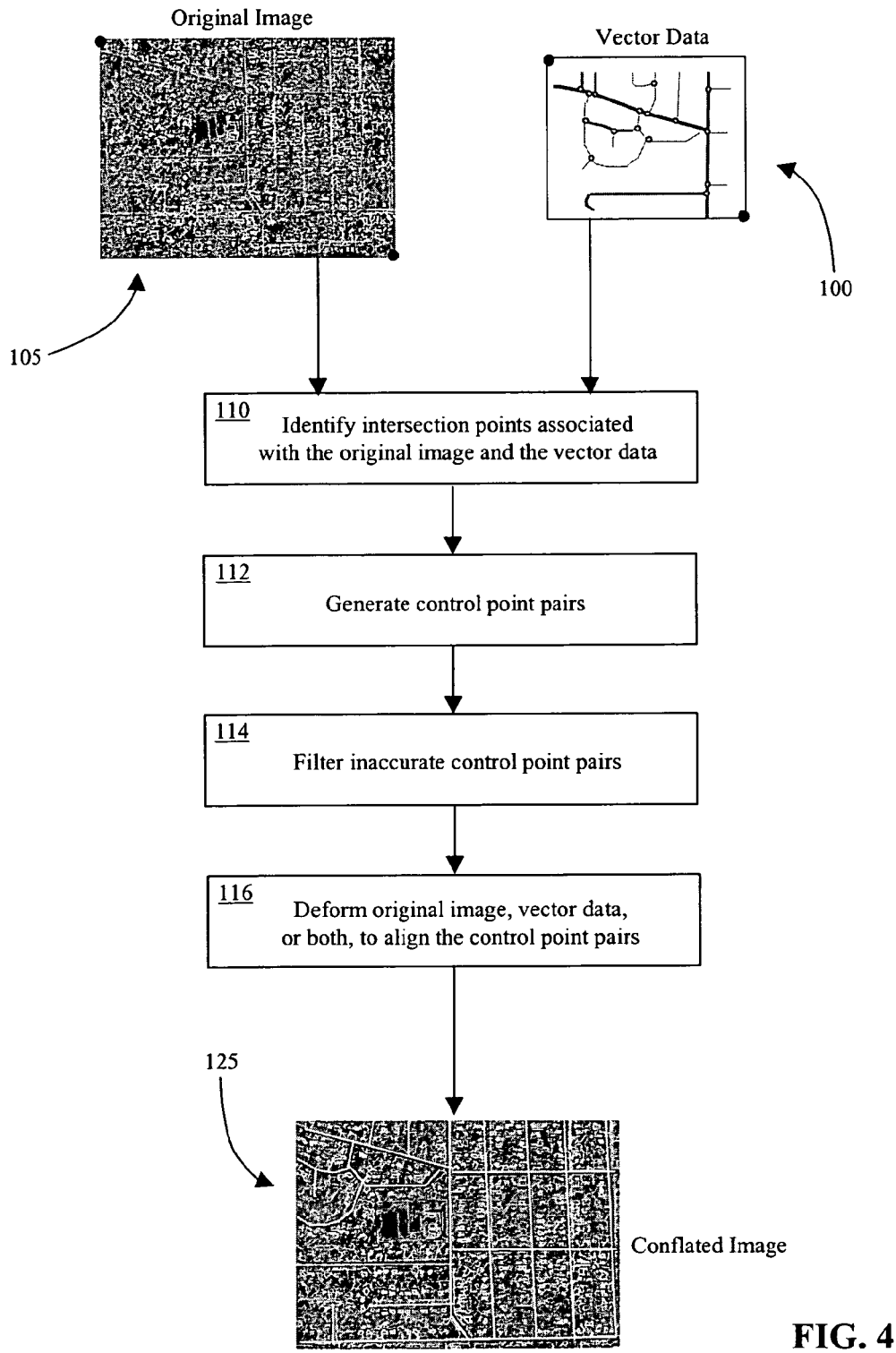
FIG. 4 is a flowchart of one approach for conflating road network vector data and imagery, in accordance with an embodiment of the present invention.

FIG. 4 is a flowchart showing one approach for automatically conflating vector data, such as road network vector data 100, with geospatial data, such as original image 105. In accordance with an embodiment, a first set of feature points associated with the vector data, and a second set of feature points associated with the original image may be identified (block 110). Particular examples of feature points include road intersections, railroad intersections, river intersections, and the like. In block 112, control point pairs are generated. Each of the generated control point pairs may include a distinct one of the first set of feature points and a corresponding distinction one of the second set of feature points. In block 114, inaccurate control point pairs may be optionally filtered from the control point pairs. Another operation includes deforming vector data 100, or original image 105, or both, to effectively align the control point pairs (block 116). This operation may be accomplished by triangulation and rubber-sheeting, for example. If desired, the deforming operation may be used to create image-aligned vector data. The image-aligned vector data may be used to generate a composite image, such as conflated image 125, which is shown including the original image and the imaged-aligned vector data.

2.1 Finding Control Point Pairs

A control point pair includes a feature point in one dataset (e.g., original image), and a corresponding feature point in another dataset (e.g., road network vector data). Finding accurate control point pairs is desirable since the various points in both datasets may be aligned based on the control point pairs.

In general, road intersections are good candidates for control points because they are salient points to capture major features of a road network, and the road shapes around intersections are often well-defined. In addition, various geographic information systems (GIS) researchers and computer vision researchers have indicated that intersection points on road networks are good candidates for identifying accurate sets of control points. Accordingly, embodiments of the invention will be described using road intersections for control points. However, these techniques apply equally well to other feature points such as railroad track intersections, river intersections, mountains, geographical landmarks, structures (e.g., building, oil wells, bridges, etc.), and map contour lines, among others.

Conventional image processing algorithms have previously been used to identify intersection points in imagery. However, extracting road segments directly from imagery is a difficult task due to the complexity that characterizes natural scenes within the imagery. Thus, extracting roads from imagery is often error-prone and may require manual intervention. Moreover, processing an image of a large area to extract roads requires substantial computer processing time.

Integrating vector data in a road extraction procedure alleviates or minimizes some or all of the just-described problems. Section 2 also describes a technique that will be referred to as localized template matching (LTM). LTM exploits information such as the vector data attributes, image metadata, as well as the color of imagery, to accurately and efficiently find the intersection points of various roads present within the imagery. Conceptually, spatial information of the road network vector data, which will also be referred to herein as "vector data" or "road vector data" represents existing knowledge about the approximate location of roads and intersection points in the imagery.

In general, LTM may be used to find intersection points associated with the road network vector data. For each identified intersection point, the LTM technique determines the general area in the image where the corresponding intersection point should be located. Finally, a template inferred from the vector information (such as road width, road directions and road intersections) may be matched against this small area to identify the intersection points on the imagery. The area searched for the intersection is typically a small fraction of the entire image.

The LTM technique may be unable to find all intersection points on the image due to the existence of trees or other obstructions such as cars and building shadows. However, the conflation process does not require a large number of control point pairs to perform accurate conflation. Therefore, for a particular intersection point of the vector data, if the LTM process cannot find corresponding image intersection points within a given area, it will not greatly affect the conflation process.

2.1.1 Road Network Intersection Detection

Figure 5:
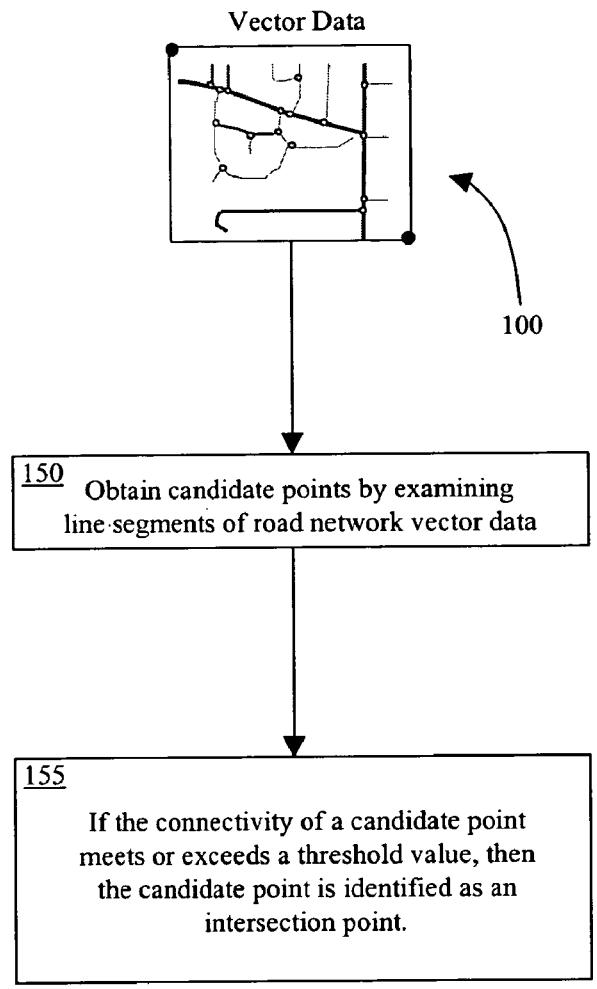
FIG. 5 is a flowchart showing a process for finding road intersections associated with the road network vector data.

FIG. 5 is a flowchart showing a process for finding road intersections associated with the road network vector data. At block 150, a number of candidate points may be obtained by examining the line segments of road network vector data 100. In this operation, the endpoints of each line segment of the vector data may be labeled as candidate points.

In block 155, a candidate point is identified as an intersection point if the connectivity of the candidate point meets or exceeds a threshold value. For example, in this operation, a candidate point is examined to determine if there are more than two line segments connected at the candidate point. If so, this candidate point is marked as an intersection point, and the directions of the line segments that are connected at the intersection point are calculated. Block 155 may be repeated for each of the candidate points.

2.1.2 Road Intersection Detection for Imagery

Figure 6:
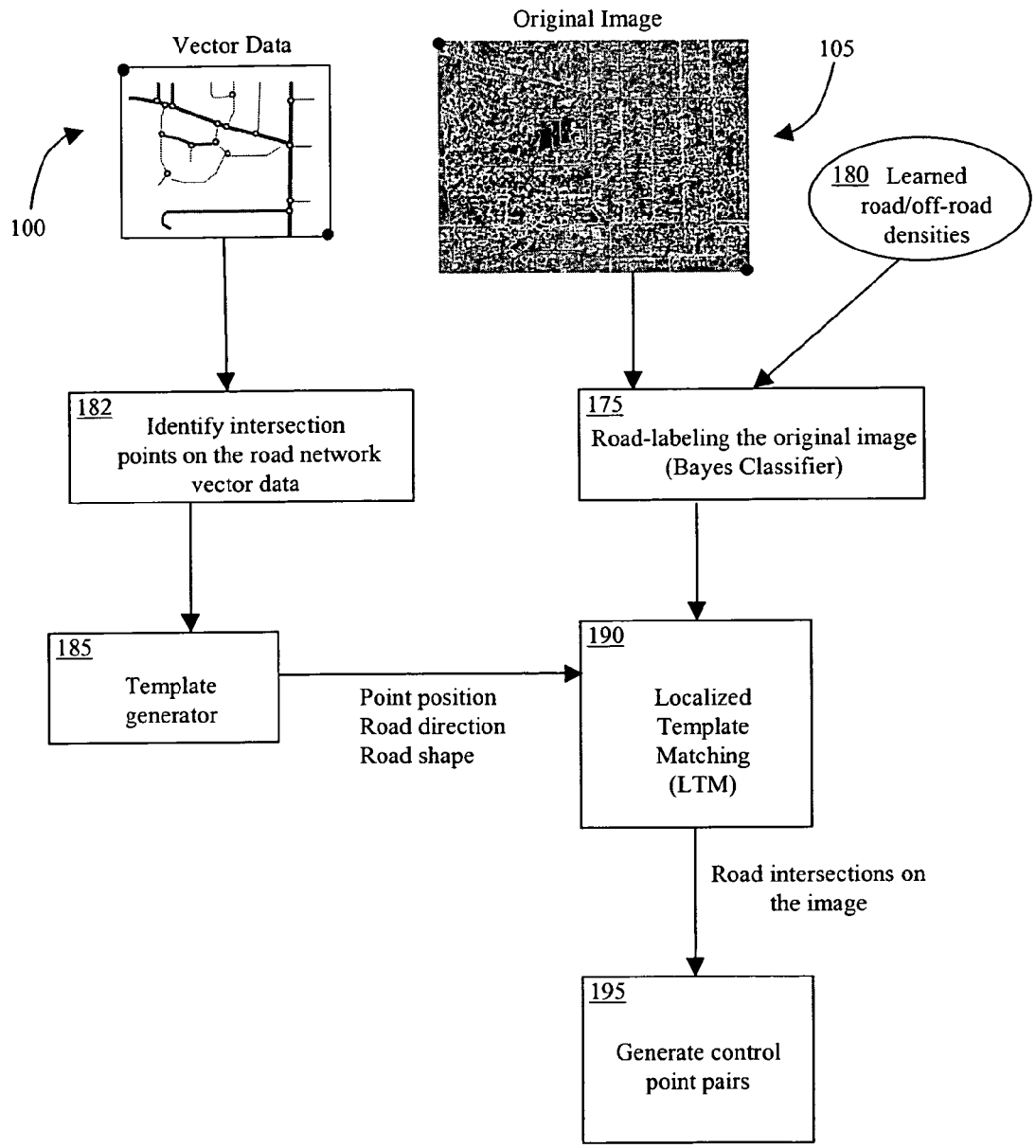
FIG. 6 is a flowchart showing a general overview of one technique for finding road intersections on imagery.

FIG. 6 is a flowchart showing a general overview of one technique for finding road intersections on imagery. First of all, to detect, locate, or otherwise identify road intersections on imagery, such as original image 105, it is useful to understand the characteristics of roads as they appear in imagery. In low-resolution imagery, roads are illustrated as lines, while high-resolution imagery often depict roads as elongated homogeneous regions with substantially constant width and similar color along the length of the road. In addition, roads typically include well-defined geometrical properties. For example, road direction changes tend to be smooth, and the connectivity of roads follow topological regularities.

A road intersection may be viewed as the intersection of multiple road axes. Also, it is located at the overlapping area of some elongated road regions. These elongated road regions form a particular shape around the intersection. Therefore, this shape may be matched against a template derived from road network vector data to locate the intersection. Based on the characteristics of roads, this shape may be formed from either detected road-edges or homogeneous regions.

In block 175, the original image undergoes a road-labeling process using, for example, a Bayes classifier. As will be described in more detail below, the road-labeling process utilizes information obtained from a learned on-road/off-road densities procedure (block 180). As indicated in block 182, intersection points on road network vector data 100 are identified. This identification may be performed using the method shown in FIG. 5, for example. The template generator of block 185 may be used to build a template around an intersection on the road network vector data. This template is provided to the LTM process of block 190.

In general, the LTM process utilizes the template generated by the template generator to locate intersections on the road-labeled original image, thus resulting in the identification of intersections on original image 105. In block 195, control point pairs are identified based upon the identified intersection points (feature points) on the road network vector data and the original image. More specifically, each intersection point on the road network vector data may be matched or otherwise associated with a corresponding intersection point on the original image. The matched intersection points represent a control point pair. The various processes depicted in FIG. 6 will be described in more detail in the following sections.

It is generally understood that existing edge detector techniques may be utilized to identify linear features on imagery, and for matching against vector data to locate intersections. However, on high-resolution imagery (e.g., resolutions up to 0.3 m/pixel) more detailed outlines of spatial objects, such as edges of cars and buildings, introduce noisy edges. FIG. 7A is an example of such a high-resolution image.

Hence, in some cases, fragmented edges may be obtained that include real road edges, building edges, tree edges, and the like. An example of such a scenario is shown in FIG. 7B, which shows edges detected by a Canny edge detector. This makes it difficult to identify actual road edges by grouping-based methods (that is, methods that group detected pixels belonging to the same edge as a line or a curve). As the example shown in FIG. 7B illustrates, more constraints (such as road sides are often in parallel) may be exploited to eliminate the impacts of noisy edges. However, other useful information about roads, such as the road color, may be utilized to overcome this problem. Therefore, in contrast to traditional edge-detection approaches, a more effective way to identify intersection points on high-resolution imagery is presented herein. This approach utilizes the above-mentioned Bayes classifier, which is a histogram-based classifier, to classify image pixels as either on-road or off-road pixels. An example of an image subjected to this classifying technique is shown in FIG. 7C, which is a road-classified image such that the white pixels denote on-road portions of this image.

2.1.2.1 Road-Labeling Imagery Using the Bayes Classifier

Referring back to block 175 of FIG. 6, histogram-based classification (Bayes classification) may be implemented based on the assumption of consistency of image color on road pixels. That is, road pixels can be dark, or white, or have color spectrum in a specific range. It is expected that nearby road pixels have substantially the same representative color whenever the images are taken at about the same time period, using similar sensing equipment. A statistical color distribution (also referred to as a class-conditional density) may be constructed of on-road/off-road pixels utilizing a histogram learning technique, which will now be described.

First, a relatively small, partial area, of the image may be selected. This selection may be random, predetermined, or manually specified. The selected partial area may be used to select a portion of the image in which the identification of road intersections is desired.

Next, on-road regions and off-road regions of the selected partial area may be identified. One technique for identifying these regions utilizes manually labeled training pixels, which allows for the learning of the color distribution (histograms) for on-road and off-road pixels. On-road and off-road densities of the selected partial area may be constructed based upon these training pixels. If desired, the learning process may be performed off-line, further conserving computing time and resources. Note that the learned results may be used to identify intersections within an area that is substantially larger than the selected partial area.

Figure 8A:
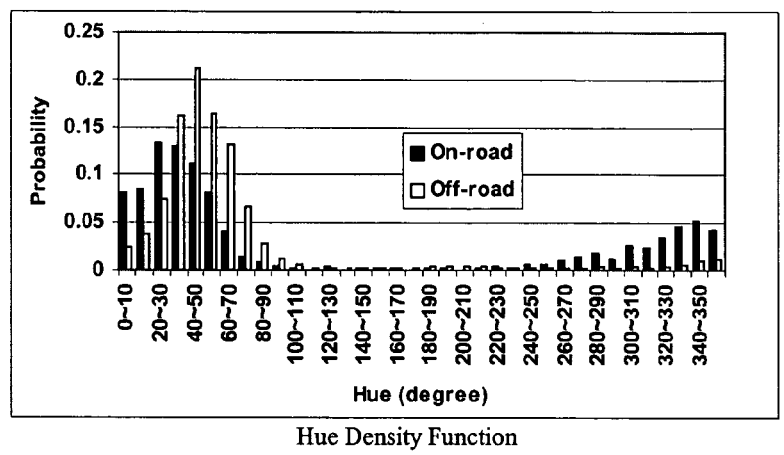
FIGS. 8A and 8B are graphs showing hue probability density and saturation probability density, respectively, of a portion of a sample image.
Figure 8B:
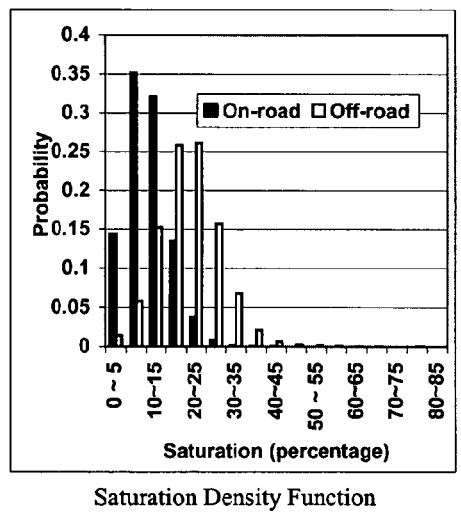

FIGS. 8A and 8B are graphs showing hue probability density and saturation probability density, respectively, of a portion of a sample image. Note that an intensity density function is typically not used since there is minimal difference between the brightness distribution of on-road and off-road pixels. This is especially true when images are obtained at substantially the same time, and thus, are obtained under the same or similar luminosity condition.

By way of example only, the data in these graphs was obtained during a learning procedure that was performed on nearly 500 manually labeled rectangles from a set of USGS images having a resolution of 0.3 m/pixel. These images depict portions of St. Louis County, Mo. The rectangles collectively contained about 50,000 pixels. The hue density function of FIG. 8A shows conditional probabilities, which will be referred to as Probability(Hue/On-road) and Probability(Hue/Off-road).

The X-axis of FIG. 8A depicts the hue value, while the Y-axis shows the probability of on-road and off-road pixels that are within the hue range represented by the X-axis. A hue value h may be computed for each particular image pixel. If the probability for a given image pixel is higher for off-road than on-road, then that image pixel may be classified as an off-road pixel. Conversely, if the probability is higher for on-road than off-road, then that image pixel may be classified as an on-road pixel.

Similar to the just-described classification using the hue density function, FIG. 8B shows that on-road and off-road classification of pixels may also be achieved by examining the saturation percentage of a particular image pixel. Another alternative for classifying an image pixel is to utilize the two chromatic components, and more particularly, the hue density function, the saturation hue probability density, and the saturation probability density.

In accordance with an embodiment, automated road-labeling may be conducted based on the learned hue density function. A particular image pixel, having a hue value of h, may be classified as on-road if:

$$\frac{\text{Probability}(h/\text{On-road})}{\text{Probability}(h/\text{Off-road})} \geq \theta \qquad \text{(Eq. 1)}$$

where $\theta$ is a threshold. In general, $\theta$ depends on the application-specific costs of the classification errors, and it may be selected using, for example, the ROC (Receiver Operating Characteristic) technique proposed by M. Jones and J. Rehg in a work entitled "Statistical color models with application to skin detection," as published in Proceedings of IEEE Conference on Computer Vision and Pattern Recognition, Fort Collins, Colo., IEEE Computer Society, Jun. 23-25, 1999, pgs. 1274-1280.

Since the approximate intersection locations on the image is known from the road network data (discussed next), the road-labeling procedure is applied only to image pixels within a radius of potential intersections. Therefore, the need to exhaustively label each pixel on the entire image is eliminated.

2.1.2.2 Analyzing Imagery Using Road Network Data (Localized Template Matching)

Figure 9A:
FIG. 9A is an example of an original image.
Figure 9B:
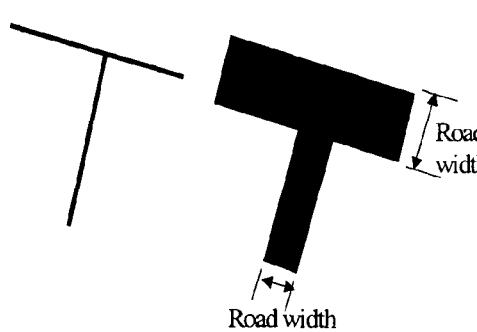
FIG. 9B depicts a typical intersection of original road network data, as well as an exemplary template which may be formed based upon the intersection.
Figure 9C:
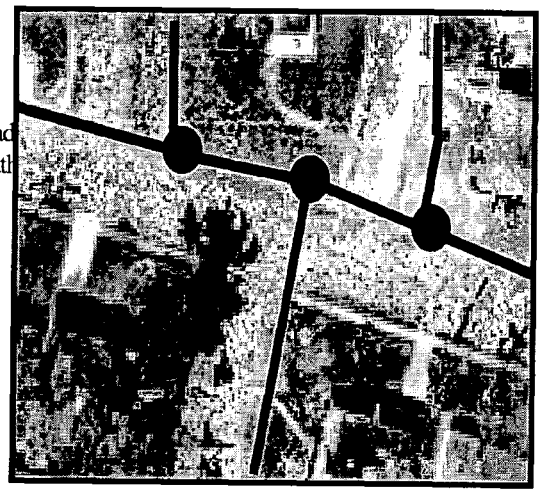
FIG. 9C depicts a road-labeled image.

Intersections in an original image, such as an orthoimage, may be identified by matching intersections on the original image with a template determined from road network vector data. FIG. 9A is an example of an original image. FIG. 9B depicts a typical intersection of original road network data, as well as an exemplary template which may be formed based upon the intersection. FIG. 9C depicts a road-labeled image in which white pixels denote labeled road pixels; black lines depict existing road network vector data; and black circles denote intersections on the vector data, implying approximate locations of intersections on the original image.

The localized template matching (LTM) technique may be used to find the geo-coordinates of some or all of the intersection points on the road network vector data. Since the system also knows the geo-coordinates of the images (from image metadata), it can also obtain the approximate location of intersections on the imagery (as in FIG. 9C).

Figure 10:
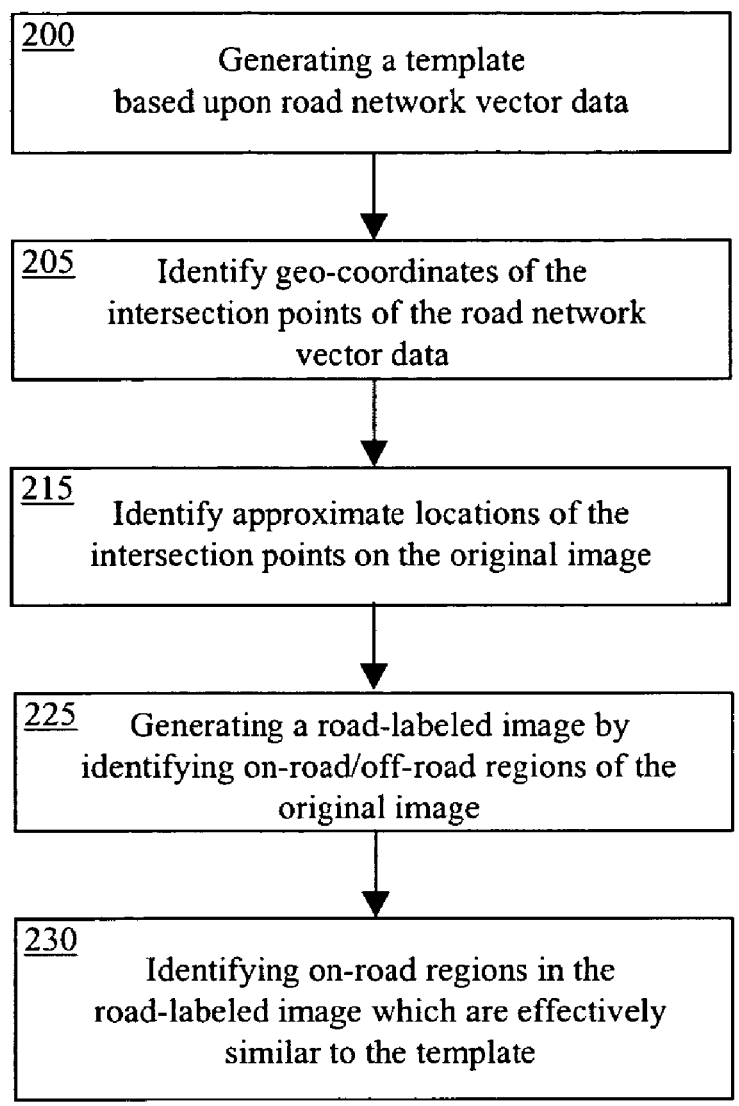
FIG. 10 is a flowchart depicting a method for identifying approximate locations on imagery using localized template matching (LTM)

FIG. 10 is a flowchart depicting a method for identifying locations of road intersections, for example, on imagery using LTM. At block 200, a template is generated based upon road intersections (e.g., feature points), line characteristics, or both, associated with road network vector data. In general, the template, which may be an intersection template, is formed around an intersection on the road network data. The road network data includes road direction and road widths.

At block 205, geo-coordinates of the road intersections are identified. Next, approximate locations within the imagery (e.g., geospatial data), of each of the road intersections, are identified (block 215). In block 225, a road-labeled image may be generated by identifying on-road regions on the imagery. Next, the road-labeled image may be compared with the template to identify on-road regions in the road-labeled image which have effectively similar dimensions and angles, relative to an orientation of the road network vector data, as the template (block 230). The comparing operation of block 230 results in the identification of the intersection points on the imagery.

Figure 12:
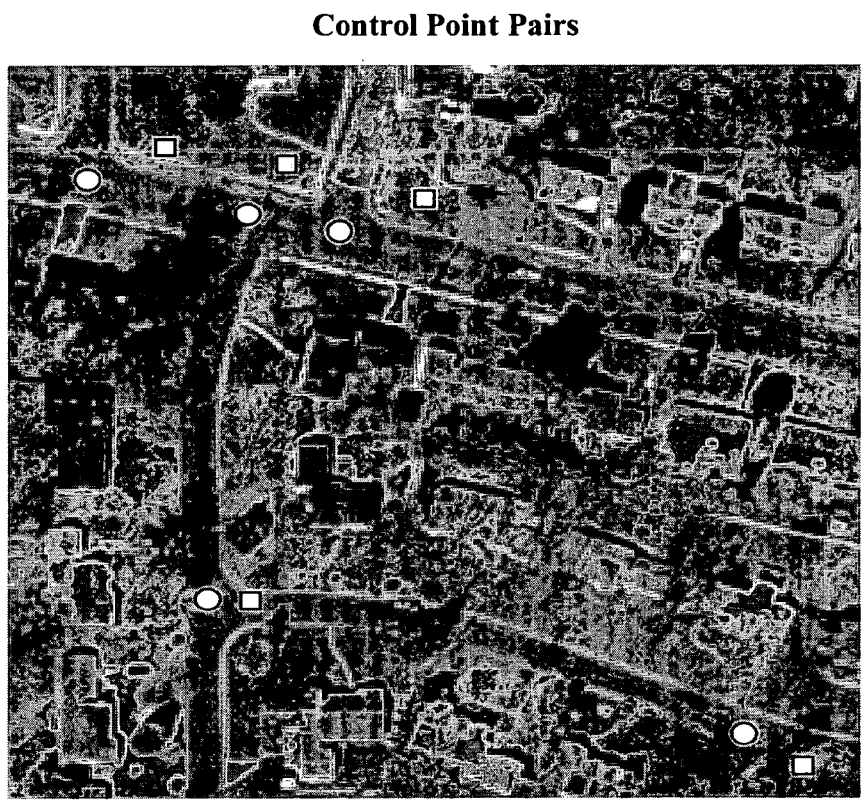
FIG. 12 is an image having intersections (rectangles) obtained from road network vector data, as well as corresponding intersections on the original image (circles)

Looking ahead to FIG. 12, an image is shown having intersections (rectangles) obtained from road network vector data, as well as corresponding intersections on the original image (circles).

Using the method of FIG. 10, regions in the road-labeled image that are similar (in shape) to the generated template may be located (FIG. 9C). For example, given a road-labeled image I, having W×H pixels, and a template T, with w×h pixels, the template may be moved around the road-labeled image and compared against the overlapped regions of the image regions. The adapted similarity measure is a normalized cross correlation defined as:

$$C(x, y) = \frac{\sum_{y'=0}^{h-1} \sum_{x'=0}^{w-1} T(x', y') I(x+x', y+y')}{\sqrt{\sum_{y'=0}^{h-1} \sum_{x'=0}^{w-1} T(x', y')^2 \sum_{y'=0}^{h-1} \sum_{x'=0}^{w-1} I(x+x', y+y')^2}} \quad \text{(Eq. 2)}$$

where T(x,y) equals one if (x,y) belongs to a road region, otherwise; T(x,y) equals zero. I(x,y) equals one if (x,y) is pre-classified as a road pixel; otherwise, I(x,y) equals zero. C(x,y) is the correlation on the pixel (x,y). In one implementation, w equals h, which defines a square area.

The highest computed correlation C(x,y) implies the location of the best match between the road-labeled image and the template. Furthermore, C(x,y) determines the degree of similarity between the matched road-labeled image and the template. An intersection will be identified if C(x,y) is greater than a similarity threshold t ($0 \leq t \leq 1.0$).

As an example, when setting t to 0.5, detected intersections that have a higher similarity value (i.e., C(x,y)), as compared to its dissimilarity value (i.e., 1.0–C(x,y)), may be kept for later use. Moreover, the square area dimension (i.e., width w) can be determined based on the accuracy and resolution (such as ground resolution from image metadata) of the two datasets.

Figure 11:
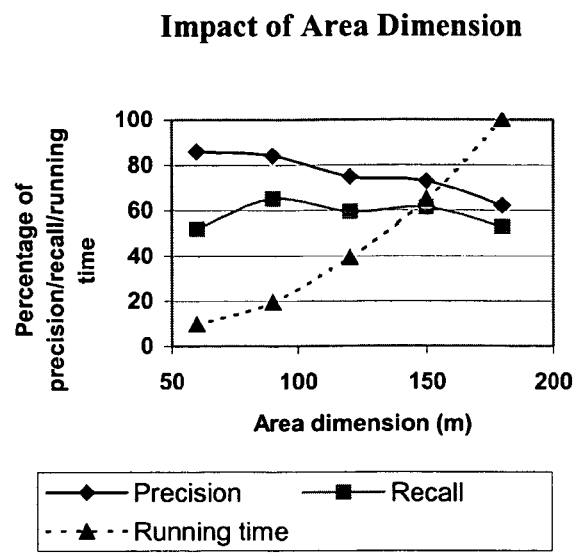
FIG. 11 is a graph showing the impact of increasing area dimension.

As an example, a high quality road network, NAVTEQ NAVSTREETS, and the LTM technique with various area sizes, were used to identify intersections in a 1.5 km by 1.5 km USGS high resolution color imagery (with 106 actual road intersections). FIG. 11 shows the performance of the LTM process in this example. A "buffer method" was used to calculate recall and precision of identified intersections.

A road intersection can be viewed as the intersection of multiple road axes. Also, it is located at the overlapping area (called buffer) of these elongated road regions. Identified road intersections that fall within the buffer are deemed "correctly identified intersections." Using these terms, "recall" and "precision" may be defined as follows:

$$\text{Recall} = \frac{\text{Number of correctly identified intersections}}{\text{Number of intersections in the image}} \quad \text{(Eq. 3)}$$

$$\text{Precision} = \frac{\text{Number of correctly identified intersections}}{\text{Number of identified intersections}} \quad \text{(Eq. 4)}$$

FIG. 11 is a graph showing the impact of increasing area dimension. In this graph, area dimension increases from 60 m (i.e., 200 pixels in a 0.3 m/pixel image) to 180 m, with the incremental dimension value of 30 m. Precision and recall were calculated along with the normalized intersection detection running time (with respect to the running time using 180 m as an area dimension). The results show that the detection time dramatically increases as area dimension increases.

FIG. 11 further illustrates that precision decreases as the area dimension increases. This is because a larger area typically involves an increased number of road intersections that have similar shape as the road template (e.g., some urban areas contain roads which are distributed in a grid). In addition, there could a greater number of misclassified pixels (such as house roof pixels which have similar color to road pixels) for a larger area. This misclassification often results in detecting incorrect intersections. For the similar reasons, the recall also slightly decreases as the area dimension increases from 90 m to 180 m.

However, lowest recall is shown occurring when the dimension size was set to 60 m. This indicates that a dimension size of 60 m is not large enough to capture a significant number of positional displacements between the road vector data and the image. Therefore, based on these results, an area dimension size of 90 m may be optimal to identify intersections as control points on other neighboring areas. This is because setting the area dimension to 90 m resulted in achieving 84% precision and 64% recall. Although the precision percentage of the 90 m area dimension is slightly less than the 86% precision obtained using the 60 m area dimension, the recall of the 90 m area dimension has a considerably higher recall (64% vs. 52%).

A histogram-based classifier, such as that illustrated in FIGS. 8A and 8B, may generate fragmented results due to noisy objects on the roads, such as that caused by cars, tree-clusters, and building shadows. Furthermore, some non-road objects which have a color similar to road pixels might also be misclassified as a road. However, the LTM technique may be used to alleviate these problems by avoiding an exhaustive search of all the intersection points on the entire image, and by locating the intersection point on the image that is closest to the intersection point on the road network vector data. Moreover, this technique does not require a classifier to label each pixel for the entire region. Only the areas near the intersections on the image require pre-classification. In addition, LTM implies that the topology constraint (such as adjacency) is considered. This is because the template may be generated based on the connectivity of several road segments merging at the same intersection point.

Note that the objective of the histogram-based classifier is not to correctly classify every single pixel of the image as off-road or on-road. Instead, as long as a substantial number of on-road pixels are identified, which permits the intersection-shape on the image to be captured, LTM can successfully match it to the corresponding vector (intersection) template. Even if an entire intersection is missed, the entire conflation process may be successful as long as a sufficient number of intersections are identified.

In sum, the running time of the LTM technique is dramatically lower than traditional image processing techniques because image processing need only be performed on localized areas of the image. Furthermore, exploiting road direction information improves both the accuracy and efficiency of detecting road intersections in the image.

2.2 Filtering Control Point Pairs

Figure 13:
FIG. 13 provides an example of an image having three inaccurate control point pairs, which are each identified by a dashed-line circle.

As noted above, localized template matching (LTM) may produce inaccurate control point pairs because some image pixels (such as house roof pixels which have color similar to road pixels) may be misclassified as on-road pixels. FIG. 13 provides an example of an image having three such inaccurate control point pairs, which are each identified by a dashed-line circle. In this image, the rectangles denote intersection points on road network vector data, and the circles represent the corresponding intersection points identified on the image. A control point pair may be deemed "inaccurate" whenever the control point associated with the image (circle) exceeds a threshold distance (e.g., about 1-5 meters, or more) from an actual location of the intersection on the image.

Because the conflation process utilizes control point pairs to align the road network vector data with imagery, the presence of inaccurate control point pairs may reduce the accuracy of the alignment between these two datasets. Therefore, in accordance with an embodiment, it is desirable to filter out inaccurate control point pairs in order to maximize the accuracy of the alignment process.

In general, there is a significant amount of regularity in terms of the relative positions of the controls points across data sets. This is because individual errors are not corrected, but rather local transformations are determined across datasets that allow the integration of two separate data sources. More precisely, while there is no global transformation to align imagery and the road network vector data, in small areas, the relationship between the points on the imagery and the points on the vector data can be described by a transformation. The transformation can be attributed to the different projections, accuracies, or coordinate systems used in the imagery data and the vector data. Due to the above-mentioned nature of the datasets, in a small region, the control points on the imagery and the counterpart control points on the road network vector data may be related by similar transformations. Therefore, inaccurate control point pairs can be detected and removed from further consideration by identifying those pairs with significantly different spatial relationships, as compared to other nearby control point pairs.

A number of filtering techniques may be used to filter out inaccurate control point pairs. By way of non-limiting example, one such filtering technique will be referred to as vector median filter (VMF), which is presented by J. Astola et al. in a work entitled "Vector Median Filter," Proceedings of IEEE, Vol. 78(4): 678-689, 1990. The VMF technique is described in more detail in Section 2.2.1 below.

Another filtering technique, which is described in Section 2.2.2, will be referred to a distance-based outliers detector (DB-outliers detector). An example of a suitable DB-outlier detector which may be used in filtering control points in accordance with embodiments of the present invention is disclosed by E. M. Knorr et al. in "Distance-Based Outliers: Algorithms and Applications," The VLDB Journal, Vol. 8(3): 237-253, 2000.

Both the VMF and the DB-outliers detector utilize the same underlying property (that is, there is a significant amount of regularity in terms of the relative positions of the control point pairs across data sets), but use different mathematical models to accomplish their respective filtering processes.

2.2.1 Vector Median Filter (VMF)

Vector Median Filter (VMF) is a known mathematical tool that is used in signal processing to attenuate noise, and is a popular filter to remove noise in image processing. In general, the VMF views data points as vectors, and filters out data points with vectors significantly different from the median vector.

The relative position of the control points of each control point pair can be viewed as a vector, referred to herein as a "control-point vector." Assume first that N control point pairs are detected in a small area using, for example, the above-described LTM technique. Hence, there are N control-point vectors, which may be denoted as:

$$\vec{x}_i \mid \vec{x}_i = \overrightarrow{P_i Q_i} \ (i=1, 2, 3, \ldots N) \tag{Eq. 5}$$

where the tail $P_i$ is an intersection point on the vector dataset, and the head $Q_i$ is the (detected) corresponding point on the imagery.

Figure 14A:
FIG. 14A is an image having a distribution of control point pairs.
Figure 14B:
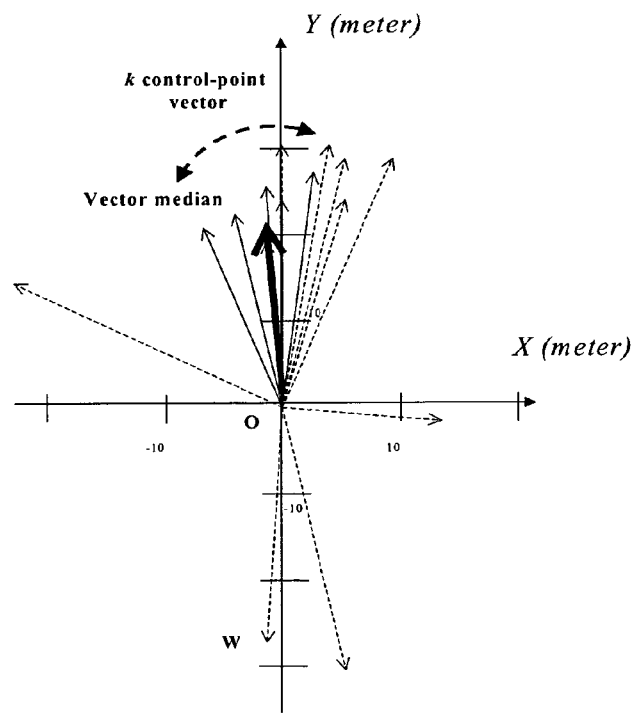
FIG. 14B is a graph showing the distribution of seventeen control point vectors, which are each associated with the control point pairs of FIG. 14A.

Since vectors are invariant under translation, it is convenient to consider the tail $P_i$ as located at the origin. Hence, the tail of each control-point vector coincides to the same origin. Control-point vectors for seventeen detected control point pairs of FIG. 14A are shown in the graph of FIG. 14B as arrows (vectors). Because the spatial inconsistencies between the imagery and the road network vector data in a local area are similar, the control-point vector whose direction and magnitude are significantly different from other vectors is characterized as an inaccurate control-point vector (i.e., an outlier). Due to the similarities of these control-point vectors, their directions and magnitudes can be represented by the vector median. The vector median filter may be modified to assist in identifying the control-point vectors that are significantly different. This modified filter may be used to obtain the best matching set of control point pairs.

The vector median of these N vectors $\vec{x}_i$ (i=1, 2, 3, ... N) may be defined as the vector $\vec{x}_{vm}$, such that:

$$\text{the sum } \sum_{i=1}^{N} \|\vec{x}_{vm} - \vec{x}_i\| \text{ is minimized} \tag{Eq. 6}$$

here $\| \ \|$ stands for $L_2$ norm (Euclidean distance); and $$\vec{x}_{vm} \in \vec{x}_i; i=1, 2, 3, \ldots, N. \tag{Eq. 7}$$

The vector median has similar properties as the median operation. Intuitively, the median vector is the vector that has the shortest summed distance (Euclidean distance) to all other vectors.

The inputs for a vector median filter are N vectors $\vec{x}_i$ (i=1, 2, 3, ... N), and the output of the filter is the vector median $\vec{x}_{vm}$. The output of vector median filter may be modified to accommodate not only $\vec{x}_{vm}$, but also the k closest vectors to the vector median. Distance D may be defined as:

$$D = \|\vec{x}_k - \vec{x}_{vm}\|_2 \text{ where } \vec{x}_k \text{ is the } k\text{-th closest vector to } \vec{x}_{vm}. \tag{Eq. 8}$$

Then, the output of the modified vector median filter is:

$$\{\vec{x}_i \mid \text{where } \|\vec{x}_i - \vec{x}_{vm}\| \leq D \text{ and } i=1, 2, 3, \ldots N\} \tag{Eq. 9}$$

As a result of the modified vector median filter (VMF), the k closest vectors to the vector median may be selected and the other control-point vectors filtered out. The possible value of k is an integer between 1 and N. Using relatively large values for k provides more control-point vectors, but may not filter out all inaccurate control point pairs. Using different values for k revealed that the modified VMF filter performs well when setting k to $$\left\lceil \frac{N}{2} \right\rceil.$$

Hence, the system kept the $$k = \left\lceil \frac{N}{2} \right\rceil$$

closest vectors to the vector median, and filtered out the remainder of the control point pairs. As a result, some accurate control-point vectors may be lost. However, the lost, but accurate, control point pairs typically do not significantly affect the conflation results since some of the selected control point pairs close to the lost accurate control point pairs have similar directions and displacements.

Figure 15:
FIG. 15 is an image containing dashed-lines which identify the control point pairs categorized as outliers by the modified VMF.

Referring still to FIG. 14A, to determine whether or not the control point pair that is identified by the dashed-line circle is an outlier, its corresponding control-point vector may be compared to other control-point vectors that are located nearby. The seventeen neighboring control-point vectors within a radius of 300 m, for example, to the identified control point pair are shown as arrows in FIG. 14B. The thickest arrow is the vector median among these control-point vectors. After applying the modified VMF described above, only the nine (k=9) closest vectors to the vector median are not categorized as outliers. As shown in the image of FIG. 15, the dashed-lines identify the control point pairs categorized as outliers by the modified VMF. The identified control point pair which is labeled "1" in this figure will be filtered out because its corresponding control-point vector (represented as $\overrightarrow{OW}$ in FIG. 14B) is categorized as an outlier. This process may be repeated to filter out the remaining outliers.

2.2.2 Distance-Based Outliers Detector

In general, misidentified control points may be located by finding the control-point vector that is extreme, relative to neighboring control-point vectors. One way to measure the "degree of extremity" of a specific control-point vector, relative to its neighbors, is to calculate the Euclidean distance between the vectors. Accordingly, as an alternative to utilizing the vector median to detect misidentified control points, this section presents a technique which utilizes a distance-based outliers detector (termed DB(p,D)-outliers detector). This detector is an example of a spatial outlier detector proposed by S. Shekhar et al. in "A Unified Approach to Spatial Outliers Detection," GeoInformatica, Vol. 7 (2003): 139-166, 2003.

For dataset T with N objects, an object O in T is a DB(p, D)-outlier if at least a fraction p of the objects in T lie greater than distance D from O. The DB(p, D)-outliers detector works based on the observation that control-point vectors that have similar directions and magnitudes tend to form clusters that exclude the extreme control-point vectors.

For example, reference is made to the control point pairs of FIG. 14A. To determine whether or not the identified control point pair 1 is an outlier using the DB(p, D)-outliers detector, its corresponding control-point vector would be compared to the neighboring control-point vectors. The seventeen neighboring control-point vectors within a radius of 300 m, for example, are shown in FIG. 14B as vector arrows. Consider the head point W of the control-point vector $\overrightarrow{OW}$ of the identified control point pair. When setting p to 50% and D to 15 m, there are only 12% of the head points of other control-point vectors located within 15 m to point W. Hence, point W is characterized as an outlier, and its corresponding control point pair (i.e., the identified control point pair 1 of FIG. 14A) is categorized as an outlier, which is to be filtered. This process may be repeated to filter out other outliers. The choice of p and D may depend on the application-specific costs of outlier-detection errors, and can be modified as required or desired.

Different configurations for p and D will usually produce different filtering results. Compared to the modified VMF, there is no similar set of parameters that require advance determination, although parameter k of the modified VMF may be adjusted to retain or filter out additional control points. However, consider a very inconsistent control-point vector set (e.g., none of the control-point vectors have similar direction and magnitude). The modified VMF is not the optimal filtering technique in this scenario since the modified VMF may misidentify an inaccurate control-point vector as the vector median. In contrast, with proper parameter configurations, the DB(p,D)-outliers detector can handle this relatively rare scenario.

2.3 Aligning Road Vector Data with Imagery

Finding, and optionally filtering, the control point pairs provides accurate data points for aligning imagery and road network vector data. Each pair of corresponding control points from these two datasets is associated with corresponding locations on the datasets. As discussed below, transformations may be calculated from the filtered control point pairs. Other points in both datasets may be aligned based on these transformations. A number of different techniques, such as Delaunay triangulation and piecewise linear rubber sheeting, may be used to find the appropriate transformations and transform corresponding features. An example of Delaunay triangulation is disclosed by M.D. Berg et al. in "Computational Geometry: Algorithms and Applications," Springer-Verlag, 1997, and an example of piecewise linear rubber sheeting is described by M. S. White and P. Griffin in "Piecewise Linear Rubber-Sheet Map Transformation," The American Cartographer, Vol. 12(2): 123-131, 1985.

As it applies to embodiments of the present invention, Delaunay Triangulation is discussed in Section 2.3.1, and piecewise rubber-sheeting is setout in Section 2.3.2. Moreover, a third technique to reduce spatial inconsistencies for areas without control point pairs is discussed in Section 2.3.3.

2.3.1 Space Partitioning Using Delaunay Triangulation

To achieve overall alignment of imagery and road network vector data, it is desirable for the road network vector data to be adjusted locally to conform to the imagery. Local adjustment is possible because small changes in one area usually do not affect the overall geometry of the road network vector data. To accomplish local adjustments, the domain space is partitioned into relatively smaller pieces based on accurately identified control point pairs. Then, local adjustments are applied on each individual piece. Triangulation is an effective strategy to partition the domain space into triangles to define local adjustments.

There are different techniques for utilizing control points to partition the space into triangles. One particular type of triangulation, Delaunay triangulation, is especially suited for conflation operations. Delaunay triangulation is a triangulation of the point set such that no point falls in the interior of the circumcircle of any triangle (the circle passing through the three triangle vertices). Delaunay triangulation maximizes the minimum angle of all the angles in the triangulation, thus avoiding triangles with extremely small angles. Delaunay triangulation may be performed with the set of identified control points on the road network vector data, resulting in a set of equivalent triangles with corresponding control points on the imagery.

Figure 16A:
FIGS. 16A-16C provide an example of Delaunay triangulation performed on several detected control point pairs.
Figure 16B:
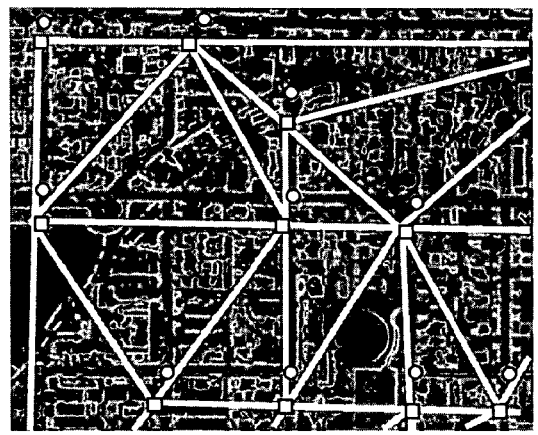
Figure 16C:
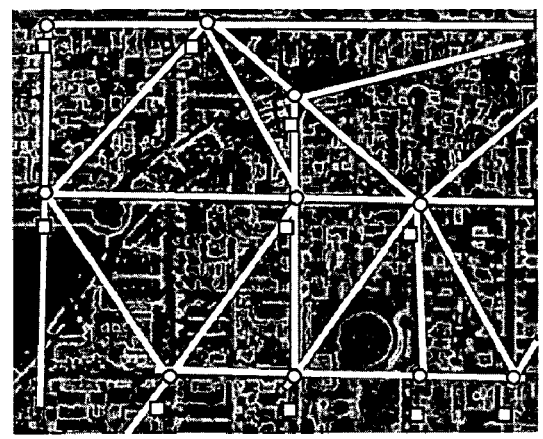

FIGS. 16A-16C provide an example of Delaunay triangulation performed on several detected control point pairs. FIG. 16A depicts an image with the original road network shown in white lines. A number of control point pairs are shown. Each control point pair includes a rectangle, which represents a control point on the road network vector data, and a circle, which represents a corresponding control point pair on the image. FIG. 16B shows an image with Delaunay triangulation, which was generated based upon the detected control points on the road network vector data. Similarly, FIG. 16C shows an image with Delaunay triangulation, which was generated based upon the detected control points on the image.

Delaunay triangulation may be performed in O(n*log n), in the worst case, where n is the number of control point pairs. The details of the Delaunay triangulation process are well-known, and need not be further described.

2.3.2 Piecewise Linear Rubber-sheeting

Piecewise linear rubber-sheeting is a technique which forces registration of control points over the road network vector data with their corresponding points on the imagery. Piecewise linear rubber-sheeting may be imagined by stretching a vector map as if it were made of rubber.

In general, there are two steps to the rubber sheeting process. First, the transformation coefficients (i.e., the affine transformation that is composed of translation, rotation, and scaling), which are used to map each Delaunay triangle on the vector data onto its corresponding triangle on the imagery, are calculated. Second, the same transformation coefficients may be applied to transform the endpoints of each vector line segment within each Delaunay triangle to the imagery.

Figure 17A:
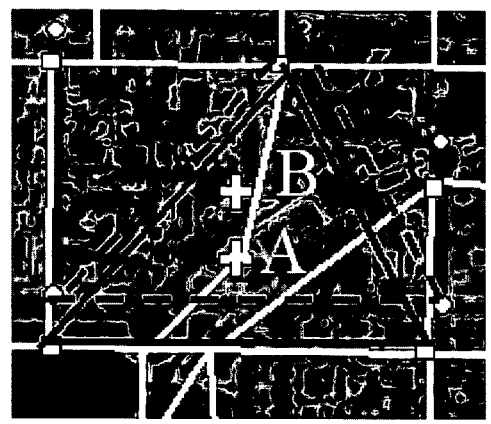
FIG. 17A is an image containing two corresponding Delaunay triangles formed by three corresponding control point pairs.
Figure 17B:
FIG. 17B is an image containing a conflated road network.

In FIG. 17A, the white lines represent the road network. The rectangles represent the control points on the road network vector data, and the circles depict the corresponding control points on imagery. The two triangles shown are Delaunay triangles formed by three corresponding control point pairs. One endpoint, endpoint A, of the original road segments is located within the triangle on the road network vector data. The rubber-sheeting technique transforms endpoint A to point B on the imagery. Consequently, point B becomes a road endpoint on the imagery. A conflated road network may be constructed by connecting these transformed endpoints, such as that shown in FIG. 17B.

It is recognized that piecewise linear rubber sheeting based on triangles with extremely small angles (i.e., long and thin triangles) often results in distorted conflation lines. However, since Delaunay triangulation typically avoids triangles with extremely small angles, this problem is averted.

2.3.3 Region Expansion

Another technique which may be used to reduce spatial inconsistencies for regions without feature points (e.g., an intersection point) on the road network vector data and imagery will be referred to herein as region expansion. This technique estimates new control points based on existing control points using the boundary of the conflation area, an example of which is the convex hull depicted in FIG. 18A. This convex hull is shown formed by various control points, resulting in polygon ABDEFGHI.

Using these new control points, the original conflation area in which the control points may be found can be expanded. One computation for performing region expansion is estimating the new control points from the Delaunay triangles closest to the boundary of the conflation area. Intuitively, this estimation is based on the assumption that the displacements between intersections in the vector data and the corresponding points in the imagery are similar in relatively small areas.

Figure 18A:
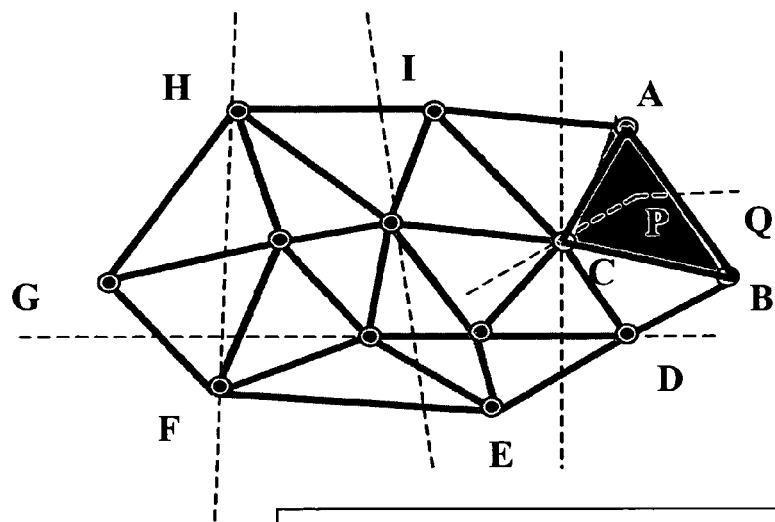
FIG. 18A depicts a convex hull associated with region expansion.
Figure 18B:
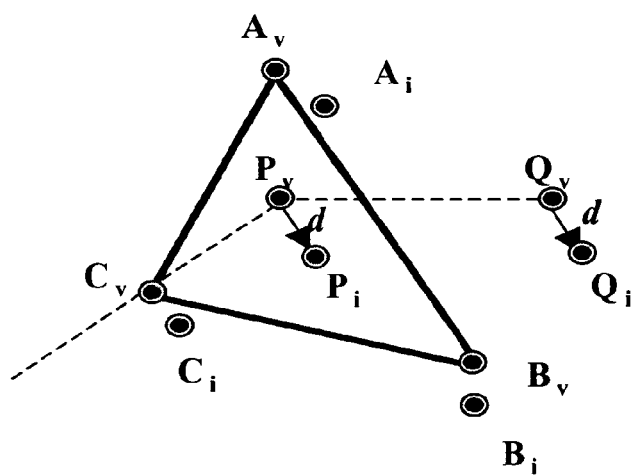
FIG. 18B is a detailed view of control point distributions of the three vertices of triangle $\triangle ABC$.

Referring now to the example illustrated by FIGS. 18A and 18B, the Delaunay triangle vertices are the control points on the road network vector data, and the dashed-lines represent a partial road network. The shaded Delaunay triangle $\triangle ABC$ is a boundary triangle (i.e., a triangle with at least one edge that is not shared with any adjacent triangles). FIG. 18B is a detailed view of control point distributions of the three vertices of triangle $\triangle ABC$, in which $A_v$, $B_v$, and $C_v$ denote control points on vector data, and $A_i$, $B_i$, and $C_i$ respectively correspond to control points on the underlying image. Endpoint $P_v$ (within $\triangle ABC$) is an endpoint of road segment $\overline{P_v Q_v}$ on the road network (i.e., dashed lines), and $P_i$ is the corresponding point on imagery after applying the rubber-sheeting transformation. To generate a new control point from the control point convex hull, it is desirable to find a point on the road network, along with its corresponding point on the imagery.

The term $Q_v$ (which is another endpoint of the segment $\overline{P_v Q_v}$) is a good candidate as a control point on the road network vector data. Furthermore, in a relatively small area, displacements between intersections in the road network vector data and corresponding points in the imagery are typically very similar. Accordingly, the corresponding point $Q_v$ on the imagery (i.e., $Q_i$) may be estimated by adding the same displacement (noted as d in FIG. 18B) as that between $P_v$ and $P_i$. Hence, a new control point pair (i.e., $Q_v$ and $Q_i$) is obtained. Delaunay triangulation and rubber-sheeting may then be applied to the original and newly-added control point pairs. Region expansion works effectively for areas in which the positional discrepancies between vector data and imagery are similar.

2.4 Performance Evaluation

This section evaluates the above-described conflation techniques by conducting several experiments on various, exemplary, real-world data. The tested datasets are described in detail in Section 2.4.1. These experiments validate that AMS-conflation significantly improves the alignment of road network vector data with orthoimagery. Section 2.4.1 describes the experimental setup and the various datasets implemented. Section 2.4.2 presents one evaluation methodology which may be used to measure the performance improvement. Section 2.4.3 discusses the results of these experiments.

2.4.1 Experimental Setup

By way of non-limiting example, two types of datasets were used for the experiments; namely, orthoimagery and road network vector data. The imagery which was used includes georeferenced USGS high resolution color orthoimagery with 0.3 m/pixel resolution, and georeferenced USGS gray-scale DOQ imagery with 1 m/pixel resolution. In particular, the tested imagery included color imagery that depicts a portion of the county of St. Louis, Mo., and gray-scale imagery that depicts a portion of the city of El Segundo, Calif. Imagery may be obtained from existing image sources including, for example, the web-based Microsoft TerraService.

Road network vector data may be obtained from a number of different sources including TIGER/Lines, NAVSTREETS, and MO-DOT. TIGER/Lines data was developed by the U.S. Bureau of Census. This data includes extractions of selected geographic and cartographic information from the TIGER/Line database. The description provided herein is primarily focused on road networks queried from TIGER/Line files, but such teachings apply equally to other data sources which provide the desired vector data.

NAVSTREETS is a commercial product available from NAVTEQ, and includes high quality road network vector data with highly accurate geometry. This data source is regularly updated by NAVTEQ using base maps acquired from a variety of sources including local governments, commercial mapping agencies, and other public agencies. NAVSTREETS data is often used for car navigation systems and road route planning. Many online street map services, such as MapQuest, utilize NAVSTREETS as the base dataset for route planning.

MO-DOT refers to the road network data provided by the Missouri Department of Transportation. Similar to NAVSTREETS, MO-DOT also provides high quality road network vector data.

The road network vector data sources listed above typically has rich attribution. However, TIGER/Lines data often suffers from both poor positional accuracy and road geometry. With regard to the TIGER/Lines and MO-DOT data, the number of lanes may be inferred from the attribute "CFCC (Census Feature Class Codes)" associated with each road segment, while the number of lanes may be obtained from the attribute "LANE_CAT" in the NAVSTREETS data. Furthermore, the locations of road intersections, and the road directions around each intersection, may be calculated by analyzing these road networks using the various techniques described above in Section 2.1.1.

Figure 19A:
FIG. 19A depicts original TIGER/Lines road vectors with an associated image.
Figure 19B:
FIG. 19B depicts original NAVSTREETS road vectors with an associated image.
Figure 19C:
FIG. 19C depicts original MO-DOT road vectors with an associated image.

In general, NAVSTREETS and MO-DOT provide high quality road vectors, but with varying accuracy levels. FIGS. 19A-19C are sample images which illustrate various spatial inconsistencies between the USGS high resolution color imagery and the three different types of road vectors. In these figures, the white lines depict various types of original road vectors superimposed with USGS color imagery. More specifically, FIG. 19A depicts original TIGER/Lines road vectors with an associated image; FIG. 19B depicts original NAVSTREETS road vectors with an associated image; and FIG. 19C depicts original MO-DOT road vectors with an associated image.

In accordance with an embodiment, a user may specify the following parameters: two datasets to conflate (e.g., "imagery and TIGER/Lines," "imagery and NAVSTREETS" or "imagery and MO-DOT"), and the type of filtering technique that is desired. The generated output is a set of conflated roads for some or all of the three different types of road network vector datasets. The various locations identified in the table of FIG. 20 were analyzed, thus providing an example of a practical application of vector-imagery conflation on real world data.

2.4.2 Evaluation Methodology

The performance of AMS-conflation may be evaluated by comparing manually drawn reference roads with conflated roads. An evaluation schema was also developed. This schema measured: (1) the percentage of the reference roads in imagery for which the system generated conflated roads; (2) the percentage of correctly conflated roads with respect to the total conflated roads; and (3) the percentage of the total length of the conflated roads that is within a specific distance of the reference roads. Lastly, the conflated road network was compared with the reference road network.

A number of different methodologies have been devised to evaluate extracted roads against actual roads, including the techniques disclosed by W. A. Harvey in "Performance evaluation for road extraction," The Bulletin de la Societe Francaise de Photogrammetrie et Teledetection, Vol. 153(1999-1): 79-87, 1999, and C. Wiedemann et al. in "Empirical Evaluation of Automatically Extracted Road Axes," Proceedings of the IEEE Computer Society Workshop on Empirical Evaluation of Computer Vision Algorithms, Santa Barbara, Calif., IEEE Computer Society, Jun. 21-22, 1998. Because of the natural similarity between the problem of evaluating extracted roads, and the problem of evaluating conflated roads, these existing techniques may also be used to evaluate the AMS-conflation results. As an example, the discussion below adapts the above-noted "road-buffer method" proposed by C. Wiedemann. The road-buffer method is conventionally utilized to measure the accuracy of automatically extracted roads with respect to actual (real) roads. However, this method has been revised herein to measure the accuracy of conflated roads with respect to actual roads.

According to the generally understood road-buffer method, the comparison of two road networks, and in particular the reference road network and the conflated road network, includes a first step that splits both networks into short pieces of equal length. Then, as shown in FIGS. 21A and 21B, a constant predefined buffer width may be constructed around the reference road network.

Optimally, each portion of the conflated road network within a given distance (i.e., the buffer width "w") from the reference road network is considered a match. Furthermore, the direction difference between the matched and reference road axes is generally less than a pre-defined threshold d, which is shown as 20°. One drawback of this procedure is that the performance may be affected by the predefined constant buffer width. Accordingly, instead of using the constant buffer width for each road segment, the real road widths in the imagery may alternatively be used as the buffer. Using this technique, roads with different widths have different buffer widths. The pieces of the conflated roads which are located within the buffer width relative to the reference road, and which have consistent direction, are considered a match.

Figure 21A:
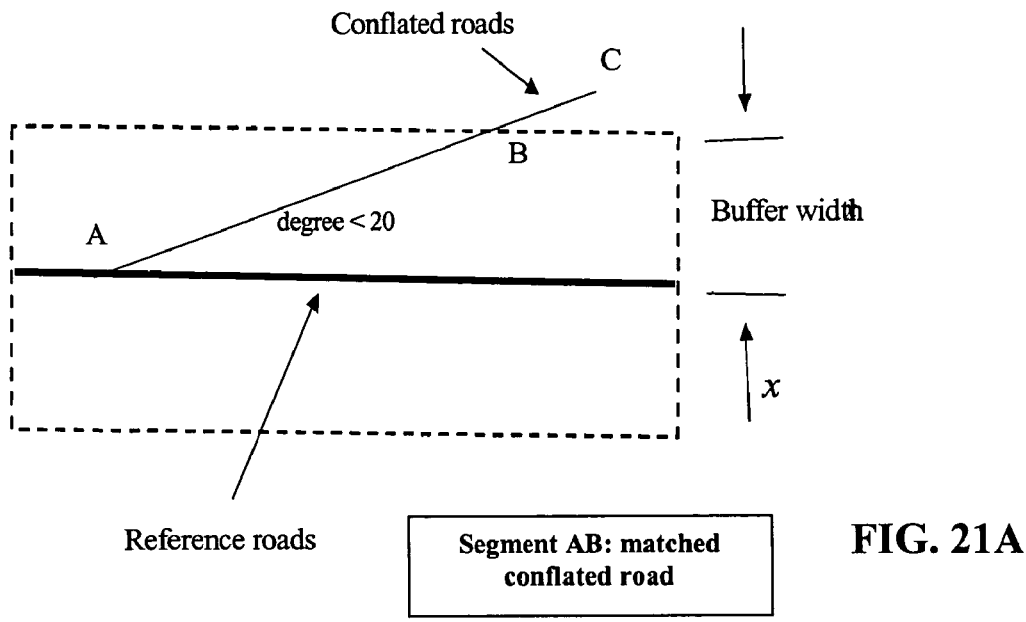
FIG. 21A shows an example of a matched conflated road, with respect to a reference road.
Figure 21B:
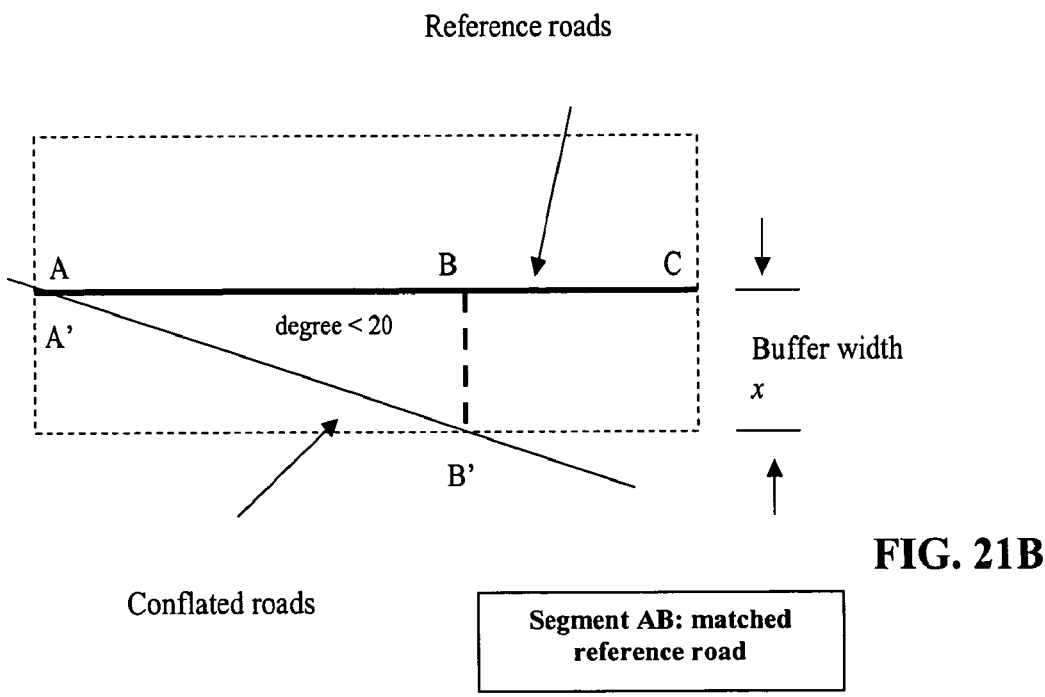
FIG. 21B shows an example of a matched reference road with respect to a conflated road.

FIG. 21A shows an example of a matched conflated road, with respect to a reference road. In this figure, segment AB is a matched conflated road, while segment BC is not a matched road. FIG. 21B shows an example of a matched reference road with respect to a conflated road. In this figure, segment AB is categorized as a matched reference road since the conflated road segment A'B' can be used to "complete" the reference road segment AB. Segment BC, in FIG. 21B, is an unmatched reference road.

Using this terminology, two measurements, completeness and correctness, may be defined as follows:

$$\text{Completeness} = \frac{\text{Length of matched reference roads}}{\text{Total length of reference roads}} \quad \text{(Eq. 10)}$$

$$\text{Correctness} = \frac{\text{Length of matched conflated roads}}{\text{Total length of conflated roads}} \quad \text{(Eq. 11)}$$

In these equations, completeness is defined by the percentage of the reference roads that is present in imagery for the generated conflated roads. On the other hand, correctness is defined by the percentage of correctly conflated roads with respect to the total conflated roads. However, another measurement known as RMS (root-mean-square error), as described in, for example, the above-noted publication by C. Wiedemann, does not meet the requirements to compute how far the conflated road network is from the reference road network. This is because RMS only measures how far the matched conflated road network is from the reference road network. Instead of computing a number (e.g., average distance) to illustrate the relative distance between two networks, alternative measurements may be obtained. For example, one such measurement includes the identification of the percentage of the total length of the conflated roads that are within a specified distance x relative to the reference roads (e.g., 95% of the conflated roads are within five meters of the reference roads or 50% of the conflated roads are within 3-6 meters of the reference roads). The method proposed by M. F. Goodchild et al. in "A simple positional accuracy measure for linear features," International Journal of Geographical Information Science, Vol. 11(3): 299-306, 1997, for example, is one technique that may be used to assess positional accuracy.

Figure 22:
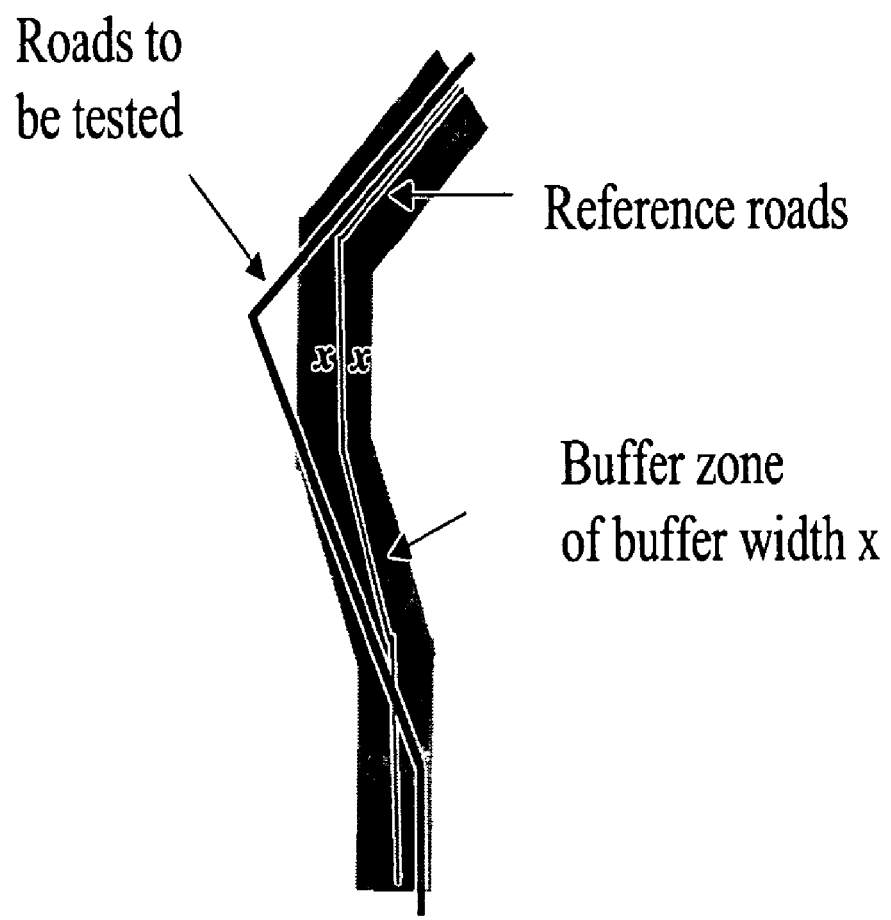
FIG. 22 provides an example of a positional accuracy evaluation.

FIG. 22 provides an example of a positional accuracy evaluation, and includes a buffer having width x around the reference road network. Once the buffer is positioned around the reference road network, the proportion p of the conflated roads that lies within the buffer may be computed using, for example, the just-noted technique by M. F. Goodchild. Using this technique, only the distance difference between two roads is considered. The errors due to the difference of directions between roads are captured by the completeness and correctness measurements.

By way of example, the following experiments were conducted on test area 1, 2, and 3, as identified in the chart of FIG. 20.

In an initial operation, a histogram was learned from nearly 500 manually labeled rectangles obtained from color orthoimages covering partial areas of the County of St. Louis, Mo. FIGS. 8A and 8B depict the learned histogram. In another operation, AMS-conflation was performed to conflate each image area with three different types of road network vector data (TIGER/Lines, NAVSTREETS, and MO-DOT).

Figure 23:
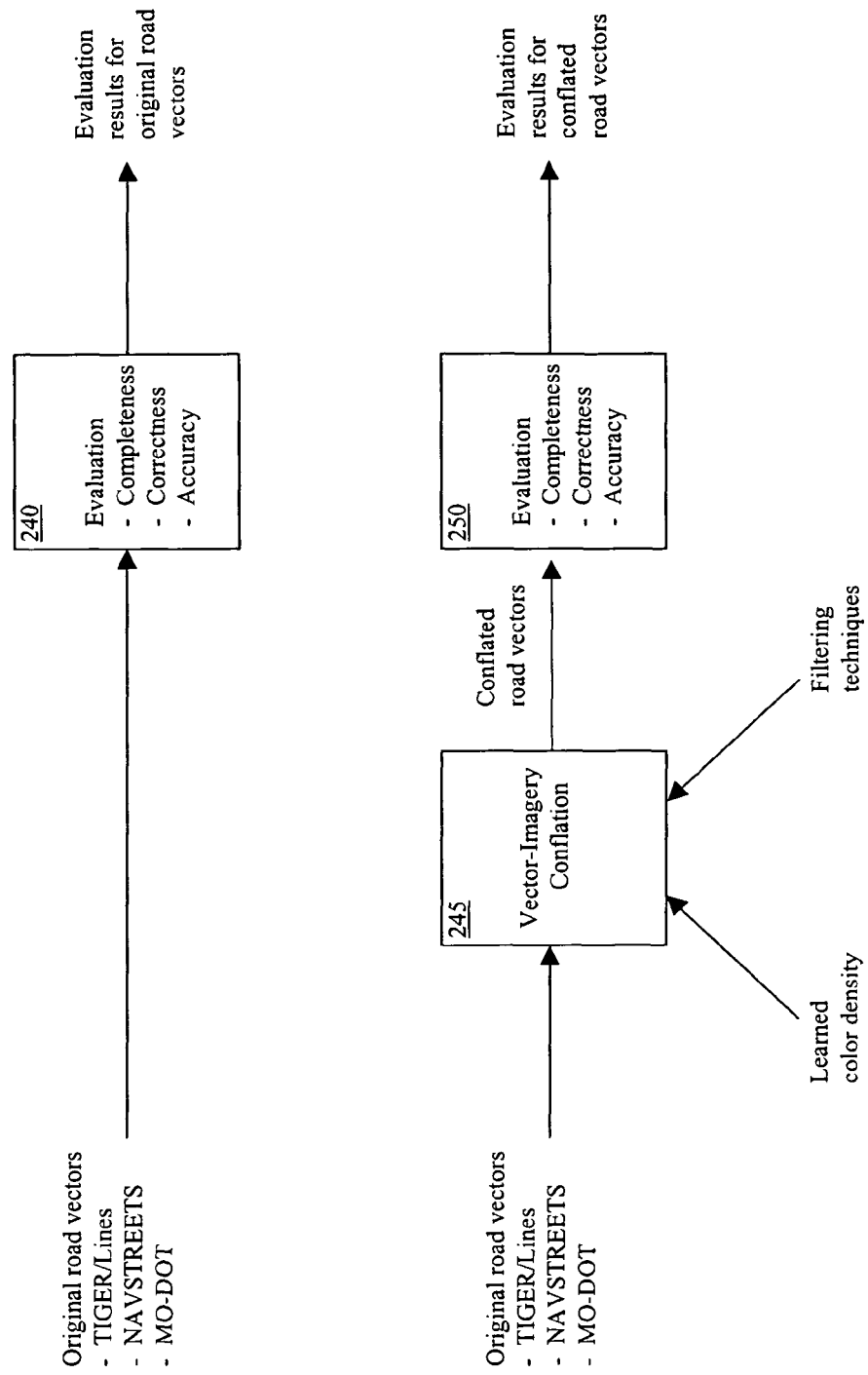
FIG. 23 is a flowchart providing an overview of a process for evaluating the performance of vector-imagery conflation, in accordance with an embodiment of the present invention.

FIG. 23 is a flowchart proving an overview of a process for evaluating the performance of vector-imagery conflation, in accordance with an embodiment of the present invention. This performance evaluation measured the accuracy of conflated road vectors generated by AMS-conflation, relative to original road vectors. These measurements were performed for test areas 1, 2, and 3.

As shown in this figure, original road vectors (TIGER/Line, NAVSTREETS, and MO-DOT) were individually evaluated based upon completeness, correctness, and positional accuracy (block 240). This evaluation produces evaluation results for each of the three types of original road vectors.

In block 245, AMS-Conflation was performed for each of the three original road vectors (TIGER/Line, NAVSTREETS, and MO-DOT). The AMS-Conflation process utilized, as described above, learned color density and filtering techniques. The conflated road vectors were then individually evaluated based upon completeness, correctness, and positional accuracy (block 250). The evaluation process of block 250 produced evaluation results for each of the three types of conflated road vectors.

Lastly, the evaluation results for conflated road vectors (generated by block 250) were then compared with the evaluation results for the original road vectors (generated by block 240). In addition, the quality of the detected control points were also measured (before and after applying filtering techniques) using the precision and recall metrics defined in Eq. (3) and Eq. (4) of Section 2.1.2.2

For test area 4, which covered portions of the city of El Segundo, Calif., the above process was essentially repeated, but the road color information was learned from black-white images that covered portions of El Segundo, and only TIGER/Lines data was conflated.

2.4.3 Experimental Results and Interpretations

Similar conflation performance was obtained for the two filtering techniques: VMF and DB(p,D)-outliers detector (using 50% for p and 15 m for D). Therefore, in this section, VMF will be used as the filtering technique to illustrate the conflation results.

2.4.3.1 Results of Precision and Recall of Identified Intersections

As previously noted, finding accurate control point pairs is a useful part of the conflation process since the other points in both datasets (i.e., road network vector data and imagery) may be aligned based on these control point pairs. Hence, LTM performance may be evaluated by calculating the precision and recall (the metrics are defined in Eq. (3) and Eq. (4) of Section 2.1.2.2) of the detected control points (before and after applying the optional filtering process). The results of these calculations are set out in the tables of FIGS. 24A-24C. Specifically, FIG. 24A shows precision and recall of identified intersections for TIGER/Lines; FIG. 24B shows precision and recall of identified intersections for NAVSTREETS; and FIG. 24C shows precision and recall of identified intersections for MO-DOT. These figures also include precision and recall calculations of the original road network to demonstrate that the LTM technique improved both precision and recall of original vector data.

As shown in FIGS. 24A-24C, LTM performed differently for various real world scenarios. This is because these vectors have different qualities, and the orthoimagery tested had various levels of complexity. Hence, high precision control points (up to 98%) were obtained in some areas (such as test area 1), while medium precision control points (about 70%) were obtained in other areas (such as the alignment of TIGER/Lines and imagery in test area 3). In general, precision was improved after applying the optional filtering techniques, although the filtering operation typically reduces the recall. However, for the conflation process, higher precision is typically more important than higher recall since the present invention does not necessarily correct individual errors, but rather determines local transformations that allow integration of road network vector data and imagery.

2.4.3.2 Results of Completeness and Correctness of Conflated Roads

Figure 25A:
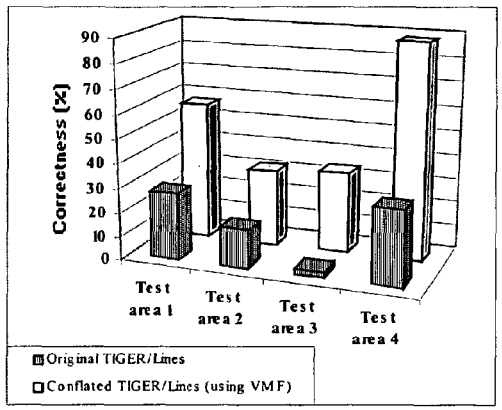
FIGS. 25A-25F are graphs showing experimental results of completeness and correctness for each vector dataset, and in particular, for TIGER/Lines, NAVSTREETS, and MO-DOT.
Figure 25B:
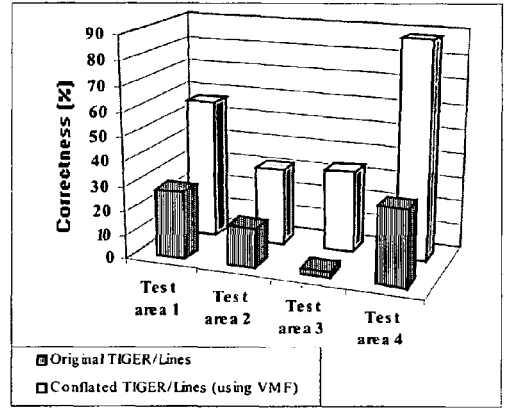
Figure 25C:
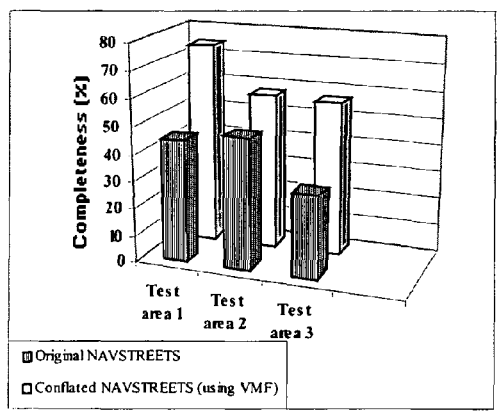
Figure 25D:
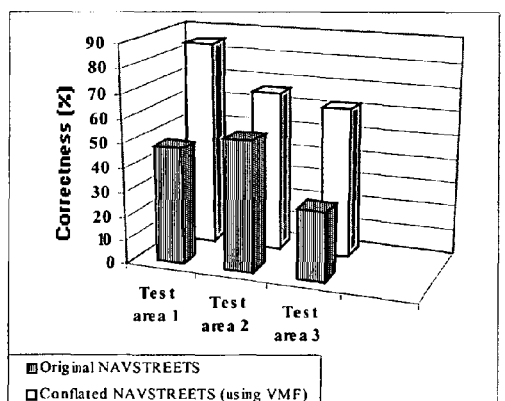
Figure 25E:
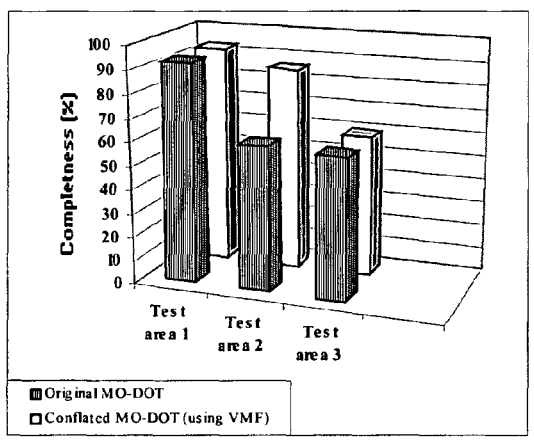
Figure 25F:
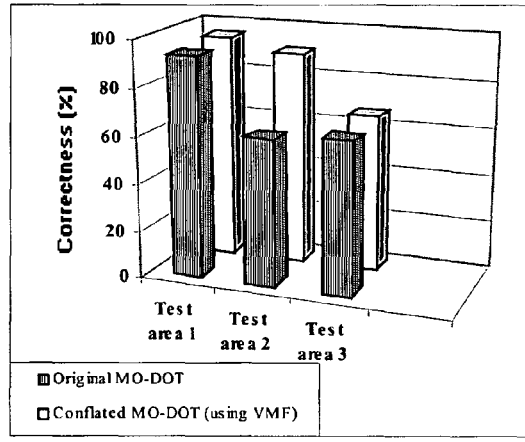

FIGS. 25A-25F are graphs showing experimental results of completeness and correctness for each vector dataset, and in particular, for TIGER/Lines (FIGS. 25A and 25B), NAVSTREETS (FIGS. 25C and 25D), and MO-DOT (FIGS. 25E and 25F). Intuitively, the completeness assessment corresponds to the demands of a typical user. For instance, a user may want to know how much of the original road network or the conflated road network is missing. The correctness, on the other hand, is related to the percentage of the original or conflated road segments that could be considered reference road segments.

In these figures, the X-axis represents original and conflated data for the four tested areas: test area 1, test area 2, test area 3, and test area 4. In FIGS. 25A, 25C, and 25E, the Y-axis represents the completeness for original road vectors and conflated road vectors using VMF-filtered intersections as control points. In FIGS. 25B, 25D, and 25F, the Y-axis represents the correctness for original road vectors and conflated road vectors.

For example, as shown in FIGS. 25A and 25B, the VMF-filtered intersection points were utilized to generate conflated TIGER/Lines for test area 1 (on color images depicting portions of the county of St. Louis, Mo.). This approach improved the completeness from 19% to 59%, and correctness from 25% to 55%. The results for test area 4, which is also shown in FIGS. 25A and 25B, showed improvement in completeness and correctness that is about 2.5 times better that the original TIGER/Lines (on black-white images depicting a portion of the city of El Segundo, Calif.).

In addition, there are some immediate observations from these figures. First, the data quality of MO-DOT generally appears to be superior to NAVSTREETS, and much better than TIGER/Lines. Moreover, from the diverse completeness and correctness in each road network vector dataset for each of the different test areas, it appears that each vector dataset has various degrees of accuracy. This is also consistent with the road network vector data quality statements provided by the data providers.

Second, consider TIGER/Lines as the vector data source. The shapes and geometry of the original TIGER/Lines are often inconsistent with the corresponding roads in the imagery. Hence, as shown in FIG. 24A and FIGS. 25A-25B, low completeness and correctness was obtained for original TIGER/Lines, and low precision and recall was obtained for the intersections of original TIGER/Lines. For a particular road segment, if the shape of the original vector data is inconsistent with roads in the imagery (as in the example of TIGER/

Lines), the approach presented herein may not align this data with sufficient accuracy, although the majority of intersections might be aligned. The primary reason for this is that the matching is performed at the point level, not at the edge level.

As illustrated by the TIGER/Lines in test area 1 (FIG. 24A), the present invention improved the node (intersection) alignment (as the precision improved from original 7% to 87.1%), while it achieved completeness from 19.1% to 55%, and correctness from 20.6% to 55%. However, not only has the imagery quality been recently enhanced, but the quality of vector data has also significantly improved. Consider the conflation of high quality imagery and high quality vector data, such as NAVSTREETS. The road shapes of NAVSTREETS are very similar to the road shapes in the imagery. Hence, the primary issue is that there are some local inconsistencies between these datasets. AMS-conflation will typically capture these local transformations (based on intersection to intersection matching information) and maintain the road shapes.

Third, on average, good improvements were achieved for TIGER/Lines (as shown in FIGS. 25A and 25B). For NAVSTREETS, the present invention performed 1.3 to 1.9 times better than the original data, as shown in FIGS. 25C and 25D, while only marginal improvements for MO-DOT data were achieved on test areas 1 and 3 (FIGS. 25E and 25F). This is due to high completeness (92.54%) and correctness (93.38%) of the original MO-DOT data in test area 1. Experimental results indicated that some roads did not align well around highways in test area 3. The road widths of highways vary and are difficult to predict. This problem may be addressed by integrating other information sources with those details. In fact, after visual examination, many misaligned road segments were discovered close to the margins of road buffers (i.e., roadsides). Accordingly, relaxing the "buffer-widths" will likely result in higher completeness and correctness. This kind of assessment is illustrated by the "positional accuracy" evaluation described below.

2.4.3.3 Results of Positional Accuracy of Conflated Roads

Figures 26D, 26E, 26F:
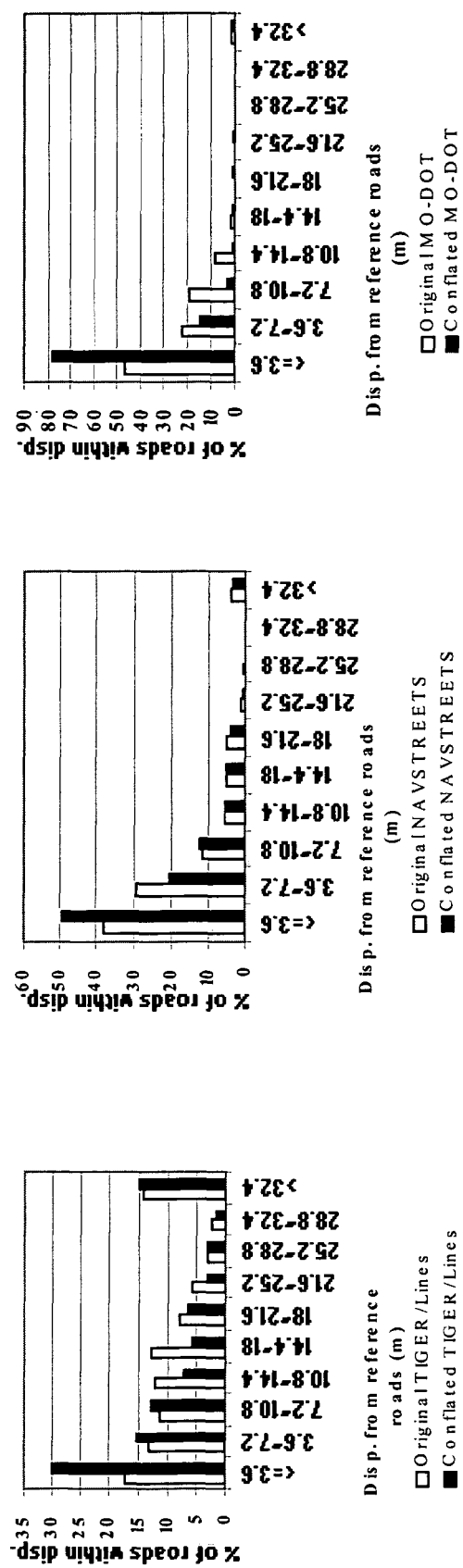

FIGS. 26A-26I illustrate experimental test results for test areas 1-3, and include results of "positional accuracy" categorized by road vectors for these test areas. Specifically, FIGS. 26A-26C provide positional accuracy for test area 1, FIGS. 26D-26F provide positional accuracy for test area 2, and FIGS. 26G-I provide positional accuracy for test area 3. Intuitively, positional accuracy corresponds to the typical demands of a user, that is, how far is the conflated road network from the centerline of the real (reference) road network. Displacements between two networks were evaluated by gradually increasing the buffer-widths constructed around the reference road network. The buffer-width was increased by 3.6 meters (i.e., the U.S. standard lane width).

The X-axis of FIGS. 26A-26I includes displacement values which are grouped every 3.6 m. The Y-axis of these figures provides the percentage of conflated roads lying within the displacement range represented by the X-axis. For example, FIG. 26B shows that when utilizing VMF-filtered intersection points to generate conflated NAVSTREETS for the first test area, about 75% of the conflated roads are within 3.6 m from the reference roads, and only 35% of the original NAVSTREETS are within this 3.6 m displacement. Although the present invention does not typically achieve significant improvements on completeness and correctness for MO-DOT data (as stated earlier), it achieves better positional accuracy. On average, 91% of the conflated MO-DOT roads are within 7.2 m of the reference roads, compared to 80.3% of the original MO-DOT.

Even higher improvements may be achieved for TIGER/Lines and NAVSTREETS. On average, 76% of conflated NAVSTREETS are within 7.2 m displacement, versus 54.6% of original NAVSTREETS, 53.9% of conflated TIGER/Lines, and 25.9% for the original TIGER/Lines. In particular, compared to NAVSTREETS and MO-DOT data, TIGER/Lines has relatively poor positional accuracy and geometry because relatively large portions of curve-shaped roads were simplified as straight lines. For such severely distorted original TIGER/Line segments, the present invention is somewhat limited in aligning imagery curves and vector lines, although the detected intersections are able to be matched (as shown in FIG. 24A). Hence, only about 47% of conflated TIGER/Lines in test area 2 and 3 are within 7.2 m of the reference roads, while 70% to 85% of conflated NAVSTREETS and MO-DOT are within 7.2 m. However, compared to the original TIGER/Lines, the present invention significantly improved positional accuracy.

In the first test area, about 25% of the streets are in grid shape, and all three road vectors (TIGER/Lines, NAVSTREETS, and MO-DOT) provide accurate road shapes over these street grids. Therefore, more accurate performance was obtained in test area 1 since it contained a significant percentage of streets in a grid shape. The issue of quality of the road network vector data may be addressed by starting with higher quality data such as NAVSTREETS or MO-DOT data. However, there typically still remains a small portion of conflated roads which do not align well to certain types of imagery. This is mainly because the color of these misaligned roads are different from what the system learned, or the roads are close to the conflation area margins where long and thin Delaunay triangles were constructed. In accordance with an embodiment, these issues may be alleviated by providing additional training to recognize a wider range of road colors, and applying conflation on larger areas.

Figure 27:
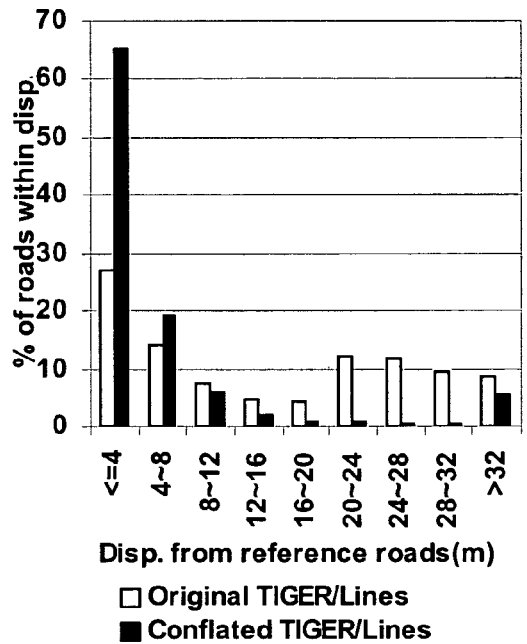
FIG. 27 is a graph showing a positional accuracy assessment for test area 4.

FIG. 27 shows test area 4 achieved high improvement for TIGER/Lines. More specifically, 85% of conflated TIGER/Lines are within 8 meters displacement, versus 43% of original TIGER/Lines. This demonstrates the utility of embodiments of the present invention which may be used to conflate vector data using black-white, lower resolution, imagery.

2.4.3.4 Results of Using Filtered Control Points Versus Using Unfiltered Control Points Finally, the performance of the conflation process was compared with filtered and unfiltered control points. These measurements identified the positional accuracy, for test area 2, of the original MO-DOT and the conflated MO-DOT.

Figure 28:
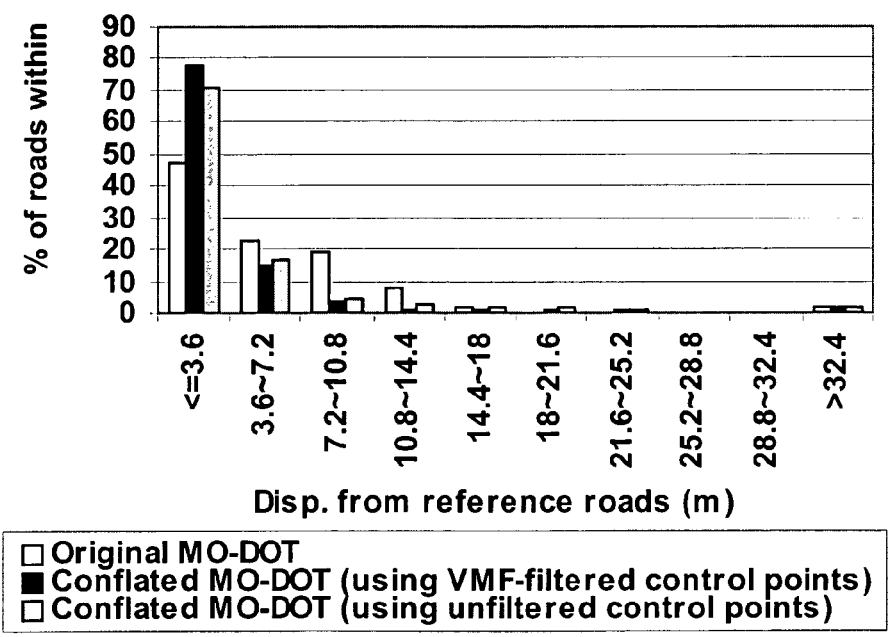
FIG. 28 is a graph showing a comparison of filtered and unfiltered conflation results for test area 2.

FIG. 28 is a graph showing conflated roads generated by filtered control points outperformed those generated by unfiltered control points, especially for displacements greater than 7.2 m. This is because the conflation process does not require a large number of control point pairs to perform an accurate alignment. Therefore, the conflation performance (as illustrated in FIGS. 25A-25F and 26A-26I) only needs to consider the filtered control points.

2.4.3.5 Execution Time and Results

Since the running time of AMS-conflation is primarily dominated by the LTM routine to detect road intersections, the running time of LTM was used as the overall execution time (the query time for retrieving images or vector datasets was not included). On average, the execution time for locating an intersection in a localized area was about three to five seconds (it depends on the radius setting for LTM). For example, the total running time for generating conflated roads for a small area of 900 m by 900 m with 20 intersections is about one minute.

Figure 29A:
FIG. 29A depicts conflated TIGER/Lines vector data with color imagery.
Figure 29B:
FIG. 29B depicts conflated NAVSTREETS vector data with color imagery.
Figure 29C:
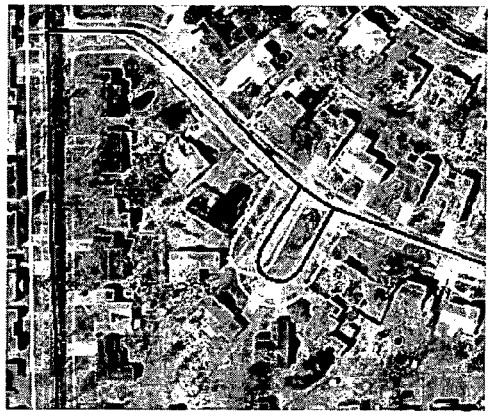
FIG. 29C depicts conflated MO-DOT vector data with color imagery.
Figure 29D:
FIG. 29D depicts TIGER/Lines vector data with black-white imagery.

The experimental results indicate that the present invention automatically and efficiently improves the alignments of various types of road network vector datasets (TIGER/Lines, NAVSTREETS, and MO-DOT) with imagery. FIGS. 29A-29D are sample images for which conflation has been applied, using one of the three types of road network vector data. More specifically, FIG. 29A depicts conflated TIGER/Lines vector data with color imagery, FIG. 29B depicts conflated NAVSTREETS vector data with color imagery, FIG. 29C depicts conflated MO-DOT vector data with color imagery, and FIG. 29D depicts TIGER/Lines vector data with black-white imagery. In these figures, the white lines represent the original road network, and the black lines represent the conflated road network.

3.0 Conflation of Street Maps and Orthoimagery

In addition to road vector datasets and orthoimagery, as discussed above, raster maps are another type of geospatial dataset that is readily available from online map services such as Yahoo Map Service, MapQuest, and Microsoft TerraService, among others. Some services, such as the TerraService, display imagery and related maps in separate frames. However, these services generally do not have the capability to automatically align imagery and maps in a single framework. Presented below is an approach to conflate raster maps (such as streets maps) with geospatial data (such as orthoimagery). This conflation process may be used to generate or create a georeferenced raster map that aligns with geospatial data (such as orthoimagery).

Figure 30:
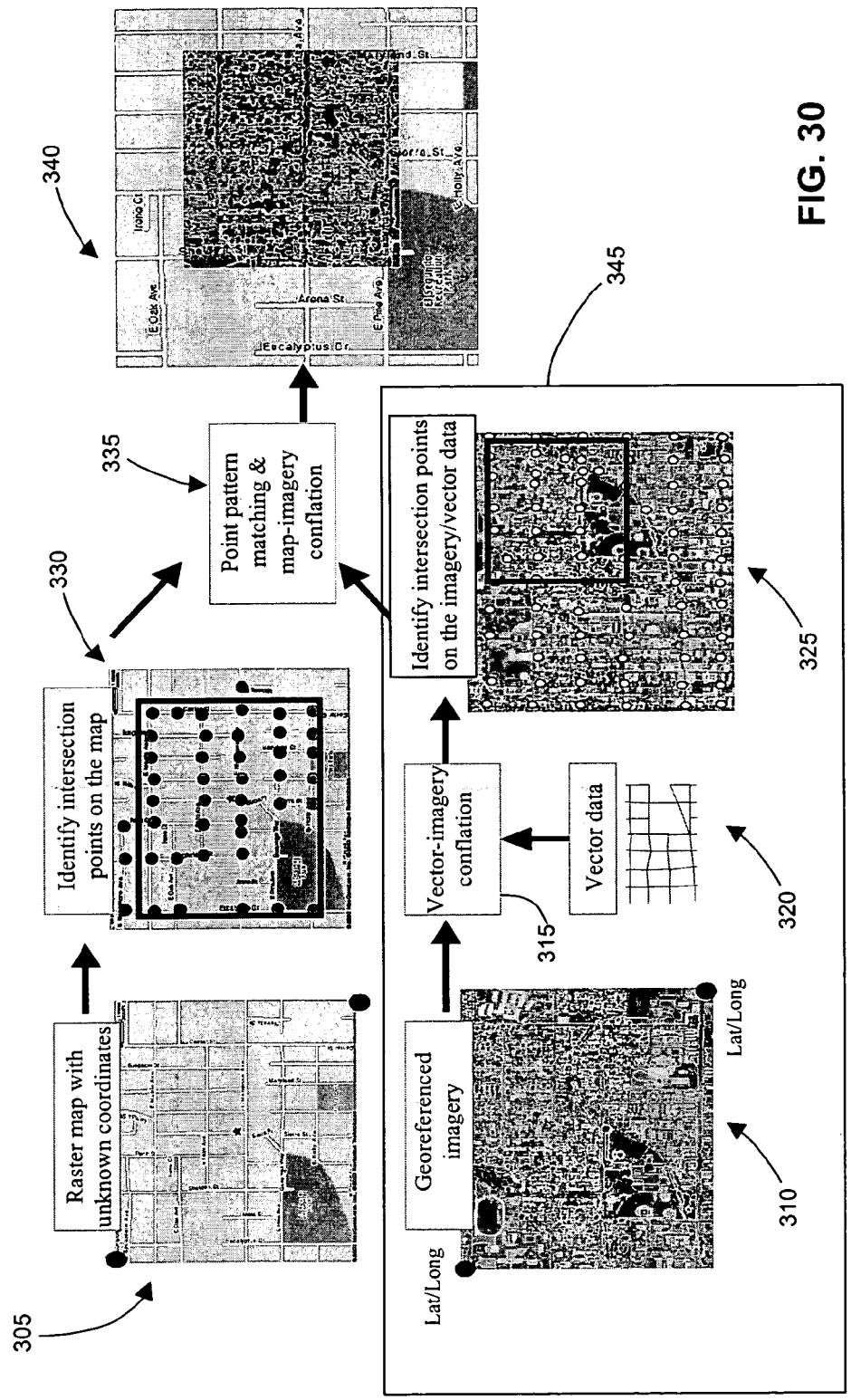
FIG. 30 is a simplified diagram showing one approach for conflating street maps and imagery, in accordance with an embodiment of the present invention.

FIG. 30 is a simplified diagram showing one approach for conflating street map 305 and image 310. In an initial operation 315, road network vector data 320 may be conflated with image 310. In another operation 325, intersection points on the image are identified.

At some point, as indicated by operation 330, road intersection points may be identified or otherwise located on street map 305. At bock 335, two point sets identified in blocks 325 and 330 may undergo a point pattern matching process to define a set of control point pairs. The point pattern matching process may be accomplished using, for example, any of the various point pattern matching techniques described in the sections below. Finally, utilizing these identified control point pairs during an alignment process, georeferenced raster map 340 may be generated by aligning or deforming one of the datasets (e.g., map 305) so that it aligns with the other dataset (e.g., image 310). Alternatively, the imagery may be deformed to align to the map using the identified control point pairs. It is to be understood that the various operations performed within block 345 may be accomplished using any of the intersection point location techniques disclosed above in Section 2.

This section of the present disclosure will describe a conflation process using a specific example of aligning a raster map with imagery. However, such teachings apply equally to the general method of conflating a raster map with various types of geospatial data. Accordingly, in addition to the map-imagery conflation embodiment shown in FIG. 30, others types of conflation process are also possible and envisioned by the present disclosure including, for example, map-map conflation, imagery-imagery, map-vector data, and the like.

For instance, in imagery-imagery conflation, the alignment of multiple images may be aligned to generate a super-image that either has the best features of each of the individual images or highlights changes across multiple images. In the former case, the images are available from the same area but with different qualities, and in the latter case multiple images are taken at different time points from the same area. Similar to map-imagery conflation, common road vector data may be used as "glue" to conflate each image separately, and subsequently conflate the two target images.

In map-map conflation, the alignment of multiple maps may be used to generate a super-map that integrates the attribution information from each of the individual maps. A map intersection detection technique may be used to identify road intersections from each map. The two point sets may be aligned using, for example, the GeoPPM process described below. Finally, the two target maps can be aligned based on identified matched point pattern.

With regard to vector-map conflation, the alignment of maps and road vector datasets may also be used to generate a super-map that integrates attribution information from each of the individual datasets. A map intersection detector may be used to identify road intersections on the map. The map point set may be aligned with road intersections on the vector data by utilizing the GeoPPM process. Subsequently, these control point pairs may be used to align the vector data and the map.

Figure 31:
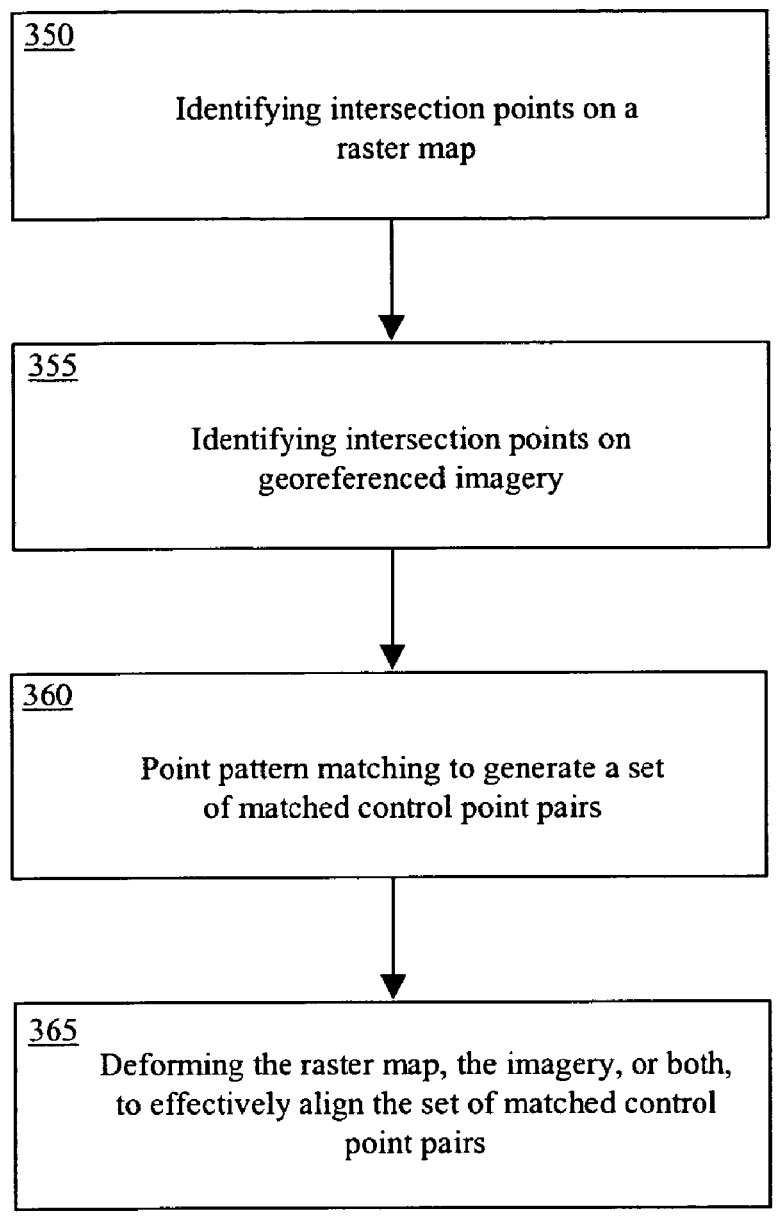
FIG. 31 is a flowchart showing a method for conflating a raster map with georeferenced imagery in accordance with another embodiment of the present invention

FIG. 31 is a flowchart showing a method for conflating raster data (e.g., a raster map) with geospatial data (e.g., georeferenced imagery) in accordance with an embodiment of the present invention. At block 350, a first set of feature points (e.g., intersection points) are identified. These intersection points are associated with the raster map.

At block 355, a second set of feature points (e.g., intersection points) are identified. These intersection points are associated with the georeferenced imagery. After the intersection points have been identified, an intersection point matching process may be performed. For instance, in block 360, a set of matched control point pairs are identified. The matched control point pairs include intersection points associated with the raster map and corresponding intersection points associated with the imagery.

Another operation includes deforming the raster map, the imagery, or both, to effectively align the set of matched control point pairs (block 365). This operation may be used to create georeferenced raster data. If desired, the georeferenced raster data and imagery may be used to generate a composite image. Alternatively, a composite image labeled with attribute data associated with the georeferenced raster data may be generated.

3.1 Identifying Feature Points (Road Intersections)

Similar to vector-imagery conflation, one task of raster map and imagery conflation is to find accurate control point pairs based upon feature points located on or otherwise associated with each particular dataset. In addition to the similar challenges encountered in vector-imagery conflation, aligning maps with imagery includes additional challenges. One challenge is that neither maps nor imagery have reference points (such as road intersections or landmarks) established in advance. A straight forward method includes analyzing the map and imagery to identify common and corresponding spatial objects (such as road segments or road intersections) as control points. However, this process requires significant computer processing time to process an image in its entirety, and such processing still may provide inaccurate results. Moreover, it is not always clear which kinds of features are good candidates to be identified from both datasets, especially when the context (and the geo-coordinates) of the maps or imagery is not known in advance.

By focusing on street map and imagery conflation, road intersections (feature points) detected from both datasets may be utilized as control points. However, as stated above in Section 2.1.2, automatic extraction of road intersection points from imagery as control points is a difficult task due to the complexity that characterizes natural scenes. Furthermore, it is also difficult to detect road intersections from maps and determine the matched intersections from both datasets. Accordingly, a solution to address these issues is presented in this section. In general, the solution for map-imagery conflation conforms to that of vector-imagery conflation. That is, information from each of the data sources to be integrated is exploited to assist the automatic feature detection and alignment process.

3.1.1 Identifying Intersections on Imagery

Although automatic extraction of road intersection points from imagery is a challenging task, the vector-imagery conflation technique described above in Section 2 may be used to overcome this issue. This approach utilizes auxiliary information sources (i.e., road network vector data) that is not part of a map or an image, but has information relevant to both sources. In other words, road network vector data may be used as "glue" to align maps and imagery. This may be accomplished by first aligning road network vector data with imagery using, for example, vector-imagery conflation. As a result, the conflated intersection points on the road network are aligned with intersection points on the imagery. The conflated intersection points may then be used as intersection points on the imagery.

Figure 32A:
FIG. 32A depicts an image before conflation.
Figure 32B:
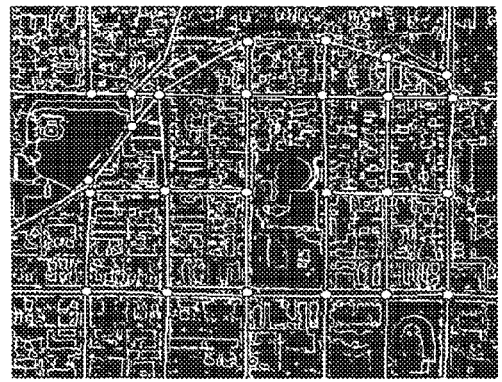
FIG. 32B depicts an image after conflation.

FIGS. 32A and 32B depict an image before and after conflating the image with a road network. More particularly, FIG. 32A depicts an image before vector-imagery conflation, and includes a road network shown in white lines. FIG. 32B depicts an image after vector-imagery conflation, and includes a road network shown in white lines. The white circles shown in FIG. 32B represent detected intersection points.

3.1.2 Road Intersection Extraction from Raster Maps

This section describes an approach to extract or otherwise identify road intersections from raster maps, regardless of the map source and scale. Before road intersections can be extracted, the road layer may be separated from other layers such as building, symbol, and label layers. This operation may be accomplished using one or more image processing and graphics recognition methods to eliminate or remove the unnecessary layers. During the extraction processes, the number of roads that meet at each possible intersection on the road layer may be used to determine an actual road intersection point. In addition, the orientation of these roads may also be computed for future use in conflation systems.

By way of example, 49 randomly selected raster maps from different sources, and in various scales, were analyzed. Using the techniques set out below, the analyzed raster maps resulted in 92% precision and 77% recall, on average. The techniques described in this section automatically and accurately identify road intersections from raster maps as feature points to conflate with other geospatial datasets. Furthermore, the set of road intersection points may be referred as the "fingerprint" of a raster map since the road layers are commonly used on various raster maps, and the road networks on raster maps are usually distinguishable from each other. In addition, a set of intersections provides a good starting point to determine the geo-coordinates of the raster maps or to extract other data from the raster maps.

3.1.2.1 Introduction

Automatically and accurately extract road intersections from raster maps is a challenging problem. Raster maps in different scales include multiple layers which typically contain information about roads, buildings, symbols, and characters. In some cases, such as computer generated raster maps (e.g., Yahoo Maps), road layers can be separated by extracting pixels with user specified colors, or color learned from legend information. However, a significant number of raster maps contain a road layer which cannot be separated using only color information. Examples of such maps include low-quality scanned maps, USGS Topographic Maps, and maps without legend information. To overcome this problem, an automatic segmentation process may be utilized to remove background pixels based on the difference in luminosity level. After the foreground pixels have been obtained, which contain each information layer on the original raster map, the road layer may be separated from the other layers to extract road intersection points.

Figure 33A:
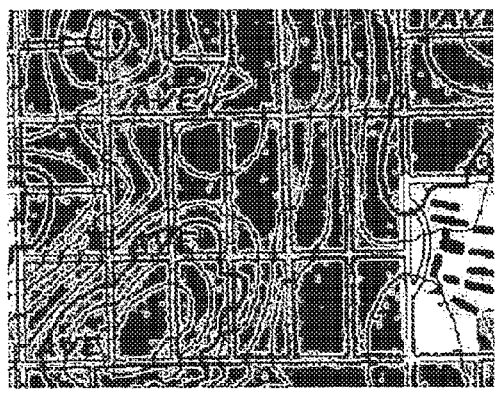
FIG. 33A depicts a USGS Topographic Map with a double line road network.
Figure 33B:
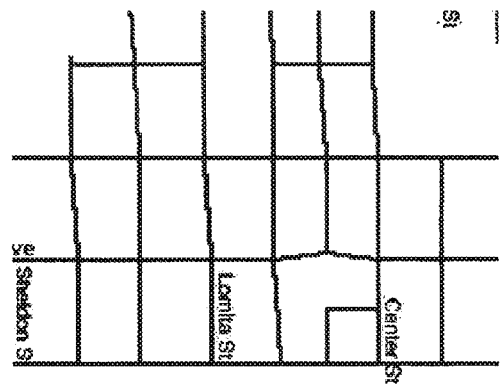
FIG. 33B depicts a TIGER/Line Map with a single line road network.

As shown in FIGS. 33A and 33B, raster maps contain road layers which are usually presented in single line or double line format, depending on the source of the particular raster map. FIG. 33A, which is a USGS Topographic Maps, depicts a road network having a double line format. FIG. 33B, on the other hand, which is a TIGER/Line Map, depicts a road network having a single line format. The double line format of FIG. 33A typically provides more information for extracting road layers than the single line format. This is useful if the input raster map has other layers that contain mostly linear structures, such as grid lines, rivers, or contour lines. The format of road layers on the input raster map may be checked to determine if the raster map has a single line or double line road network. Once this is determined, a text/graphics separation process may be applied with morphological operators to remove noise and rebuild the road layer.

After the road layer has been extracted, salient points (feature points), such as the road intersection candidates, may be detected based on the variation of luminosity level around each road layer pixel. The connectivity of each road intersection candidate may be computed by tracing linear structures on the road layer (i.e., road lines) to determine if it is an actual road intersection point. Further computations include computing the orientation of the roads intersecting on each road intersection point.

3.1.2.2 Raster Map Road Intersection Detection

Figure 34:
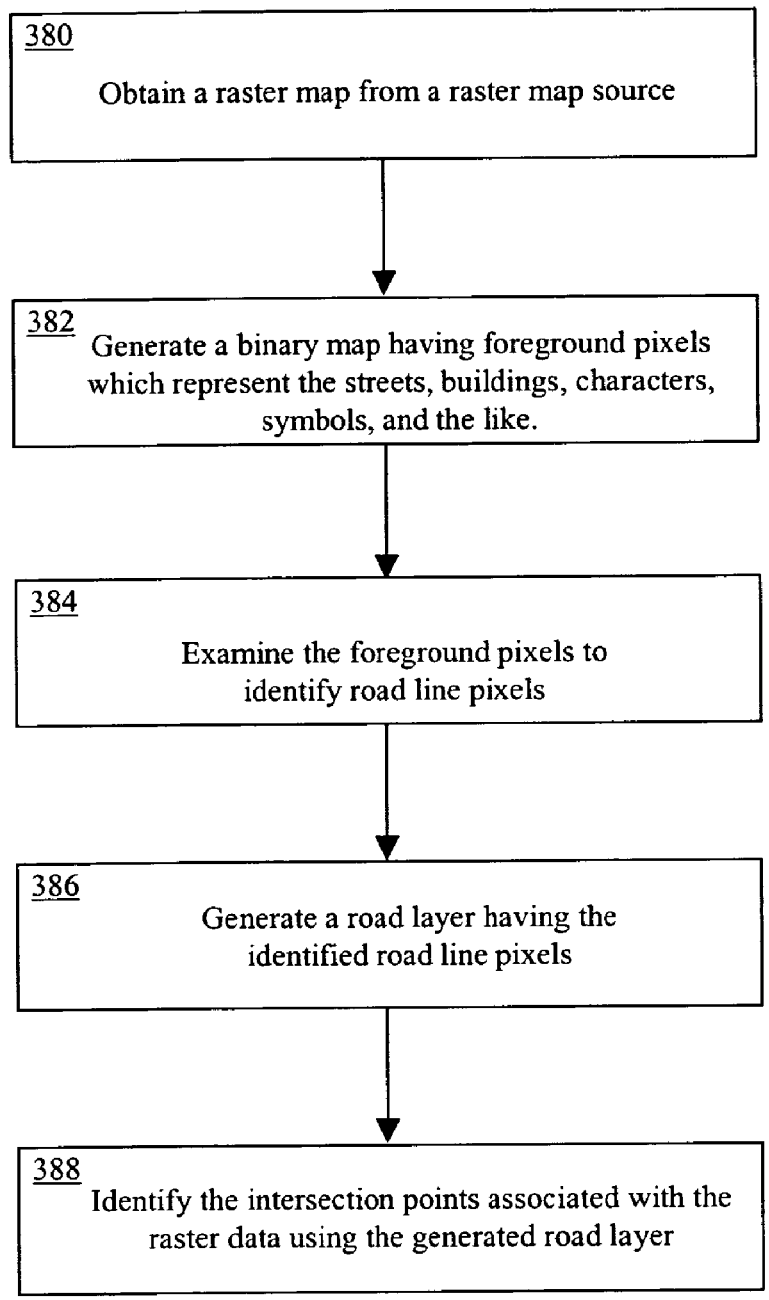
FIG. 34 is a flowchart providing one approach for identifying road intersections (control points) on a raster map.

FIG. 34 is a flowchart providing one approach for identifying road intersections (feature points) on a raster map. At block 380, a raster map is obtained from a raster map source. At block 382, a binary map representing the raster data is generated. The binary map includes foreground pixels and background pixels. Each of the foreground pixels is either a road line pixel or a non-road line pixel. At block 384, each of the foreground pixels may be examined or otherwise inspected to identify road line pixels. Each of the identified road line pixels may be defined as a foreground pixel which has neighboring foreground pixels located, within a certain distance, vertically parallel and horizontally parallel relative to an associated one of the foreground pixels. Next, a road layer having identified road line pixels may be generated (block 386). In block 388, intersection points associated with the raster data may be identified using the generated road layer.

Figure 35:
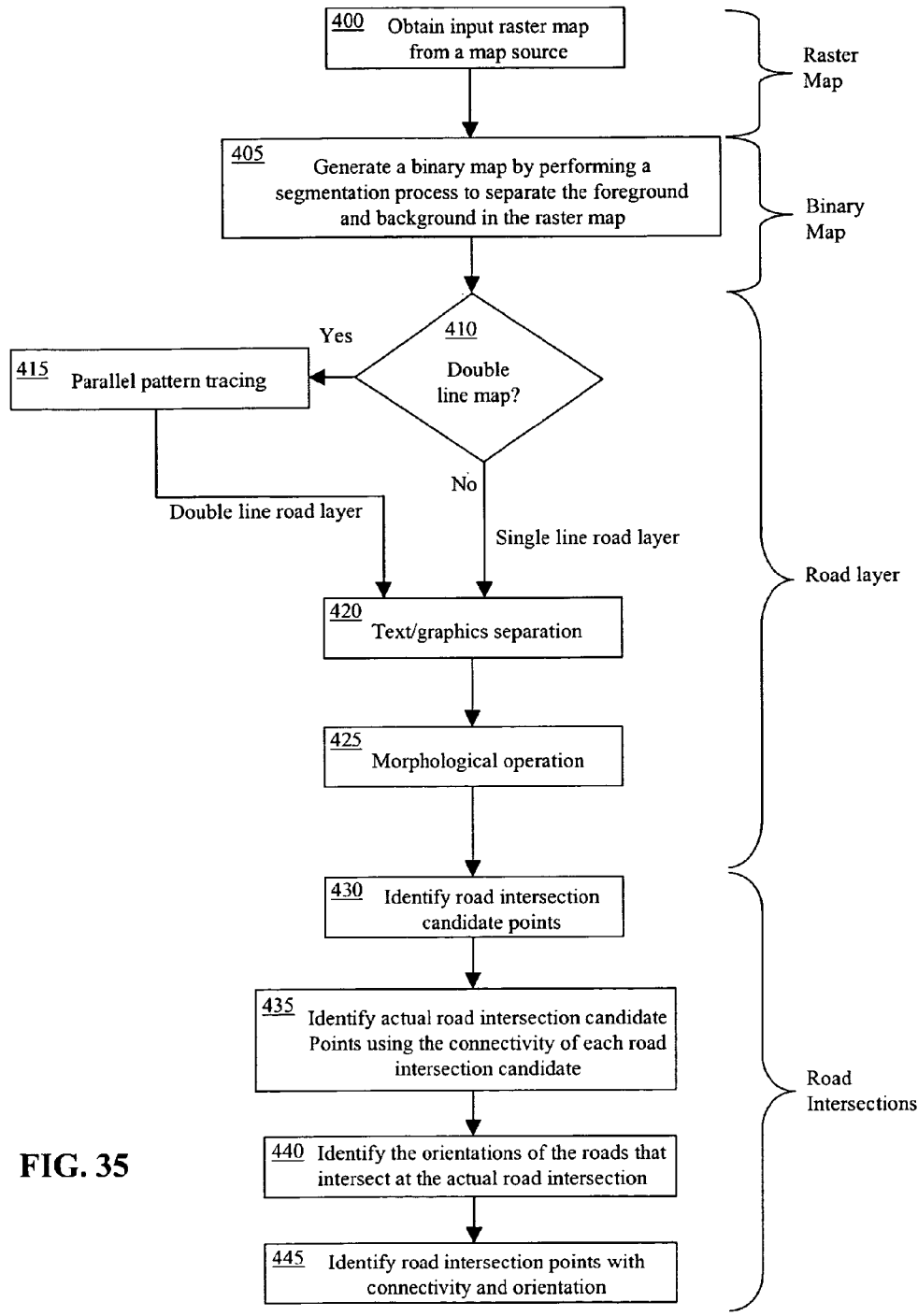
FIG. 35 is a flowchart illustrating in more detail the method shown in FIG. 34.

FIG. 35 is a flowchart illustrating in more detail the method shown in FIG. 34. At block 400, an input raster map is obtained from a raster map source, such as any of the above-identified types of raster map sources. The input raster map typically does not include additional data such as the color of layers, vector data, legend types, or gazetteer data.

The input raster map usually contains many objects such as characters, buildings, streets, rivers, and contour lines in the case of topographic maps. It is generally helpful to distinguish between these objects and the background. The input raster maps may be classified into two primary categories. This classification is based upon the manner in which the input raster maps were generated. The first category is computer generated raster maps, which are generated from vector data such as TIGER/Line Maps. The second category of input raster maps is scanned raster maps, such as scanned versions of USGS Topographic Maps, for example.

Computer generated raster map sources usually use different colors to represent different information layers, especially road layers. Thus road layers can be extracted using the specified color of the road network. Different raster map sources may utilize different color thresholds to separate road layers. Even raster maps from the same source may have a different color threshold for different scales. Since neither the scale nor the source of the input raster map is generally known, this color information is not always helpful in extracting road layers. On the other hand, scanned raster maps often suffer from quantization errors resulting from the manual scan process, resulting in the color of each layer varying from tile to tile. For example, USGS Topographic Maps currently do not have consistent color on road and contour lines. Some roads are composed from brown, white, and black pixels, and other roads are composed from pink, brown, and black pixels. Moreover, different cities may have different color on their roads, contour lines, and background.

As indicated in block 405, a segmentation process may be performed to separate the foreground and background of the input raster map. This operation results in a binary map containing foreground pixels, for example, which represent the road layer and other layers (e.g., buildings, symbols, text, characters, and the like) of the original input raster map.

Decision block 410 determines whether or not the input raster map includes a double line road layer. If the raster map does include a double line road layer, processing flows to block 415 so that parallel pattern tracing operations may be performed. Parallel pattern tracing is one technique that may be used to remove, from a binary map which has a double line road format, various layers which do not contain parallel linear structures.

Once the parallel pattern tracing operation has been completed, or in situations where the binary map includes a single line road layer, processing flows to block 420. This operation separates or extracts the road layer from the binary map. This operation results in the removal of unwanted text and graphics from the binary map, such that text and graphics are separated from the road layer.

In block 425, the binary map is subjected to morphological operations. For example, one operation includes reconnecting any disconnected portions of the identified roads. This may be accomplished by expanding dimensions of road line components in the extracted road layer. If desired, the thickness of the road line components may be reduced, while maintaining relative orientation of the road line components and the binary map. An additional morphological operation will be referred to as "thinning." This operation thins the road line components until some or all of these components have a substantially uniform thickness.

In block 430, the road layer is analyzed to identify candidates for road intersection points. In block 435, actual intersection points are identified based upon, for example, the connectivity of each of the road intersection points. Next, in block 440, the orientation of the roads that intersect at actual intersection points is identified. Block 445 provides the output for this process, which includes the road intersection points with connectivity and orientation. Each of the just-described processes will now be described in more detail in the following sections.

3.1.2.3 Automatic Segmentation

Figure 36A:
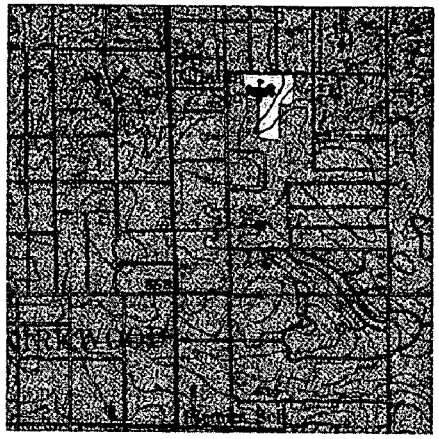
FIG. 36A depicts a grayscale USGS Topographic Map.
Figure 36B:
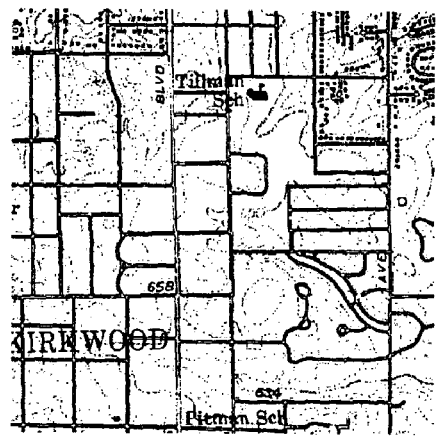
FIG. 36B depicts a binary USGS Topographic Map, which is associated with the grayscale map of FIG. 36A.
Figure 36C:
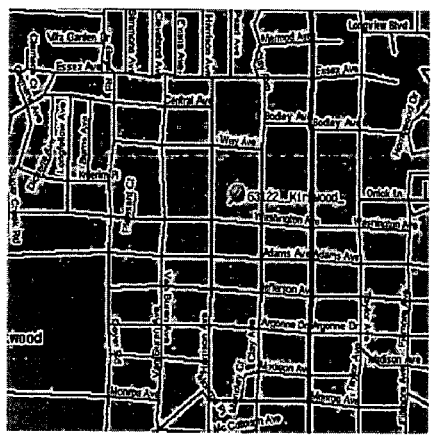
FIG. 36C depicts a grayscale TIGER/Line Map.
Figure 36D:
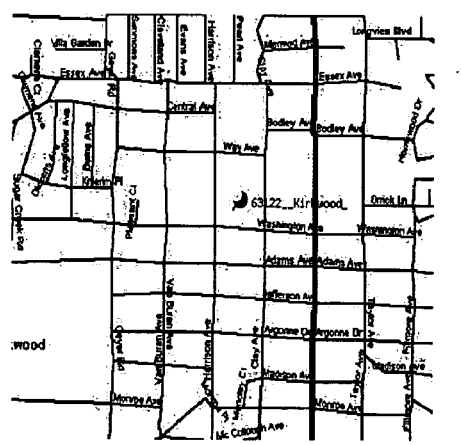
FIG. 36D depicts a binary TIGER/Line Map, which is associated with the grayscale map of FIG. 36C.

A technique referred to as segmentation may be used to automatically separate the foreground and background in both computer generated and scanned raster maps. In particular, segmentation may be used to generate a binary map containing foreground pixels, for example, which represent the original road layer and other layers of the input raster map. One benefit of segmentation is that it operates without introducing significant amounts of noise. Segmentation uses luminosity for removing background pixels, and also discards color information by converting original input raster maps to 8 bit grayscale with 256 color levels. FIGS. 36A and 36C show two such grayscale raster maps. FIG. 36A depicts a grayscale USGS Topographic Map, which is a particular example of a computer scanned raster map. FIG. 36C depicts a grayscale TIGER/Line Map, which is a particular example of a computer generated raster map. Performing the below-described segmentation process to separate the foreground pixels of the grayscale USGS Topographic Map of FIG. 36A, results in the binary USGS Topographic Map of FIG. 36B. The binary TIGER/Line Map of FIG. 36D may be similarly generated based upon the gray scale TIGER/Line Map of FIG. 36C.

Figures 37, 38:
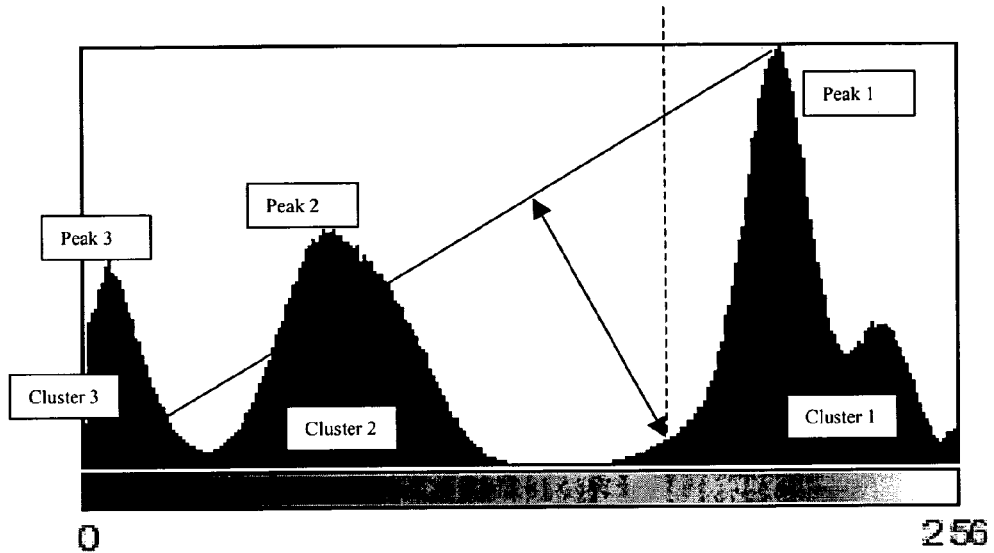
FIG. 37 is graph depicting a histogram of the luminance of the grayscale USGS Topographic Map of FIG. 36A.
FIG. 38 is a table providing a representative example of pixels contained in the three clusters shown in the graph of FIG. 37.

FIG. 37 is graph depicting a histogram of the luminosity of the grayscale USGS Topographic Map of FIG. 36A. The Y-axis of FIG. 37 represents the "number of pixels," and the X-axis represents "luminosity level," which is shown ranging from 0 (black) to 255 (white). The histogram includes three clusters of pixels, denoted by cluster 1, cluster 2, and cluster 3. Dividing the histogram into these three clusters may be accomplished using, for example, the Triangle Method proposed by Zack et al. in "Automatic Measurement of Sister Chromatid Exchange Frequency," J. Histochem Cytochem 25 (7): pgs. 741-753.

As shown in FIG. 37, a line is constructed between the origin and the peak of cluster 1 (peak 1). The distance between the histogram value and the line is then computed. The histogram value that has the greatest distance defines the cluster threshold, which is indicated by the dashed line in this figure. After cluster 1 is found, this same method may be applied to peaks 2 and 3 until each peak and associated cluster are identified. Once the clusters are identified, the number of pixels that are contained with each cluster are determined. Such pixel data is provided in the table of FIG. 38.

The background of raster maps typically contain the dominant number of pixels. In the current example, cluster 1 may be classified as representing background pixels. The cluster that is furthest from the background cluster, based upon luminosity level, would represent the foreground pixels. In the example of FIG. 37, cluster 3 is the furthest away from cluster 1. Consequently, cluster 3 is classified as foreground pixels. For the remaining clusters, the number of pixels in each cluster may be compared to the number of pixels in the identified background and foreground clusters. If the number of pixels in a remaining cluster is closer to the background cluster than the foreground cluster, then the remaining cluster is deemed a background cluster, otherwise the remaining cluster is deemed a foreground cluster.

FIG. 38 is a table providing a representative example of pixels contained in the three clusters. In this table, the number of pixels in cluster 2 is closer to cluster 1 than cluster 3, thus cluster 2 identified as a background cluster. After the status of each cluster is identified as either a foreground or background cluster, the background clusters may be removed to produce a resulting binary image having only foreground pixels.

Note that a raster map will have more than one background cluster if the raster map utilizes more than one luminosity level for the background. For example, as shown in the raster map of FIG. 36A, white and light-gray pixels are uniformly distributed as the background pixels.

3.1.2.4 Pre-Processing-Extracting Road Layers

Referring back to FIG. 34, block 384, the road layer of the binary raster map is extracted from the map. The extracted road layer typically includes (1) road lines which are substantially straight within a small distance (i.e., several meters in a street block), and (2) unlike label layers or building layers which may have many small connected objects, road lines are connected with each other to become road networks. A road layer usually has few connected objects, or may even contain one relatively large connected object such that the entire road layer is a single connected object.

Some map sources use double lines to represent roads. Examples of such sources include Yahoo Maps, ESRI Maps, and USGS Topographic Maps, and the like. Other map sources use a single line to represent a road. Double line format is commonly used when the resolution is high, or when the map contains other linear objects like contour lines, rivers, grid lines, and the like. If the road layer utilizes a double line format, parallel pattern tracing may be used to eliminate non-road line linear structures, as will now be described.

3.1.2.5 Double Line Format Checking and Parallel Pattern Tracing

To determine whether a foreground pixel is on a double line road layer, the double line road having a road width defined by "RW" pixels, it is useful to find corresponding foreground pixels within a distance of RW pixels in both horizontal and vertical directions. Various pixels matrices will now be described. Unless otherwise noted, white cells denote background pixels, and black cells denote foreground pixels.

Figure 39A:
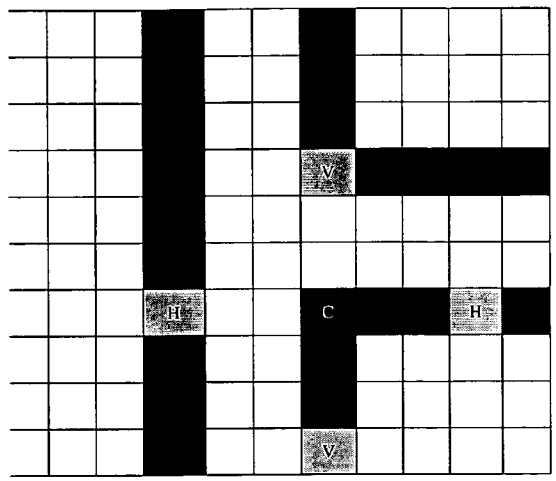
FIGS. 39A-39C are pixel matrices utilized in double line format checking and parallel pattern tracing.
Figure 39B:
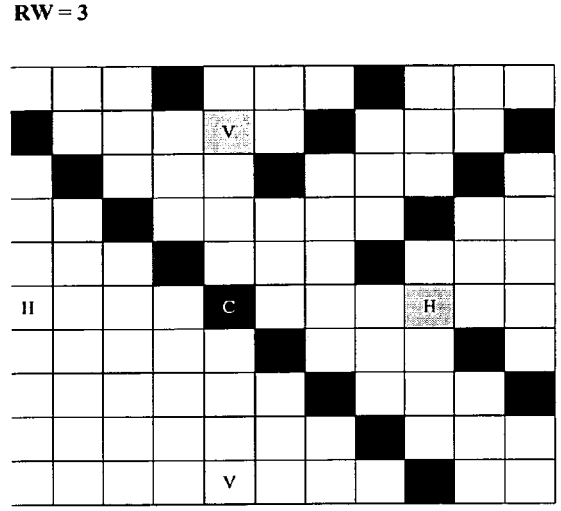

If a foreground pixel is on a horizontal or vertical road line, then two foreground pixels may be located along the orientation of the road line, in a distance of RW. At least one additional foreground pixel may be located on the corresponding parallel road line in a distance of RW. An example of this is shown in the pixel matrix shown in FIG. 39A. If the orientation of the road line is neither horizontal nor vertical, one foreground pixel may be found on both the horizontal and the vertical directions on the corresponding parallel road line in a distance of RW. An example of this is shown in FIG. 39B. In these two figures, pixel "C" is the current pixel, "V" are the pixels at the vertical direction, and "H" are the pixels at the horizontal direction in a given RW.

Figure 39C:
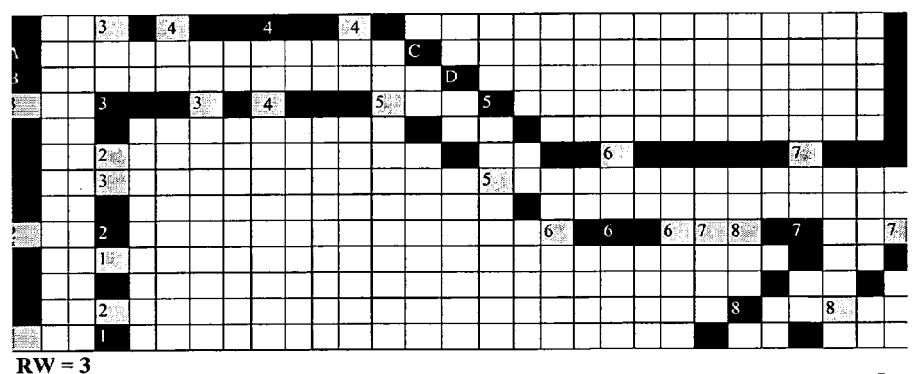

There are some exceptions, such as that shown in FIG. 39C, in which foreground pixels from 1 to 8 are the example pixels which have the above properties (gray pixels are the corresponding pixels in the horizontal/vertical direction or on the corresponding parallel road line of these pixels). The foreground pixels labeled A-D are the example pixels which belong to the double road line layer, but do not have the above properties. After parallel pattern tracing, pixels A-D may be removed, resulting in small gaps between line segments. These gaps will be corrected in later operations using, for example, morphological operators.

For parallel pattern tracing, it is useful to know the format of the input road layer and the road width (RW). The road layer may be checked by applying parallel pattern tracing on the input raster maps having road widths ranging from 0-10 pixels, and removing foreground pixels which do not have the properties of such a road line pixel at a given road width. Then the ratio of the remaining foreground pixels may be computed by dividing by the original foreground pixels for each road width.

Initially, road width is 0 and no foreground pixels are removed. After increasing road width, the ratio starts to decline because foreground pixels tend to be located near each other. It is easier to find corresponding pixels even if the road width is not correct when the given road width is small.

Figure 40A:
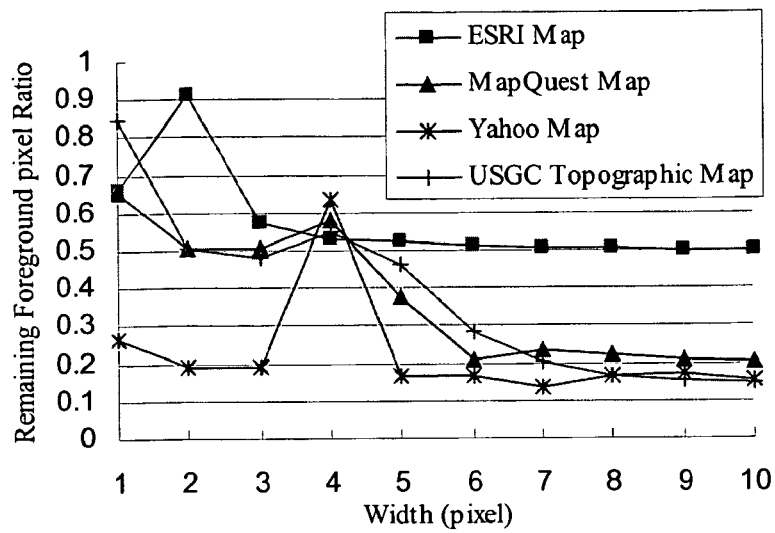
FIG. 40A is a graph showing foreground pixel ratios for an exemplary input raster map having a double line road layer.
Figure 40B:
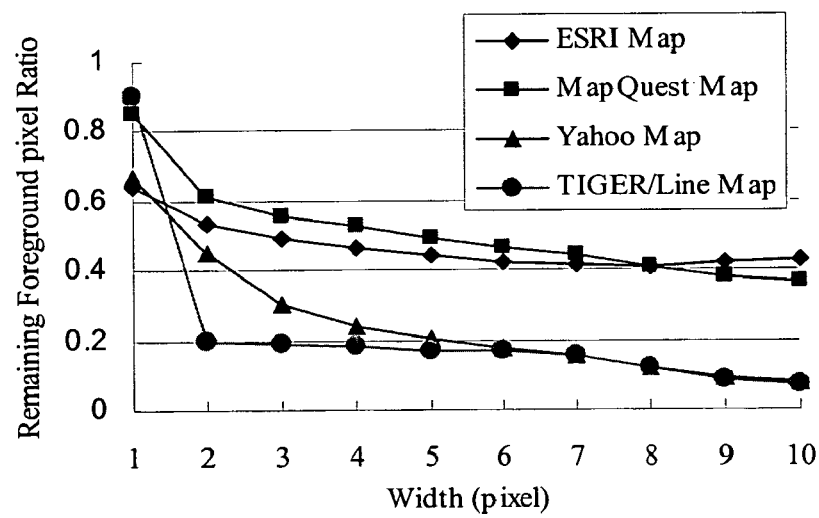
FIG. 40B is a graph showing foreground pixel ratios for an exemplary input raster map having a single line road layer.

If the input raster map has a double line road layer with the correct road width, a peak may be detected using, for example, the graph depicted in FIG. 40A. In this figure, ESRI Maps, MapQuest Maps, Yahoo Maps in high resolution, and USGS Topographic Maps, generate lines having peaks. In contrast, FIG. 40B is a graph for single line maps having normal/low resolution. Note that none of these maps generate lines having peaks.

Figure 41A:
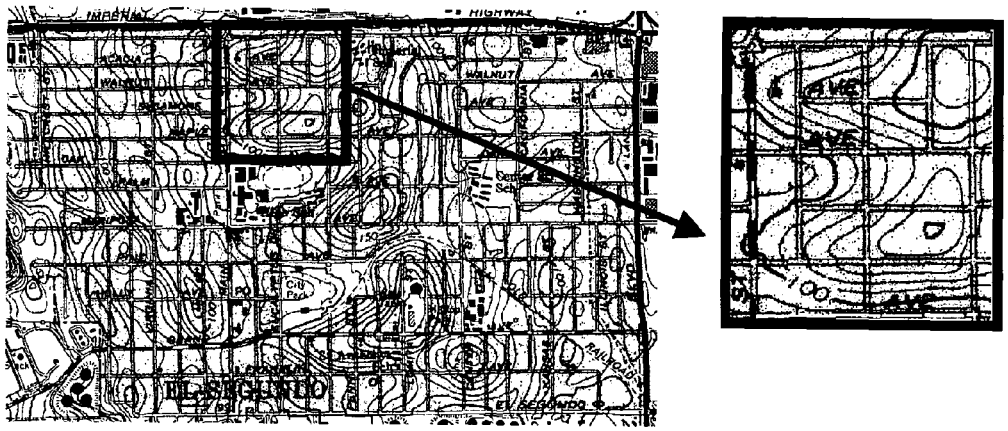
FIG. 41A depicts an original binary USGS topographic double line map, before parallel pattern tracing.
Figure 41B:
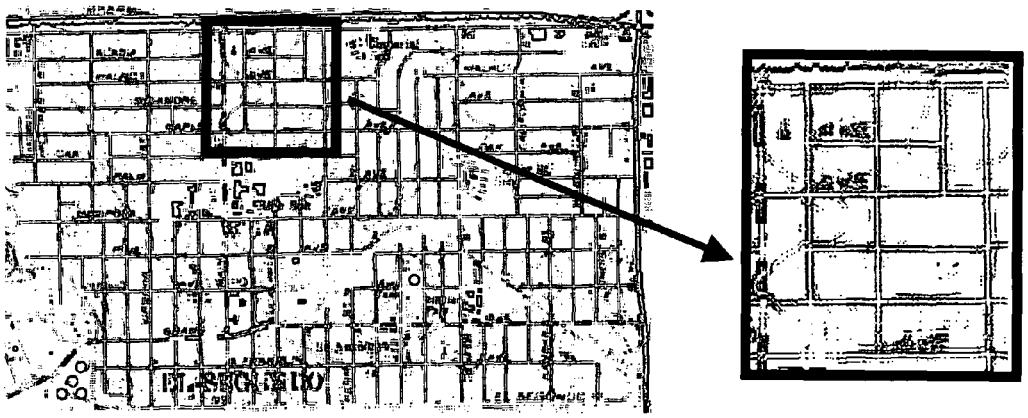
FIG. 41B depicts the binary USGS topographic double line map of FIG. 41A, after parallel pattern tracing.

Using the parallel tracing technique, double line maps, as well as the widths of the roads on the map, may be detected. For instance, the data presented in FIG. 40A indicates that the analyzed USGS Topographic Maps is a double line map having a road width of 4 pixels. Accordingly, we apply the parallel tracing process to the binary map shown in FIG. 41A, using RW set to 4 pixels. This process results in the image shown in FIG. 41B. Note that the remaining pixels are primarily road lines, some of which include broken or non-connected regions. However, the originally present contour lines and other linear structures have been removed.

3.1.2.6 Text/Graphics Separation

After the parallel pattern tracing process is performed, or in situations in which the input raster map has a single line road layer, the next operation that may be performed involves the separation of text and graphics from the binary raster map. At this stage, the primary remaining sources of noise include relatively small, connected, objects such as buildings, symbols, characters, and the like. These objects tend to be located near each other on the binary raster map.

Conventional text and graphics separation processes for pattern recognition may be used for grouping these connected objects. Examples of such processes are described by the following authors and publications: Ruini Cao et al. in "Text/Graphics Separation in Maps," the Fourth International Workshop on Graphics Recognition Algorithms and Applications (GREC 2001), Kingston, Ontario, Canada (September, 2001); Lloyd Alan Fletcher et al. in "Robust Algorithm for Text String Separation from Mixed Text/Graphics Image," IEEE Transactions on Pattern Analysis and Machine Intelligence 10(6): pgs. 910-918 (November, 1988); J. Patrick Bixler in "Tracking Text in Mixed-Mode Documents," ACM conference on Document processing systems, Santa Fe, N. Mex. (2000); and Aurelio Velázquez et al. in "Text/Graphics Separation and Recognition in Raster-scanned Color Cartographic Maps," Fifth International Workshop on Graphics Recognition Algorithms and Applications (GREC 2001), Barcelona, Catalonia, Spain (July 2003).

Using the binary TIGER/Line Map shown in FIG. 42A as an example, the text and graphics separation process may first identify each connected foreground object, and then search neighboring objects to build an object group. Next, the process described in the above-identified publication by Ruini Cao, for example, may be applied to the object group. FIG. 42B is an example of a TIGER/Line Map having text and graphics removed or otherwise separated using this technique.

Note that the broken road lines of FIG. 42B are typically inevitable, and are caused by the removal of the connected objects that contact road lines. However, the broken lines may be reconnected using a suitable process, such as a morphological operator, which is described in more detail below.

3.1.2.7 Morphological Operators: Generalized Dilation, Generalized Erosion, Thinning/Skeletonizing Morphological operators may be implemented using hit-or-miss transformations. In accordance with an embodiment, 3×3 binary masks may be scanned over the input binary image. A "hit" is triggered if a binary mask matches an underling pixel of the input image. Otherwise, if the mask is a mismatch of the underlying pixel of the input image, a "miss" is identified. This process will also be referred to as a "hit-or-miss" transformation. Each of the operators may use different binary masks to conduct hit-or-miss transformations. Each operator also utilizes different definitions of the action resulting from a hit or miss. Examples of each operator are set forth in the following paragraphs.

A generalized dilation operator may be used to expand the region of foreground pixels, and in particular, to thicken the road lines and to reconnect neighboring pixels. For instance, as shown in the matrix of FIG. 43A, a "hit" is identified if a background pixel has any foreground pixel in its eight neighboring pixels. In FIGS. 43A and 43B, the black cells represent foreground pixels, and white cells represent background pixels. This "hit" should be filled up as a foreground pixel, which is the action resulting from the "hit." FIG. 43B shows the addition of three cells as part of the expansion process.

Figure 44A:
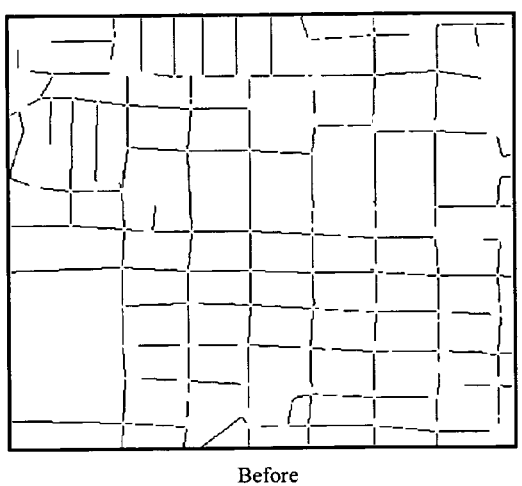
FIG. 44A depicts a binary TIGER/Line Map, before applying a generalized dilatation operator.
Figure 44B:
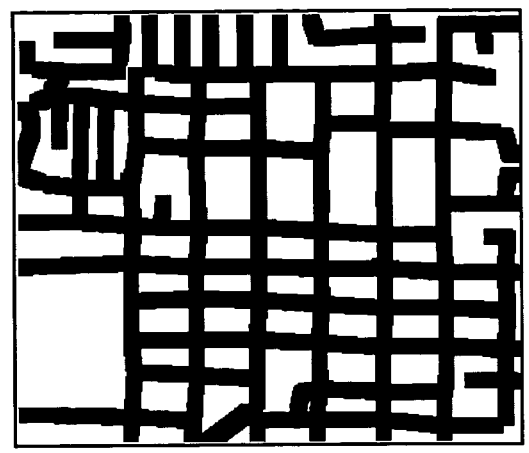
FIG. 44B depicts the TIGER/Line Map of FIG. 44A, after applying a generalized dilatation operator.

FIG. 44A is an example of a TIGER/Line Map having text and graphics removed or otherwise separated. Applying the generalized dilation operator to the map of FIG. 44A results in the map of FIG. 44B, which depicts road lines that are perceptibly thicker. If desired, the generalized dilation operation may be repeated (3-5 times being typical) until a desired road line thickness is achieved. The resulting image after iteratively applying the generalized dilation operator is shown in FIG. 44B. The number of iterations defines the maximum size of the gaps needing correction. Gaps between road lines that are smaller than 6 pixels may be reconnected after three iterations of the generalized dilation operator.

If necessary, a generalized erosion operator may be used to reduce the region of foreground pixels. This operation is helpful in reducing the thickness of road lines and maintaining the orientation of the resultant map so that it is similar to the original orientation (that is, before morphological operators are applied to the map).

As shown in FIG. 45A, a "hit" is identified if a foreground pixel (black pixel) has a background pixel (white pixel) in any of its eight neighboring pixels. An identified "hit" may be converted to a background pixel (white pixel), which is the action resulting from the "hit" using the erosion operator (FIG. 45B).

FIG. 46A is an example of a TIGER/Line Map for which the generalized dilation operator has been applied. Applying two iterations of the generalized erosion operator to the map of FIG. 46A results in the map of FIG. 46B, which contains substantially connected and relatively thinner road lines. In this figure, the road lines are perceptibly thinner as compared to the road lines of FIG. 46A. The generalized erosion operation may be repeated until a desired road line thickness is achieved.

After applying the generalized dilation and erosion operators to a map, road layers are generally include road lines having a width of several pixels. However, to facilitate the detection of salient points and the connectivity (discussed in more detail below), it is useful for the road lines to have a width of one pixel. This process will be referred to as "thinning" and may be accomplished using thinning or skeletonizing operators.

These operators are typically not utilized right after the generalized dilation operator has been applied since this may result in unwanted distortion of the orientation of road lines. Accordingly, the generalized erosion operator is applied after the dilation operator, and before the thinning operator, to minimize or eliminate unwanted distortion.

In contrast to the generalized erosion operator, thinning and skeletonizing operators are conditional erosion operators which have an extra confirmation step. For instance, in a first operation, all possible foreground pixels are marked or otherwise identified as needing conversion to background pixels. This confirmation operation utilizes conditional masks to determine which pixels, among the candidate pixels, should be converted to background pixels. This ensures that the conversion will not compromise the basic structure of original objects.

Although thinning and skeletonizing operators are both qualified for a final operation, they have different impacts on the final results. For instance, the skeletonizing operator typically preserves more structural properties (i.e., create more branches) of the foreground pixels, while the recall of the final result may be higher than using a thinning operator. In addition, the skeletonizing operator also produces non-existent branches and lowers the precision of the final results. The thinning operator is utilized on the examples provided herein since precision is generally more important than recall.

FIGS. 47A-47D are pixel matrices illustrating one technique for applying thinning and skeletonizing operators to a set of 3×3 matrix. Again, the black cells are foreground pixels and the white cells denote background pixels.

FIG. 47A shows a foreground region before applying the thinning operator, and FIG. 47B shows the same foreground region after the thinning operation has been applied. Similarly, FIGS. 47C and 47D respectively show a foreground region before and after applied the skeletonizing operator. FIG. 48A is an example of a TIGER/Line Map before applying the thinning operator, and FIG. 48B is the same map after the thinning operator has been applied.

3.1.2.8 Road Intersection Candidates Detection

At this stage of processing, various non-road layers have been eliminated using the above-described preprocessing operations. Another operation includes locating possible road intersection points. A salient point, also referred to as a feature point, is a point at which more than one line segment meets with different tangents, which is the basic requirement of a road intersection point. An interest operator may be used to detect salient points, such as corners or intersections, on the input road layer. That is, an interest operation may be used to find salient points as the road intersection candidates. No particular interest operation is required or desired by the present invention. One suitable interest operator which may be used is the interest operator proposed by Jianbo Shi et al. in "Good features to track," IEEE Conference on Computer Vision and Pattern Recognition, Seattle, Wash. (June, 1994), and implemented in the commercially available OpenCV product.

Figure 49:
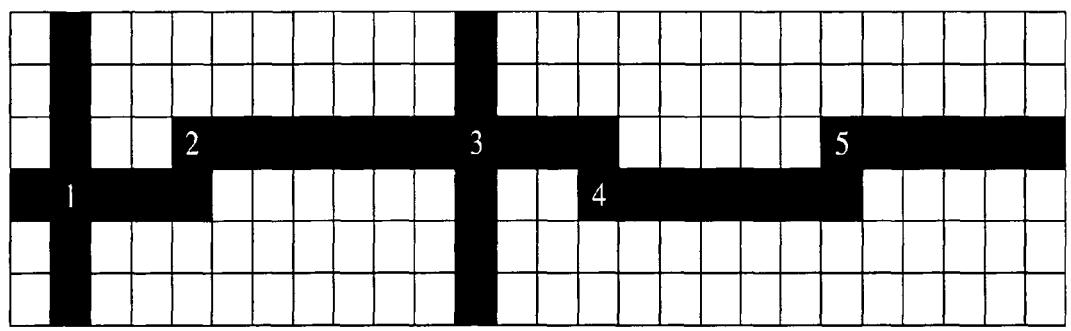
FIG. 49 depicts a technique for identifying salient points.

The interest operator typically checks the color variation around each foreground pixel of the road layer to identify salient points, and it may assign a quality value to each of the salient points. If one salient point lies within a predefined radius R of salient points with higher quality value, then that particular salient point will be discarded. As shown in FIG. 49, five particular salient points are shown. Salient point 2 is too close to salient point 1 with a radius of 10 pixels, which has a higher quality value. Accordingly, salient point 2 may be discarded while salient point 1 can be identified as a road intersection candidate. Salient point 4 can be similarly discarded since it lies within the 10 pixels radius of salient point 3. However, salient point 5 is deemed a road intersection point candidate since it does not lie within an area defined by other salient points with higher quality value. Identified road intersection candidates may be passed to the next module for actual road intersection determination.

3.1.2.9 Filtering Intersection and Extracting Connectivity and Orientation

It is generally assumed that roads on raster maps are substantially straight within a small distance (i.e., several meters within a street block), and every road intersection point is crossed by more than one road. Accordingly, connectivity may be used as the primary criteria to filter out road intersection points from candidate salient points.

Figure 50A:
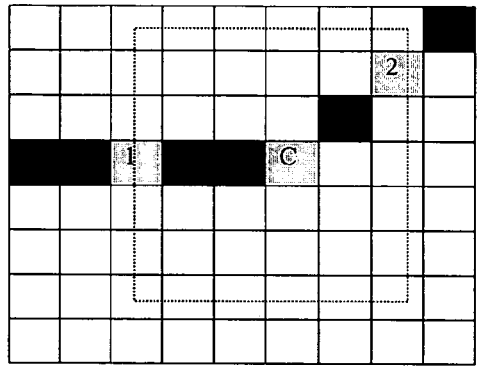
FIGS. 50A and 50B depict pixel matrices used to determine intersection points.
Figure 50B:
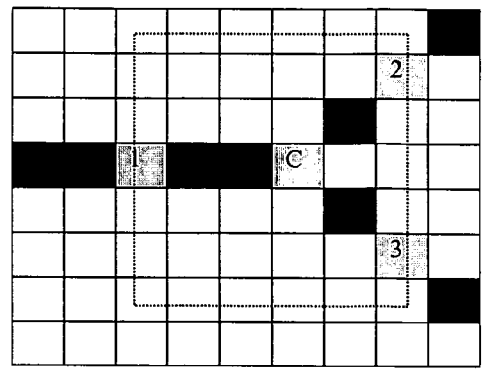

For each identified candidate salient point, a rectangle may be drawn around the point. An example of this is shown in FIGS. 50A and 50B. The connectivity of the salient point may be obtained by identifying the number of foreground pixels that intersect with this rectangle. If the connectivity is less than three, then the candidate salient point may be discarded; otherwise this point is identified as a road intersection point. For instance, FIG. 50A shows a rectangle having two connected foreground pixels, and thus is not an intersection point. However, FIG. 50B shows a rectangle with three connected foreground pixels, thus identifying an intersection point.

Figure 51:
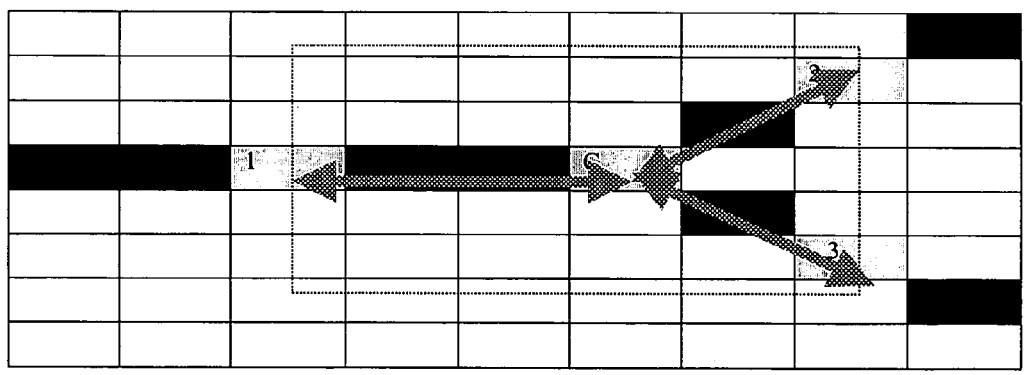
FIG. 51 depicts a pixel matrix used to construct lines to compute orientation.

FIG. 51 shows another operation in which the salient point is linked to the intersected foreground pixels on the rectangle. Using again the assumption that roads are straight within a small distance, it can be further assumed that road segments inside the rectangle window are also straight. Accordingly, the orientation of each road is the slope of each line.

Note that pixels between the center pixel and the intersected pixel do not need to be traced. Such an operation may introduce errors if the intersected pixels are from other road lines. However, since the rectangle is typically much smaller than the size of street block, it is unlikely to have other road lines that intersect. Thus, computation time may be reduced by not tracing every pixel between the center and rectangle box.

3.1.2.10 Experimental Setup

By way of example, raster maps obtained from six different sources were evaluated. These sources included: ESRI Map, MapQuest Map, Yahoo Map, TIGER/Line Map, USGS Topographic Map, and Thomas Brothers Los Angeles 2003 Map. As shown in the table of FIG. 52A, these raster maps contained different map scales. The USGS Topographic Map and the Thomas Brothers Map were scanned from paper maps, while the other maps are computer generated from vector data. These raster maps were randomly selected, and contained coverage areas which included the exemplary test locations of El Segundo, Calif., and St. Louis, Mo.

It is generally assumed that no information is initially known about the input maps, and thus a set of default thresholds is implemented for all the input raster maps. As an example, the size of small connected objects to be removed in text and graphics separation is set to 20 pixels by 20 pixels, which means that any object smaller than 20 pixels by 20 pixels will be removed. The number of iterations for the generalized dilation operator is set to three, and the generalized erosion operator is set to two (i.e., a gap smaller than 6 pixels can be fixed). In the last module or process, a rectangle box of 21 pixels by 21 pixels may be used, and more particularly, this rectangle is defined as 10 pixels from the left and 10 pixels from the right, plus the center pixel.

These exemplary thresholds are based on practical experiences and may not be optimal for all types of raster map sources. However, generated results are typically sufficient to generate a suitably accurate set of road intersection points to identify the raster map. These thresholds may be optimized for a particular map source, thus optimizing precision and recall, if the map source is known in advance of this operation.

3.1.2.11 Practical Applications

Figure 53A:
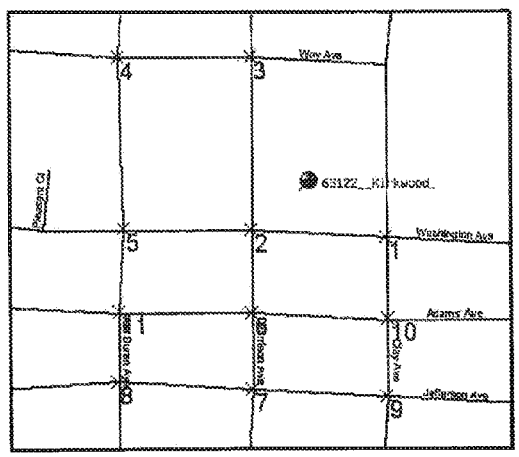
FIGS. 53A-53C are maps depicting automatically extracted road intersection points.
Figure 53B:
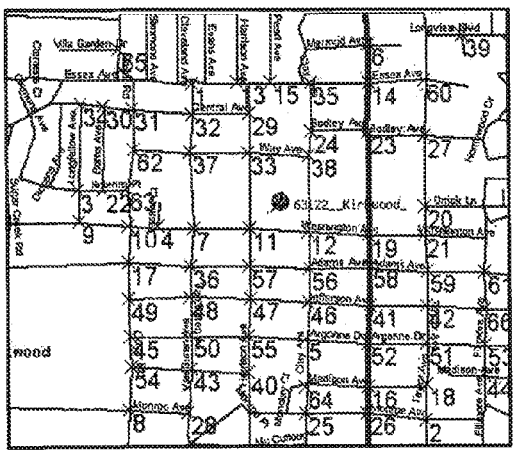
Figure 53C:
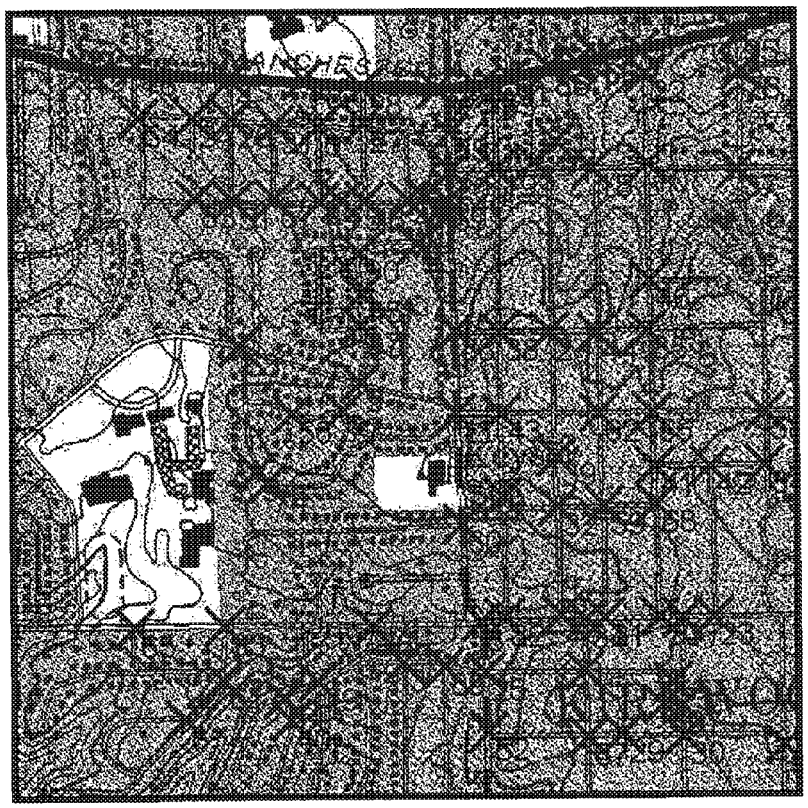

By way of example, a practical application using the above-described processes resulted in the images depicted in FIGS. 53A-53C. An "X" identifies extracted road intersection in each of these maps. The various statistics from these processes are provided in the tables of FIGS. 52A-52B.

Precision is defined as the total of correctly extracted road intersection points divided by the total extracted road intersection points. Recall is defined as the total of correctly extracted road intersection points divided by the total of road intersection points on the raster map. Correctly extracted road intersection points are defined as follows: if a road intersection point can be found on the original raster map and within a 5 pixel radius of the extracted road intersection point, then the intersection point is deemed a correctly extracted road intersection point.

Figure 54:
FIG. 54 depicts a low-resolution map.

As shown in the table of FIG. 52B, low-resolution maps (e.g., resolution lower than 7 m/pixel) typically have below average precision and low recall. This is because the characters and symbols contact the lines more frequently in these types of maps. An example of such a low-resolution map is shown in FIG. 54. In the preprocessing process, text and graphics separation may be used to remove the characters and labels. This process usually removes many, if not all, of the road lines in a low-resolution map. Also, the size of street blocks on a low-resolution map is usually smaller than the window size used in the intersection filter. This leads to inaccurate road orientation.

USGS Topographic Maps generally have the lowest precision and recall, if all the low-resolution raster maps are excluded. This is because a typical USGS Topographic Map contains more information layers than other map sources, and the quality of scanned raster maps is not as accurate as computer generated raster maps.

The computation time primarily depends on how many foreground pixels are in the raster maps. Consequently, raster maps containing more information needed more time than others. In the practical applications presented herein, USGS Topographic Maps are the most informative raster maps. Such maps may require less than one minute to extract road intersections on, for example, an 800×600 USGS Topographic Map with resolution of 4 m/pixel. Other input map sources require less than 20 seconds for 500×400 dimensioned images, for example.

3.1.2.11 Conclusion: Extraction of Road Intersection Points on Raster Maps

The overall approach presented in this section achieved 92% precision and 77% recall, on average, when automatically extracting road intersection points on raster maps with resolution higher than 7 m/pixel. Notably, this approach does not require any previous knowledge of information about the input raster maps.

In summary, two general assumptions are known about the input raster maps. First, it is optimal for the background pixels to be separable using the difference of luminosity level from the foreground pixels, which contain road, building, symbol, character layers, and other notations. It is further useful for background pixels to have the dominant color in the raster maps. On certain raster maps which contain an excessive number of objects, the number of foreground pixels could be larger than background pixels, and the information layers may overlap each other to such an extent making automatic processing difficult. Even if the background pixels can be removed on these raster maps, removing every object which contacts road lines will break the road layer into many pieces. Although this approach works without any previous knowledge of map scales, low-resolution (e.g., resolution lower than 7 m/pixel) raster maps may lead to low precision and recall.

Simply put, this section provides a technique to combine several image processing and graphic recognition process to automatically and efficiently extract road intersections on raster maps. After the desired road intersections are extracted with a suitable degree of precision, they may be used as a starting point to extract other data on the raster maps. For example, a number of publications exist which describe extracting characters on a mixed mode document, such as raster maps. However, these publications do not provide the relationship between the extracted character strings and the objects on the raster map. With road intersection points, characters on the raster maps may be linked to buildings or the linear structures such as roads, rivers, or contour lines.

3.2 Generating Control Points by Point Pattern Matching

Figure 55A:
FIG. 55A depicts a raster street map with detected intersections.
Figure 55B:
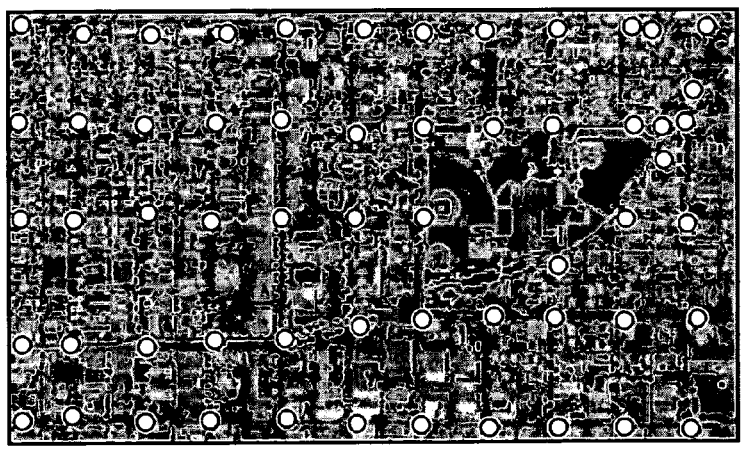
FIG. 55B depicts an image having detected intersections which correspond to the detected intersection of the map of FIG. 55A.

The previous sections have described identifying a set of intersections on both a street map and on imagery. By way of example only, FIG. 55A depicts a raster street map with detected intersections, and FIG. 55B depicts an image having detected intersections. One remaining operation is to match these intersection points to generate a set of control point pairs.

Various symbols and associated definitions described in this section are provided in the table presented below.

TABLE 1

| Symbol | Meaning |
|---|---|
| M | Set of detected intersections on the map. |
| \|M\| | Number of detected map intersections = number of items in M. |
| S | Set of identified intersections on the imagery. |
| \|S\| | Number of identified imagery intersections = number of items in S. |
| T | Computed transformation that transforms some points from one point set to the corresponding points on the other point set. |
| δ | Distance threshold used to determine whether a transformed map point (image point) matched to an image point (map point). |
| α | Pre-defined fraction threshold used to define the least percentage of map points (image points) should be mapped to image points (map points), when applying the computed transformation T. |

Let M = {$m_i$|$m_i$ = ($x_i$, $y_i$), where ($x_i$, $y_i$) is the location of detected intersections on an map} and S = {$s_i$|$s_i$ = ($lon_i$, $lat_i$), where ($lon_i$, $lat_i$) is the location of identified intersections on the imagery}.

One objective of this section is to locate the set: $Rel_{Pat}$={($m_i$,$s_i$)|, where $m_i$ is the accurately detected point on the map, and $s_i$ is the corresponding point on the imagery. That is, point $m_i$ and $s_i$ are formed by the same incident roads}.

The set $Rel_{pat}$ may be utilized as control point pairs to align maps and imagery. If the names of road segments can be recognized as being incident to intersections, then these road names may be used to infer the set $Rel_{Pat}$. However, it is difficult to automatically recognize the road names from the raster maps. In addition, road network vector data may not be associated with the road name attribute. Instead, the approach presented herein utilizes prominent geometric information to locate the matching point pattern. This geometric information includes data such as the distribution of points, the degree of each point, and the direction of incident road segments. In other words, point pattern matching is a geometric point set matching problem.

The basic premise is to find the transformation T between the layout (with relative distances) of the intersection point set M on the map, and the intersection point set S on the imagery. The primary computation of matching the two sets of points includes calculating a proper transformation T, which is a 2D rigid motion (rotation and translation) with scaling. Because most maps and imagery are oriented such that north is up, the translation transformation with scaling need only be computed.

Without loss of generality, another consideration relates to computing the transformation in which a fraction α of the points on maps are transformed to the points on imagery. The reason why only a fraction α of the points on the maps need be considered is that there are misidentified points arising from the processes of image recognition (i.e., identifying intersection points on maps). Moreover, there may be some missing intersection points or noisy points on the imagery as well.

The transformation T brings at least a fraction a of the points of M into a subset of S on the imagery. This implies:

$$\exists T \text{ and } M' \subseteq M, \qquad \text{Eq. (12)}$$

such that $T(M') \subseteq S$, where $|M'| \geq \alpha|M|$, and $T(M')$ denotes the set of points that results from applying T to the points of M'. Or equivalently, for a 2D point (x, y), in the point set M' $\subseteq$ M, $\exists T$ in the matrix form:

$$\begin{bmatrix} Sx & 0 & 0 \\ 0 & Sy & 0 \\ Tx & Ty & 1 \end{bmatrix} \qquad \text{(Eq. 13)}$$

($S_x$ and $S_y$ are scale factors along the x and y direction, respectively, while $T_x$ and $T_y$ are translation factors along the x and y directions, respectively), such that:

$$[x, y, 1] * \begin{bmatrix} Sx & 0 & 0 \\ 0 & Sy & 0 \\ Tx & Ty & 1 \end{bmatrix} = [\text{longitude, latitude, } 1], \qquad \text{(Eq. 14)}$$

where $|M'| \geq \alpha|M|$ and the 2D point (longitude, latitude), belongs to the intersection point set S on the imagery. With this setting, point coordinates are not expected to match exactly because of finite-precision computation or small errors in the datasets. Therefore, when determining whether or not a 2D point s belongs to the point set S, s∈S if there exists a point in S that is within Euclidean distance δ of s for a small fixed positive constant δ, which controls the degree of inaccuracy. The minimum δ such that there is a match of M' in S is called the Hausdorff distance. Different computations of the minimum Hausdorff distance have been studied in great depth in the computational geometry community and need not be further described herein. Minimizing δ is not a requirement, but rather adopting an acceptable threshold for δ is preferable. The threshold is relatively small compared to the average inter-point distances in S.

Given the parameters α and δ, to obtain a proper transformation T, only the values of the four unknown parameters $S_x$, $S_y$, $T_x$ and $T_y$ need be computed. This implies that at least four different equations are required and that the approach need only locate matching point pairs to resolve these four equations. A straight forward (brute-force) method includes resolving the point pattern matching problem by generating all possible matching point pairs from both point sets (also referred to as the "pair-generation" phase) and examining the computed transformations generated by these potential matching point pairs (referred to as the "transformation-examination" phase). More precisely, the brute-force method first chooses a point pair ($x_1$, $y_1$) and ($x_2$, $y_2$) from M. Then, for every pair of distinct points ($lon_1$, $lat_1$) and ($lon_2$, $lat_2$) in S, the transformation T' that maps the point pair on M to the point pair on S is computed by solving the following four equations:

$$S_x * x_1 + T_x = lon_1 \quad \text{(Eq. 15)}$$

$$S_y * y_1 + T_y = lat_1 \quad \text{(Eq. 16)}$$

$$S_x * x_2 + T_x = lon_2 \quad \text{(Eq. 17)}$$

$$S_y * y_2 + T_y = lat_2 \quad \text{(Eq. 18)}$$

Each transformation T' generated is applied to the entire set of points in M to check whether there are more than $\alpha|M|$ points that can be aligned with some points on S, within the threshold $\delta$. The above-mentioned process may be repeated for each possible point pair of M. In the worst case, this process could require examining $O(|M|^2)$ pairs. For each such pair, the process typically tries all possible point pairs on S (i.e., $O(|S|^2)$) and requires approximately $O(|M| \log|S|)$ time to examine the generated transformation T'. This method has a worst case running time of $O(|M|^3 |S|^2 \log|S|)$. One advantage of this approach is that a mapping (if the mapping indeed exists) with a proper threshold $\delta$ can be found, even in the presence of very noisy data.

One possible technique for decreasing the computation time of this process is to utilize randomization in choosing the pair of points from M using, for example, the technique proposed by S. Irani et al. in "Combinatorial and experimental results for randomized point matching algorithms," Computational Geometry, Vol. 12 (1-2): pgs. 17-31, (1999). This technique provides an approximate running time of $O(|S|^2 |M| \log|S|)$. However, this approach is not always appropriate for the various datasets used herein because the extracted intersection points from maps or imagery could include a number of misidentified intersection points. In addition, there could be some missing intersections on both point sets. Accordingly, the techniques discussed in the following sections may alternatively be used to prune the search space of possible point pattern matches by reducing the numbers of potential matching points requiring examination.

3.2.1 Enhanced Point Pattern Matching: GeoPPM

A number of techniques are presented herein to increase the performance of the brute-force point pattern matching method described above. These techniques include exploiting auxiliary information, such as map scale, map resolution, the degree of intersections (i.e., the number of intersected road segments), and the density of these intersections. When available, map resolution for a raster map may be determined from the map scale.

The general process is to exclude all unlikely matching point pairs. For example, given a point pair ($x_1$, $y_1$) and ($x_2$, $y_2$) of M, the only point pairs needing consideration are pairs ($lon_1$, $lat_1$) and ($lon_2$, $lat_2$) of S, such that the real world distance between ($x_1$, $y_1$) and ($x_2$, $y_2$) is sufficiently near to the real world distance between ($lon_1$, $lat_1$) and ($lon_2$, $lat_2$). In addition, ($x_1$, $y_1$) and ($lon_1$, $lat_1$) may be considered as a possible matching point if they have similar road degrees and road directions.

Figure 56:
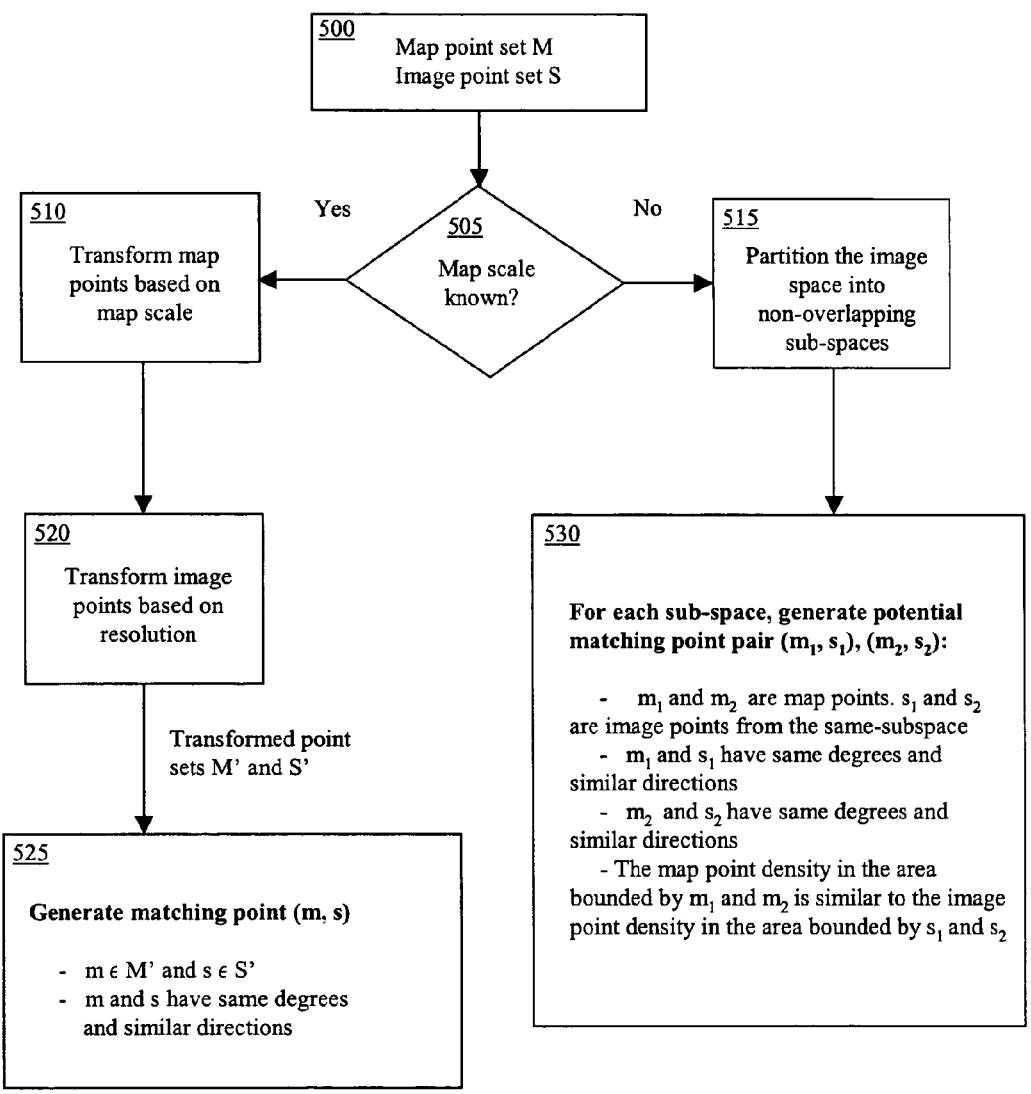
FIG. 56 is a flowchart in accordance with an embodiment of the invention and depicts a process for determining potential matching pairs by exploiting map scale, road directions, and intersection density.

FIG. 56 is a flowchart in accordance with an embodiment of the invention and depicts a process for determining potential matching pairs by exploiting, for example, map scale, road directions, and intersection density. The term "GeoPPM" refers to a specialized point pattern matching process. For simplicity, GeoPPM will be described using map and imagery having orientations in which north is up. However, GeoPPM is equally applicable to other orientations as well.

Referring still to FIG. 56, block 500 includes the identification of map point set M and image point set S. Decision block 505 determines whether or not the map scale is known. If the map scale is known, processing flows to block 510. Otherwise, processing flows to block 515. In block 510, the map points are transformed based on map scale. Similarly, in block 520, image points are transformed based on resolution. The operations of blocks 510 and 520 produce transformed point sets M' and S'. Lastly, in block 525, potential matching points (m, s) are generated.

Returning to decision block 505, situations in which map scale is not known cause processing to flow to block 515, which partitions the image space into non-overlapping subspaces. Then, in block 530, potential matching point pairs ($m_1$, $s_1$), ($m_2$, $s_2$) are generated for each of the sub-spaces generated in block 515. Each of the operations shown in FIG. 56 will be described in more detail in the following sections.

3.2.1.1 Exploiting Map Scale

Consider first the scenario in which map scale is known. In this scenario, the above-noted brute-force point matching process may be improved by exploiting information on direction and relative distances available from the vector sets and maps. The information on direction and distance may be used as prior knowledge to prune the search space of the possible mapping between the two datasets. More precisely, for any point pair ($x_1$, $y_1$) and ($x_2$, $y_2$) on the map, the only point pairs needing consideration are pairs ($lon_1$, $lat_1$) and ($lon_2$, $lat_2$) in the imagery, such that the ground distance between ($x_1$, $y_1$) and ($x_2$, $y_2$) is relatively close to the ground distance between ($lon_1$, $lat_1$) and ($lon_2$, $lat_2$).

The ground distance between ($x_1$, $y_1$) and ($x_2$, $y_2$) may be calculated by multiplying their Euclidean distance by map scale. Optimally, the orientations of ($x_1$, $y_1$) and ($x_2$, $y_2$) should be close to the orientations of ($lon_1$, $lat_1$) and ($lon_2$, $lat_2$). This orientation consistency is also valid for maps with an unknown map scale. There are $|S|^{1.33}$ such pairs in S. Hence, this enhanced processing technique has a run time defined by $O(|M|^3 |S|^{1.33} \log|S|)$.

This performance may be further improved by transforming the points on maps and imagery to a 2D Euclidean space, for which ground distance is the distance measurement. In this embodiment, the real world distance is used between points in the transformed space. Therefore, translation transformation without scaling need only be considered in such a space.

Figure 57:
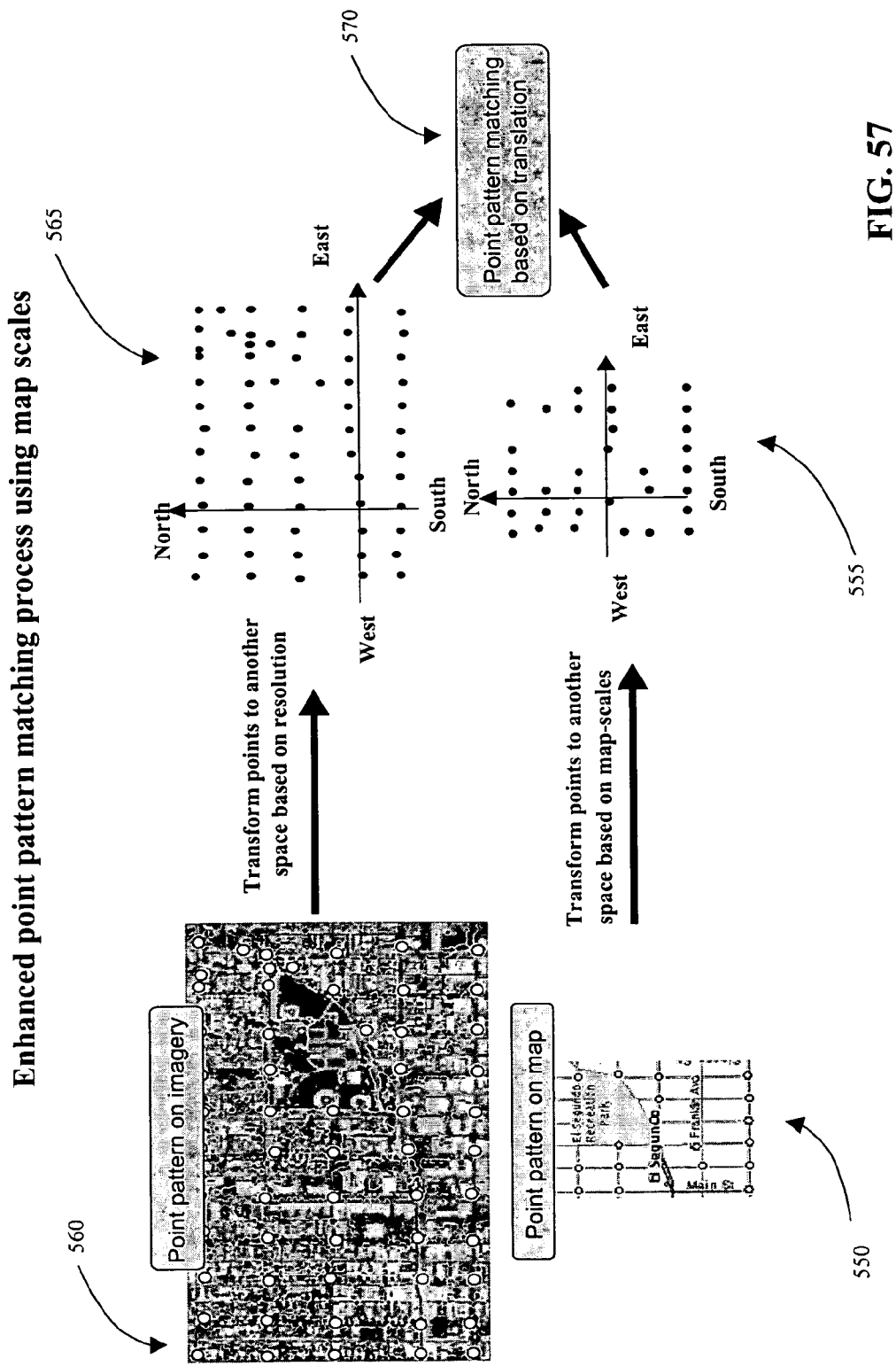
FIG. 57 is a block diagram showing a process for point pattern matching using map scale.

FIG. 57 is a block diagram showing a process for point pattern matching using map scale. This process may be divided into the following subtasks. In a first operation, consider the points on map 550 by identifying one point P as the origin (0,0). Then determine the coordinates of the other points $Q_i(X_i, Y_i)$ as follows. $X_i$ is the ground distance between P and $Q_i$ in east-west orientation, while $Y_i$ is the ground distance between P and $Q_i$ in north-south orientation. Note $X_i$ is negative if $Q_i$ is west of P. Similarly, $Y_i$ is negative if $Q_i$ is south of P. This operation results in point pattern 555.

In a second operation, repeat the just-described similar transformation for each of the points on imagery 560. This operation results in point pattern 565.

In block 570, a third operation compares the two point patterns 555, 565 during a point pattern matching process. To accomplish this, the translation transformation T between the two transformed point patterns needs to be considered. This revised process has an approximate run time of $O(|M|^2 |S| \log|S|)$. Hence, the running time is significantly improved by at least two orders of magnitude. For example, consider $|M|$ set to 57 and $|S|$ set to 1059. This scenario requires that only about $3.6*10^9$ (i.e., $57^2 * 1059^2$) potential matching point pairs need examination. Moreover, only about 6*10⁴ (i.e., 57*1059) potential matching points need examination when using map scale. The exemplary numbers of points are based on the applications described below in Section 3.4.

3.2.1.2 Improvement by Exploiting Geometric Information

In addition to utilizing map scales, the degree of a road intersection and the directions of road segments may also be exploited. More precisely, for any point p on the map, only point q in the imagery need be considered such that the numbers of intersected road segments (i.e., degree) at both points are the same. Furthermore, the direction difference between the road axis intersected at p and the corresponding road axis intersected at q must be less than a pre-defined threshold d. By way of non-limiting example, d was set to 20 degrees in the various applications presented herein.

3.2.1.3 Improvement by Exploiting Point Density and Localized Distribution of Points Although both map scale and geometric information are useful to prune the search space of possible matching point pairs, there are two additional matters which will now be addressed. First, some online map sources contain unknown map scales, such as the maps available from the ESRI ArcWeb Map Viewer Application. A second matter is that based on road degree and direction, further examination of large numbers of potential matching point pairs may be necessary. Particularly, in some urban areas, roads often follow a grid such that most road degrees equal 3 or 4 and have similar angles. Hence, addition information, such as the density of points and localized distribution of points, may be exploited to further reduce the search space.

For imagery with resolution lower than 16 m/pixel, for example, it is somewhat difficult to identify small spatial objects. Hence, conflating a map with images having resolution lower than 16 m/pixel may have less than optimal results. Furthermore, most online map sources contain maps which depict detailed and more accurate road network geometry (without simplification or generalization) under certain resolution levels (about 1 to 15 m/pixel being typical). Such maps begin to generalize after about 16 m/pixel. This implies that for medium and high-resolution maps, road networks are depicted with almost all intersections noticeable.

Figure 58A:
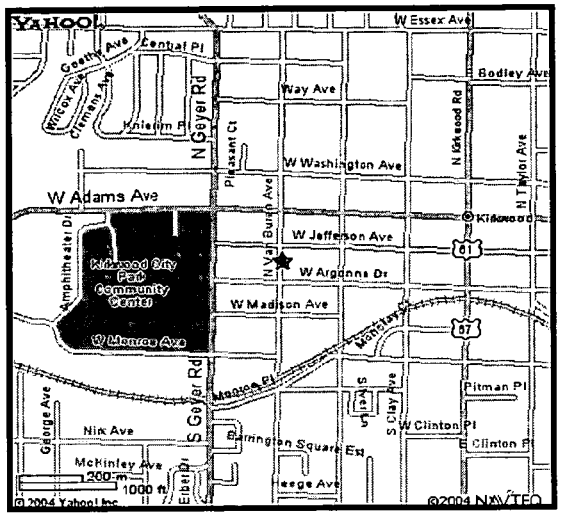
FIG. 58A depicts a map having a resolution of about 4.2 m/pixel.
Figure 58B:
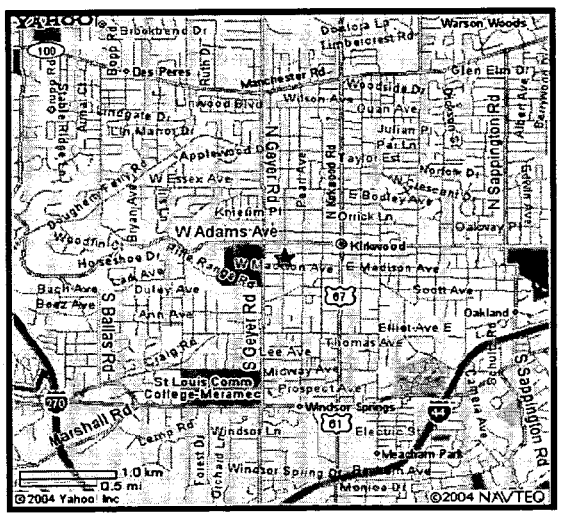
FIG. 58B depicts a map having a resolution of about 14 m/pixel.
Figure 58C:
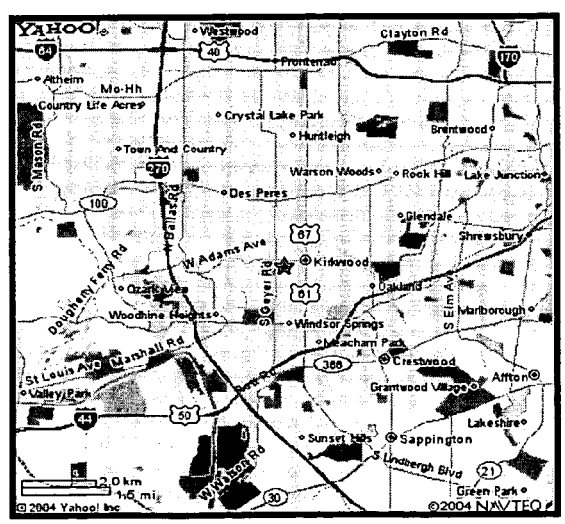
FIG. 58C depicts a map having a resolution of lower than 16 m/pixel.

FIGS. 58A-58C provide examples of maps having different levels of resolution. Specifically, FIG. 58A depicts a map having a resolution of about 4.2 m/pixel, and FIGS. 58B and 58C are maps having a resolution of about 14 m/pixel and lower than 16 m/pixel, respectively. In FIG. 58C, roads are simplified to an abstract level. Hence, the existence of non-identified intersections depends primarily on the map intersection detector performance, and not the map itself.

Since medium and high resolution maps do not usually contain an excessive number of missing or noisy points, the density of the points and the localized distribution of the points may be exploited to find the matched point pattern.

Without loss of generality, consider the scenario in which the points on imagery cover a subset of the points on the map, and the map scales are unknown in advance. Using these parameters, exploitation of point density and localized distribution will now be described.

Figure 59A:
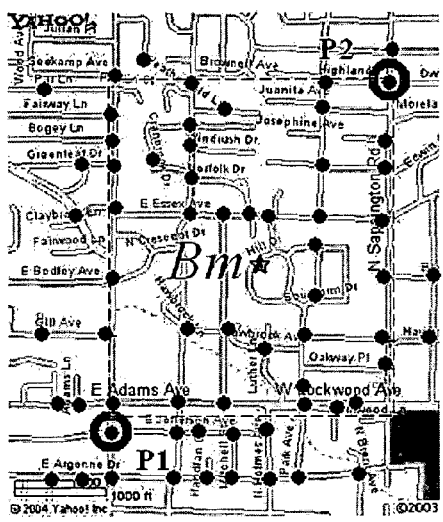
FIG. 59A depicts a map having a particular intersection point density.
Figure 59B:
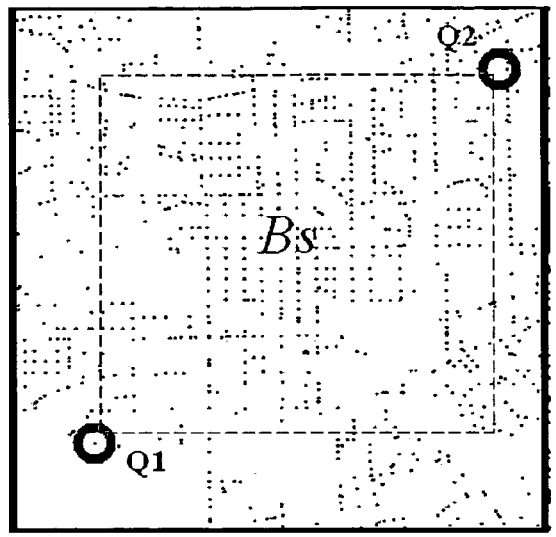
FIG. 59B depicts an image having a particular intersection point density which differs from the point density of the intersection points of FIG. 59A.

With regard to point density, the density of points in a map should be similar to the density of the matched points in the imagery. Using the map of FIG. 59A and the imagery of FIG. 59B as an example, for a given point pair $P_1$ and $P_2$ of M, pairs $Q_1$ and $Q_2$ of S do not need to be considered. This is because the number of points (about 40 points in this example) included in the bounding box Bm (formed by $P_1$ and $P_2$) (FIG. 59A) is significantly different from the number of points (about 800 points) in the bounding box Bs (formed by $Q_1$ and $Q_2$) (FIG. 59B). Note that the background imagery of FIG. 59B has been removed in order to clearly display the distribution of intersection points.

With regard to the localized distribution of points, point density and point distribution is typically considered in a localized area. When examining a data set, it is not necessary to evaluate the whole search space in one step. It is sufficient to partition the search space into smaller sub-parts and evaluate each independently since the points of the matched pattern tend to scatter in neighboring (or localized) areas. Hence, the desired transformation may be computed from local, potentially matching, point pairs, without considering all pairs from the entire data set. The objective is not to find the best common point pattern from the map and imagery point sets. Instead, point pattern matching may be achieved by finding any correct matching point pair which can be used to form the transformation that transforms the majority of map points to some image points.

Figure 60A:
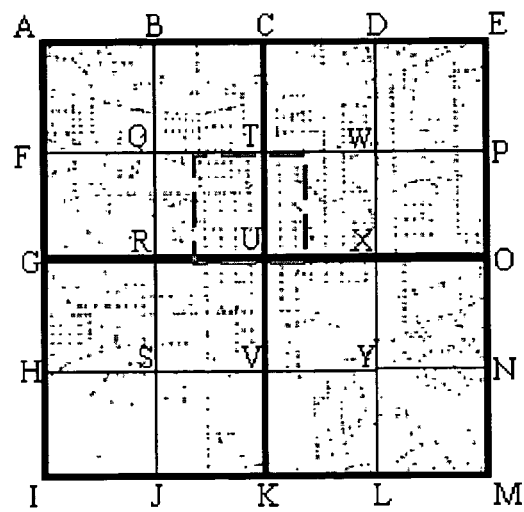
FIG. 60A depicts an image partitioned into 16 equi-sized cells.
Figure 60B:
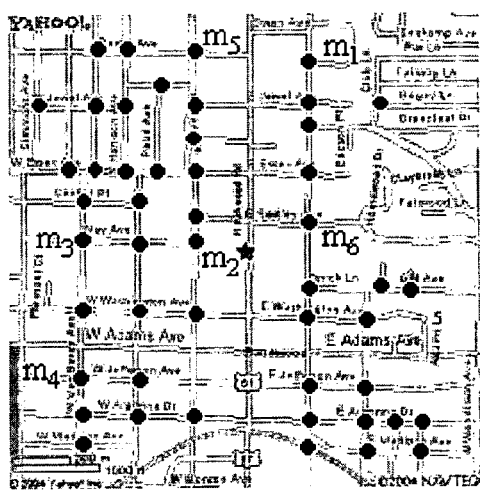
FIG. 60B depicts a map containing 57 detected intersections.
Figure 60C:
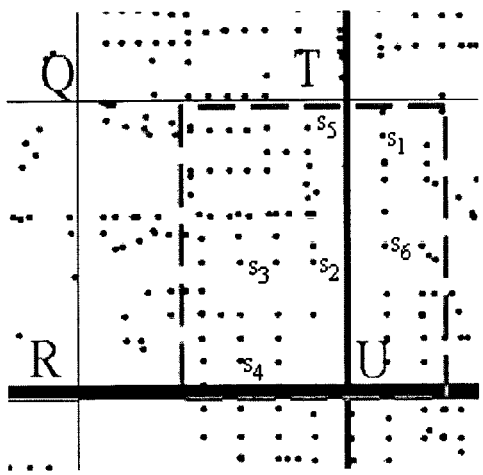
FIG. 60C is an enlarged view of a portion of the image of FIG. 60A.

FIG. 60A depicts an image partitioned into, for example, 16 equi-sized cells (e.g., cells AFQB and BQTC). There are 1059 intersections on this image. Note that the background imagery of FIG. 60A has been removed in order to clearly display the distribution of intersection points. FIG. 60B depicts a map containing 57 detected intersections. The dashed rectangle of FIG. 60A corresponds to the area of the map of FIG. 60B. FIG. 60C is an enlarged view of a portion of the image of FIG. 60A. By way of example, several matching point pairs on the imagery and map have been marked (e.g., the points $m_1$, $m_2$, $m_3$, $m_4$, $m_5$, and $m_6$ on the map correspond to points $s_1$, $s_2$, $s_3$, $s_4$, $s_5$, and $s_6$ in the enlarged area of FIG. 60C).

Two operations for locating matching point pairs using this grid structure are as follows:

A first operation includes choosing point pair $P_1$ ($x_1$, $y_1$) and $P_2$ ($x_2$, $y_2$) from M. Then, for every pair of distinct points $Q_1$ ($lon_1$, $lat_1$) and $Q_2$ ($lon_2$, $lat_2$) in the same cell (e.g., cell AFQB), compute the transformation T, if: (1) there is similar point density in the bounding boxes formed by ($P_1$, $P_2$) and ($Q_1$,$Q_2$), respectively; and (2) the road directions of $P_1$ ($P_2$) are similar to the road direction of $Q_1$ ($Q_2$).

Transformation T may be applied to all of the points in M to determine if there are more than α|M| points, within the threshold δ, that can be aligned with points on S. The above-mentioned process may be repeated for each possible point pair from M With proper settings of α and δ, it is likely that this approach obtains some correct matching point pairs. The matching point pairs notation (($m_i$, $s_i$),($m_j$, $s_j$)) implies that $m_i$ matches $s_i$, and $m_j$ matches $s_j$. Accordingly, correctly matching point pairs include (($m_2$,$s_2$), ($m_5$,$s_5$)) and (($m_3$, $s_3$),($m_4$, $s_4$)) in cell QRUT, or (($m_1 s_1$),($m_6$, $s_6$)) in cell TUXW. This approach conserves running time since point pairs that are located in different cells (e.g., the image points $s_1$ and $s_4$) do not need examination.

In a worst-case scenario, it is possible that no matching point pairs are located after examining each cell. Such a scenario may be resolved using a second operation such as, for example, the HiGrid structure. This embodiment of the present invention will now be described in conjunction with FIG. 61.

Figure 61:
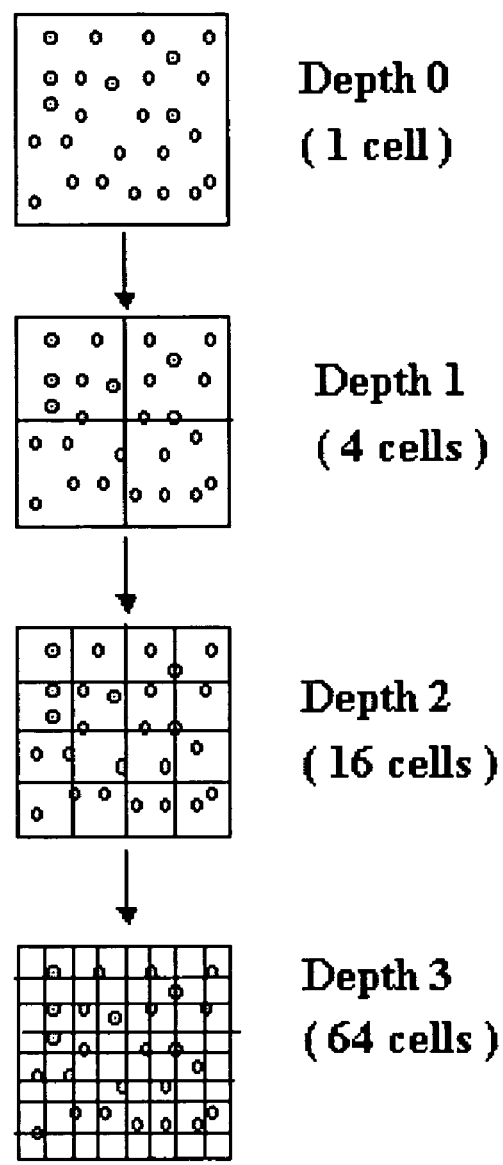
FIG. 61 depicts a hierarchical grid structure, referred to as HiGrid.

FIG. 61 depicts a hierarchical grid structure, referred to as HiGrid, to implement the process of examining increasingly higher levels of cells to identify matching point pairs. The HiGrid is shown recursively subdividing each cell or space into four sub-spaces. Four distinct levels are shown in FIG. 61, denoted by depths 0-3. The higher the level is, the smaller the depth.

For example, if no matching point pairs are located a depth 3, which contains 64 cells, then the next higher level of cells may then be checked for matching point pairs. In the example of FIG. 61, the 16 cells of depth 2 is the next higher level of cells which may be checked using the first operation described above. As a specific example, the 16 cells of depth 2 may be grid AFOB or CTWD (FIG. 60A).

If no matching point pairs are located at depth 2, then depth 1 may then be checked since it is the next higher level of cells. Depth 1 contains 4 cells, a specific example of which is grid AGUC or CUOE (FIG. 60A). Depth 0 may also be checked if depth 1 does not contain any matching point pairs.

This process may halt whenever matching point pairs are identified, or the highest level (i.e., the entire point set) has been reached and examined. Four distinct cell depth levels are shown in FIG. 61, but greater or fewer depth levels may alternatively be implemented.

Since the points of the matched pattern tend to scatter in localized areas, there is a significant possibility that matching point pairs can be identified in the cells of lower levels. Hence, it is frequently not necessary to search for matching point pairs in cells of higher levels.

FIG. 62 is a table showing data collected during an exemplary point pair finding process. This table shows matching results for all possible matching point pairs examined in each cell. Note that this matching point pair finding process not only identifies the number of map intersections that can be aligned with intersections on imagery within the threshold 8 (i.e., the number 45, 46, etc. in the table), but also identifies the number of such intersections using different threshold settings (i.e., different $d_i$). The values of these thresholds vary from $d_0$ m to $2*\delta$m. As an example, $d_0$ was set to 3 m, $d_{i+1}$ is equal to $d_i+3$, and $\delta$ is 30 m. Note that $d_j$ (i.e., $\delta$) is set to 30 meters, based on practical applications which provided random sample datasets. This additional information may be utilized in a dynamic threshold adjustment process as described in Section 3.2.2. Redundant examination of matching point pairs in higher-level cells may be avoided using the data provided in this table.

The various numbers provided in the cells of this table reflect the number of matched points using a specific threshold $d_i$. For example, the number "5" in cell ([$(m_2, s_2), (m_5, s_5)$], $d_0$). The potential matching point [$(m_2, s_2), (m_5, s_5)$] is used to generate transformation T. After applying T to all map points, there are five points which belong to some image points within the distance threshold of $d_0$ meters.

A remaining consideration relates to the determination of depth k (the highest level has depth zero) of HiGrid. One option is to calculate k based on the number of points in the imagery. For instance, when building the HiGrid structure, an image may have |S| points, which are partitioned into b subgrids. In addition, assume that the points are uniformly distributed over the space, and that there are n points (on average) for each cell of the lowest level. Using these assumptions, the following inequality is presented:

$$n*b^k \leq |S| < n*b^{k+1} \quad \text{(Eq. 19)}$$

This implies that the depth k of the HiGrid structure is:

$$\left\lfloor \log_b \frac{|S|}{n} \right\rfloor. \quad \text{(Eq. 20)}$$

Utilizing HiGrid results in an efficient, systematic, and hierarchical technique to search for matched point patterns in local (i.e., small) regions. Furthermore, each cell of the same level is independent (i.e., there is no overlap) and may be processed in parallel, if desired.

In accordance with an embodiment, the HiGrid employs equi-sized cells at the same level. Accordingly, the point density of each cell may vary (because real world data may not obey a uniform distribution), and it may not have a similar point density to that of the map. However, as described above, if no matching point pairs are identified in a lower level, then the search will continue to the upper levels of the HiGrid. Hence, any problems created by cells having varying point density may be resolved by utilizing the hierarchical HiGrid structure.

The worst case scenario would require searching the entire space (i.e., the entire image). However, under this extreme scenario, the running time may still be reduced by applying the point density checking in bounding boxes (an example of which is shown in FIGS. 59A and 59B). Based upon the practical applications described below in Section 3.4, this approach significantly reduces the execution time and locates an accurate pattern.

In sum, this approach utilizes exploited geospatial information (e.g., map scale, road directions and density of intersections) simultaneously to prune search space. More precisely, if the map scale is known in advance, the approach utilizes map scale and road intersection directions to identify the common point pattern. Otherwise, it locates the point pattern by using the HiGrid structure, point density and road intersection directions. That is, in one implementation for GeoPPM, the HiGrid is not used for maps with known map scales (due to the fact that relatively sufficient performance may be derived using the map scale, as described in Section 3.4.3.1). If desired, the HiGrid structure and point density may also be utilized for maps with known map scales.

3.2.2 Other Enhancements for GeoPPM

The above section described techniques for exploiting additional information to improve GeoPPM. This section describes issues that may affect the accuracy of GeoPPM, and various solutions which overcome these issues.

There are three primary reasons why GeoPPM may be unable to accurately locate a matched point pattern (if such pattern exists). The first issue relates to intersection inconsistency. For instance, some road intersection degree and directions may be inconsistent between map intersection points and the corresponding imagery intersection points. Although degree and directions are helpful information, sometimes they may mislead the matching process due to this kind of data inconsistency. This inconsistency typically occurs because of the various resolutions of diverse geospatial datasets, and the differing techniques for computing road direction, and noisy information of each dataset. Using random samples as an example, it was discovered that 10.2% of map intersections have different degrees from the corresponding imagery points. Moreover, considering the road direction dissimilarity as well, it was discovered that more than 18.3% of the map intersections have different directions from the corresponding imagery points. These inconsistencies are more problematic with low resolution maps (e.g., less than 10 m/pixel) and imagery. This is because the map intersection detector is less accurate when analyzing low resolution maps. Therefore, if the GeoPPM process cannot locate the matched pattern using degree and directions, it may relax the degree and directions constraints and search again.

A second consideration relates to similar point distribution. The examples of similar point distribution over neighboring regions could be found in urban areas where some roads are in a grid shape with similar block distances, and similar intersection degrees and directions. This is a challenging situation.

Without knowing any other attribution information (e.g., road names), this approach can alleviate this problem by focusing on larger maps which are more likely to have a unique pattern of points.

A third consideration concerns the setting of the thresholds α and δ. For each map type, the parameters α and δ, which are two fixed constants used in the point pattern matching process, may be determined by trying sample values and examining the results. However, these parameters typically are not formulated in a general way since these values are dependent on the datasets, data quality, and resolutions. Using the same thresholds for different resolution maps, or even different types of maps, may result in either finding multiple matching point pairs or not finding any matching point pairs.

For the first scenario (i.e., finding multiple matching point pairs), a refinement process may be performed to obtain the best matching point pair among the multiple pairs. For instance, in the table of FIG. 62 (an example of the matching point pair record), a list is provided of all possible matching point pairs. Among these possible matching point pairs, the matching point pairs that meet the threshold requirements (i.e., the settings of α and δ) need consideration. A weighted score may be defined for matching point pairs that meet the threshold settings.

An example of one such weighted scored is as follows:

$$WeightedScore = \sum_{i=0}^{j} w_i * (n_i - n_{i-1}),$$ (Eq. 21)

where $n_i$ is the number of matched points when the threshold is set to $d_i$ (e.g., the number in the data cells of FIG. 62). The term $d_j$ is equal to δ, and $n_j$ is greater than or equal to α*|M|. The term $w_i$ is the weight which is inversely proportional to $d_i$ (i.e., smaller $d_i$ has higher weight $w_i$). Note that $n_k$=0, if k<0.

The weighted score may be calculated for matching point pairs that meet the threshold settings of α and δ. Subsequently, the weighted score may be used to sort possible matches. The matched point pair with the highest score may be used to compute the transformation. By calculating the weighted scores, the issue of ambiguity may be overcome because multiple candidate matching point pairs are found.

For the second scenario (i.e., not finding any matching point pairs), a threshold adjustment process may be utilized. This process fixes parameter α, and dynamically adjusts the threshold δ. More precisely, if GeoPPM cannot find a match under the initial values of δ and α, it would increase δ, and then search again. This process may be repeated until GeoPPM finds a matching point pair, or reaches the upper bound of possible thresholds, thereby resulting in a no match found condition. This may seem that it increases the running time due to the adjustments. However, the number of matched points due to the different threshold settings may be stored in matching point pair records, such as the records depicted in the table of FIG. 62, when GeoPPM is initially executed. Hence, if a potential point pair is examined and stored in matching point pair records, the process does not have to examine again that particular point pair. The computation becomes a table-lookup. If there is no such record, then GeoPPM examines this new possible matching point pair.

3.3 Aligning Map with Imagery

Figure 63A:
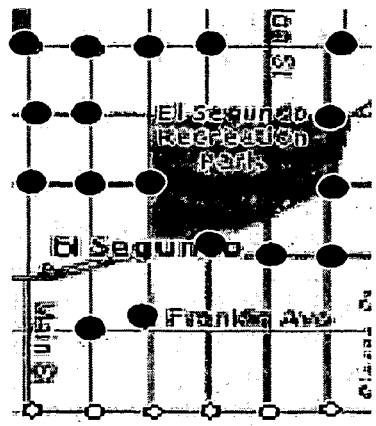
FIG. 63A depicts a map containing a number of black circles which denote control point pairs.
Figure 63B:
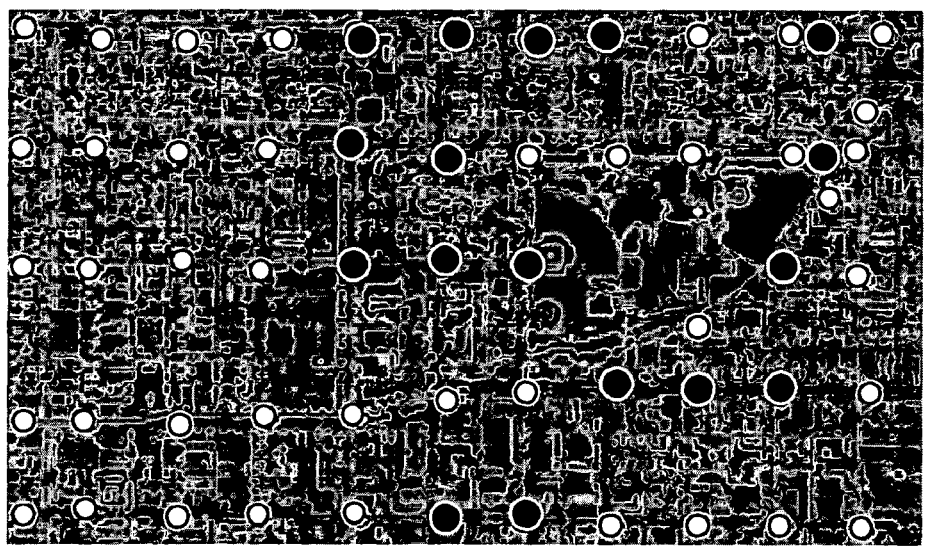
FIG. 63B depicts an image which contains a number of black circles which illustrate a matched point pattern that corresponds to the control point pairs of the map of FIG. 63A.

As an example, the above-described GeoPPM technique for identifying matched point pairs results in the matched point patterns depicted in the map and corresponding image of FIGS. 63A and 63B. More specifically, FIG. 63A is a map containing a number of black circles which denote matched control point pairs. FIG. 63B is an image which contains a number of black circles which illustrates a matched point pattern that corresponds to the matched point pattern of the map of FIG. 63A.

Once a set of matched control point pairs for the map and imagery has been obtained, one of these datasets may be deformed (e.g., the source image) to align to the other dataset (e.g., the target image) utilizing the identified control point pairs. In accordance with an embodiment, the map will serve as the source image and the orthoimage serves as the target image.

One technique for overall alignment of an image and a map may be accomplished by locally adjusting the map to conform to the image. To accomplish local adjustments, the domain space may be partitioned into small portions. Then, local adjustments may be applied to each individual portion. Similar to vector-imagery conflation, a space partition technique, such as Delaunay triangulation, may be performed with the set of control points on the map. The Delaunay triangulation generates a set of equivalent triangles with corresponding control points on the imagery. Once Delaunay triangulation has been completed, a technique such as "rubber sheeting" may be used to deform the map pixels algorithmically, forcing registration of control points on the map with their corresponding points on the imagery.

For example, as discussed in Section 2.3.2, initial calculations include determining transformation coefficients, which may be used to map each Delaunay triangle on the map onto its corresponding triangle on the imagery. Second, each pixel in each triangle on the imagery may be replaced, semi-transparently, with the corresponding pixel on the map by using the computed transformation coefficients.

FIGS. 64A and 64B show Delaunay triangulation on imagery and a map, using matched point pairs as control point pairs. The arrow illustrates that the pixels of the triangle on the imagery may be (semi-transparently) overlaid by the corresponding pixels on the map (i.e., rubber-sheeting). In practice, if the conflation area (i.e., the convex hull formed by the control points) of the source image is significantly larger than that of the target image, the rubber-sheeting results may be distorted. This is because the sampling frequency is insufficient. To reduce or eliminate any undesirable distortion, the conflation area on the map and imagery may be resealed or resampled so that they are the same or similar in size. Once the map and image has been resealed, Delaunay triangulation and rubber-sheeting may be applied.

3.4 Performance Evaluation

By way of example, various street maps and imagery were utilized to evaluate the automatic conflation of street maps and imagery using real world data. Of interest was the measuring accuracy of the integration or alignment of maps and imagery using the techniques disclosed herein.

3.4.1 Experimental Setup

Figure 66:
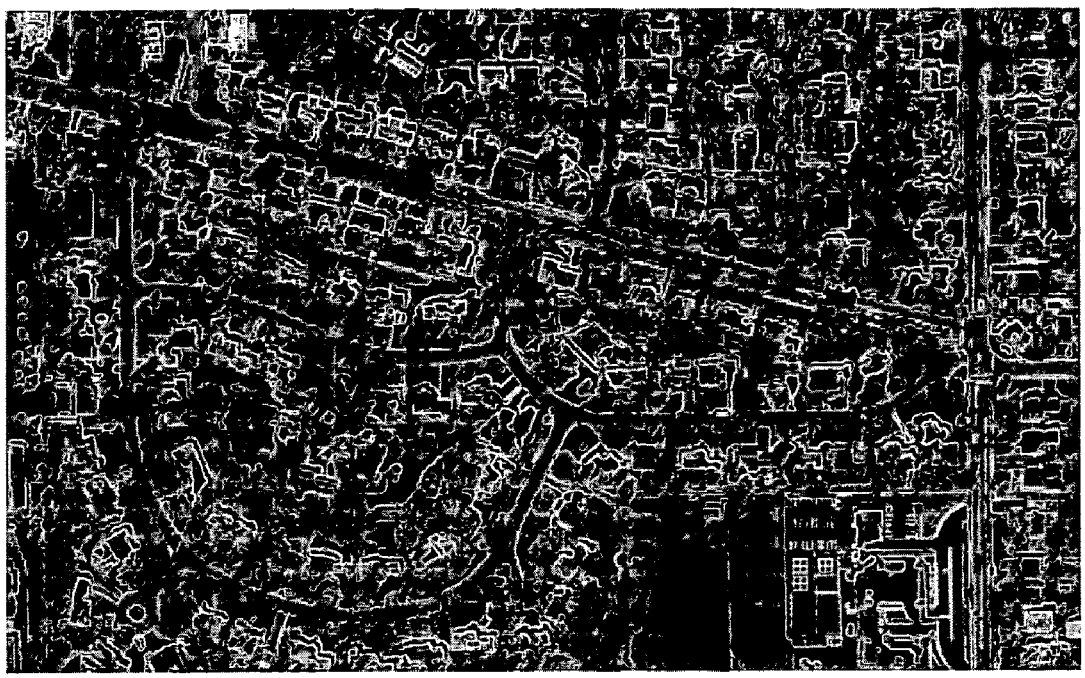
FIG. 66 depicts an image showing about 0.6% of the imagery used in test data set 2.

FIG. 65 is a table that summarizes the various datasets and test sites used for the performance evaluation. The imagery used in the experiments is substantially the same as that used for the vector-imagery conflation evaluation discussed above. That is, test data set 1 includes georeferenced USGS DOQ gray-scale orthoimagery with 1 m/pixel resolution, and depicts portions of El Segundo, Calif. Test data set 2 includes georeferenced USGS high resolution color orthoimagery with 0.3 m/pixel resolution, and depicts portions of the county of St. Louis, Mo. FIG. 66 depicts an image showing about 0.6% of the imagery used in test data set 2.

Street map (raster data) data was obtained from, for example, five different online map services. These map sources included ESRI Map, MapQuest Map, Yahoo Map, U.S. Census TIGER Map, and USGS Topographic Map. Although these street maps primarily depict roads, they often included prominent natural and cultural features, such as rivers, parks, and schools. The maps evaluated in these experiments involve various map resolutions (or map scales) ranging from 1.2 m/pixel to 14.08 m/pixel. These street maps (e.g., the sources of the road information) are described as follows.

Figure 67A:
FIG. 67A depicts an ESRI Map.

FIG. 67A depicts an ESRI Map, which is generated based on data provided by Geographic Data Technology (GDT). ESRI Map is a relatively high quality street map with highly accurate street geometry. Neither map scale nor geo-coordinates for ESRI maps were available, and thus were not used in the experiments presented herein.

Figure 67B:
FIG. 67B depicts a MapQuest Map.

MapQuest maps and Yahoo maps are based on NAVTEQ NAVSTREETS. These map sources also provide relatively high quality street map data with highly accurate street geometry, and they include diverse map scales, sizes, and colors. FIG. 67B provides an example of a MapQuest Map having a resolution of 4.8 m/pixel.

Figure 67C:
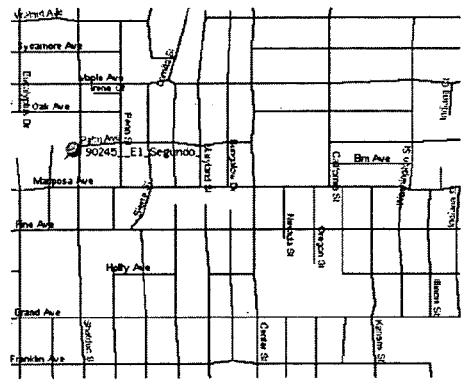
FIG. 67C depicts a TIGER/Line Map.

FIG. 67C is a TIGER Map generated from U.S. Census TIGER/Line data (discussed in Section 2.4.1). This map has a resolution of 4.17 m/pixel, and has relatively poor positional accuracy and road geometry. Note that TIGER Map is the only map type that provides map geo-coordinates.

Figure 67D:
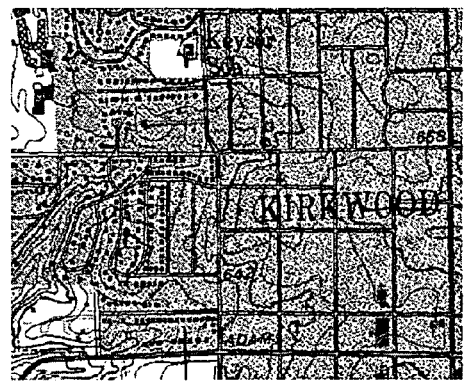
FIG. 67D depicts a USGS Topographic Map.

FIG. 67D is a USGS Topographic Map that depicts roads, and prominent natural and cultural features. This map has a resolution of 2 in/pixel, and includes contour lines to show elevation differences. Such detail is useful for local area planning and helpful to hikers because this map can show elevation changes along a trail, for example.

Figure 68A:
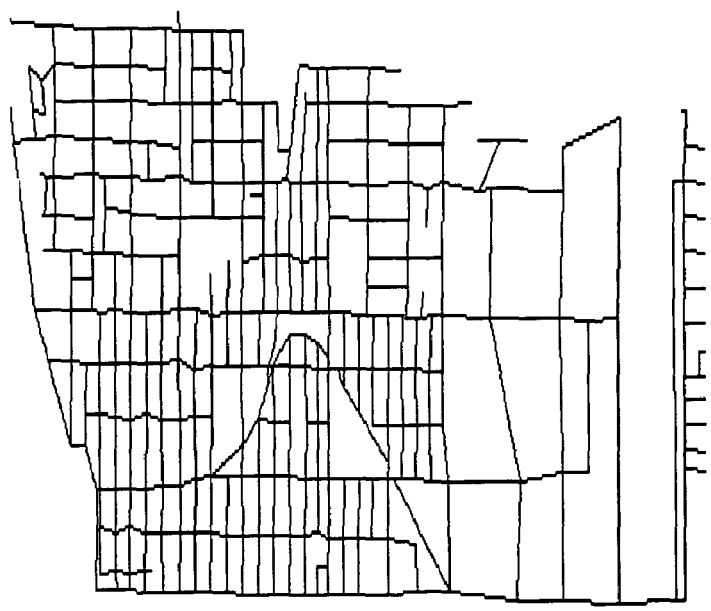
FIG. 68A provides an example of TIGER/Lines road network vector data.
Figure 68B:
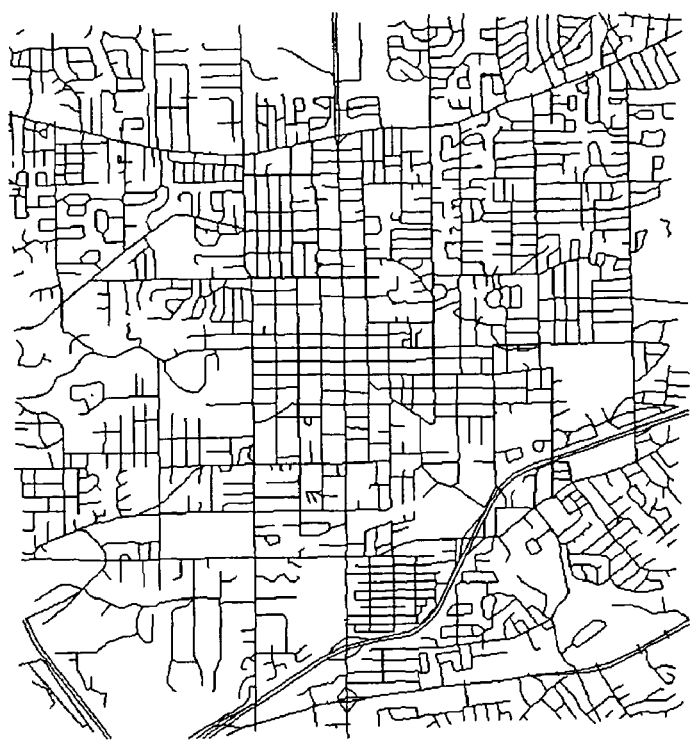
FIG. 68B provides an example of MO-DOT road network vector data.

Vector data, also referred to herein as road network data, was used as the "glue" to align these maps with imagery. FIG. 68A provides an example of TIGER/Lines road network vector data, which was utilized for test data set 1. Similarly, FIG. 68B provides an example of MO-DOT road network vector data, which was used for test data set 2.

3.4.2 Evaluation Methodology

This section provides an evaluation method to assess the alignment of identified features on the map, with respect to the corresponding features on the imagery. In particular, the alignment of the conflated map roads with respect to the corresponding roads on the imagery is considered. To accomplish this, the conflated map road pixels are "vectorized" so that the same evaluation schema utilized for vector-imagery conflation, described above in Section 2.4.2, may be used to compare the conflated (and vectorized) map road network with the reference imagery road network.

This evaluation process includes, among other things, measuring the completeness, correctness, and positional accuracy of the map-imagery conflation process. Completeness refers to the percentage of the reference roads in imagery for which conflated map roads were generated. Correctness refers to the percentage of correctly conflated map roads with respect to the total number of conflated map roads. Positional accuracy denotes the percentage of the total length of the conflated map roads that are within a specific distance of the reference roads. Two metrics, referred to as precision and recall, may additionally be used to measure the performance of the GeoPPM process. These metrics are helpful since the accuracy of matched points significantly affects the conflation results.

First of all, the point pattern generated by GeoPPM may be defined as a set:

$$Ret_{Pat} = \{(m_i, s_i)| \quad \text{(Eq. 22)}$$

where $m_i$ is the point on the map and $s_i$ is the corresponding imagery point located by GeoPPM.}

To measure the performance of GeoPPM, the set $Ret_{Pat}$ may be compared with respect to the real matched point pattern set $Rel_{Pat}$ (defined in Section 3.2).

Using these terms, the following is defined:

$$\text{Precision} = \frac{|Ret_{pat} / Rel_{pat}|}{|Ret_{pat}|} \quad \text{(Eq. 23)}$$

$$\text{Recall} = \frac{|Ret_{pat} / Rel_{pat}|}{|Ret_{pat}|} \quad \text{(Eq. 24)}$$

In the experiments, the set $Ret_{Pat}$ qualifies as a matched point pattern if and only if precision is greater than 80% and recall is higher than 60%. Higher precision was used in this example because the conflation process does not typically require a large number of control point pairs to perform accurate alignment. Indeed a smaller set of control points with higher accuracy is sufficient for the conflation process.

The experiments included first obtaining online orthoimages covering the experimental areas, and identifying road intersection points on the images utilizing information inferred from the vector dataset (as described in Section 3.1.1 and the performance evaluation illustrated in Section 2.4). Then, various street maps (with diverse sizes and map scales) were randomly downloaded within these areas. These street maps were obtained from the above-mentioned five separate map sources. Another operation extracted an intersection point set for each map. Then, the GeoPPM process computed the alignment between the point set on each map with the point set on the image. Finally, for each map type, the map and imagery was aligned based on the matched point pattern. The conflation results were evaluated, resulting in the experimental results provided in the following section.

3.4.3 Experimental Results and Interpretations

The performance of the GeoPPM process and the performance of the overall map-imagery conflation is presented below.

3.4.3.1 Performance of GeoPPM

After conflating road vector data with imagery, 281 intersection points were identified on the image of test data set 1 (with 88.6% precision and 86.1% recall) and 1059 intersections on the image of test data set 2 (with 91.6% precision and 88.3% recall).

The precision and recall of intersection points on the imagery of both test datasets was computed using Eq. (3) and Eq. (4). Since most of the intersections on the imagery have corresponding intersections on road vector data, there is only a slight difference between precision and recall. Because the tested maps have diverse sizes and scales, the number of points detected on each map is different. On average, there were about 60 points on each map, resulting in 92% precision and 67% recall (on average) for identifying road intersections on different maps.

When applying GeoPPM to these detected point sets, additional information may be exploited to improve performance. In particular, if the map scale is known in advance, the map scale and road intersection directions may be used to identify the common point pattern. Otherwise, the point pattern may be located using the HiGrid structure and road intersection directions. That is, in the experiments, the HiGrid structure was not used for maps with known map scales since sufficiently accurate performance was possible using only the map scale. Once again, this approach may also utilize HiGrid for maps with known map scales. In addition, for the identified point pattern, optional post-filtering was applied to eliminate the matched points that have different degrees or significantly different angles.

In general, higher precision of control points is more important than higher recall for the conflation process. By utilizing the post-filter, precision was improved at the cost of reducing the recall. Since the map intersection detector is somewhat limited when computing road directions in low resolution maps (e.g., less than 10 m/pixel), GeoPPM does not generally rely on this direction information. Hence, for low resolution maps, GeoPPM typically examines only point degree, and does not check the directions. For the same reasons, GeoPPM does not usually apply a post-filter to low resolution maps.

FIGS. 69A-69C are tables providing performance data obtained from the GeoPPM process. FIG. 69A depicts GeoPPM performance with respect to different map sources, FIG. 69B depicts GeoPPM performance with respect to the two different test regions, and FIG. 69C shows GeoPPM performance with regard to maps of different resolutions.

Figure 70A:
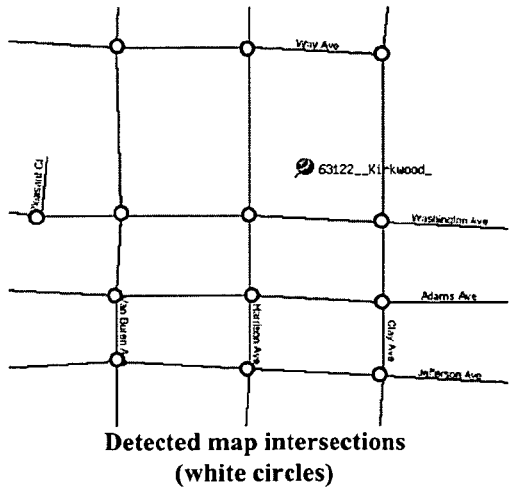
FIG. 70A depicts a TIGER Map with detected map intersections.
Figure 70B:
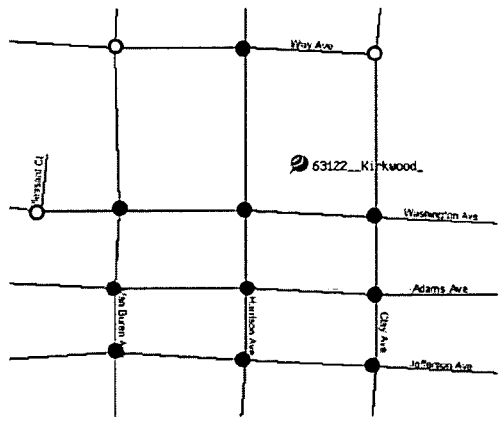
FIG. 70B depicts the TIGER Map of FIG. 70A, and includes black circles marking the point pattern resulting from a GeoPPM process.
Figure 70C:
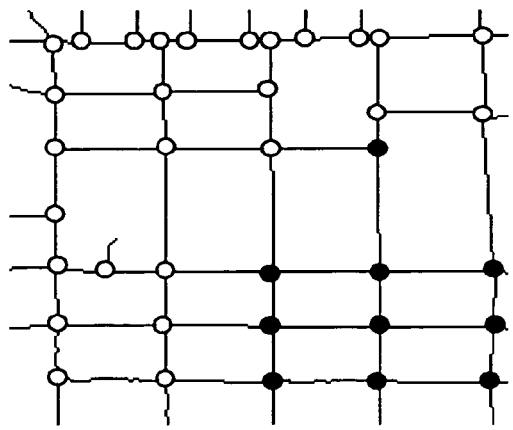
FIG. 70C depicts an image with black circles marking the corresponding point pattern identified in the map of FIG. 70B.

Of the fifty maps tested during the experiments, only one map contained an intersection point set which did not accurately align with the corresponding point pattern on the image. An example of this map is shown in FIG. 70A, which is a TIGER Map having a resolution of about 1.85 m/pixel. The 13 detected intersections are shown as white circles on this map. FIG. 70B depicts the same TIGER Map, with black circles marking the point pattern resulting from the GeoPPM process. FIG. 70C depicts an image with black circles marking the corresponding point pattern identified in the map of FIG. 70B. Note that the identified point pattern on the image is misaligned to the extent that the point pattern is shifted one block to the right. This misalignment is likely the result of roads on the misaligned map forming a grid with similar block distances, and that the map covers a relatively smaller area. Note that the background imagery of FIG. 70C was omitted so that the distribution of points on the imagery are more clearly visible.

The maps available from TIGER Map and MapQuest typically have fixed dimensions. The covered area of these maps becomes smaller whenever a user zooms in on the area of interest. If these small maps contain a unique point pattern across the dataset, GeoPPM may be used to identify the matched pattern from the maps, and can do so with very few points.

Figure 71A:
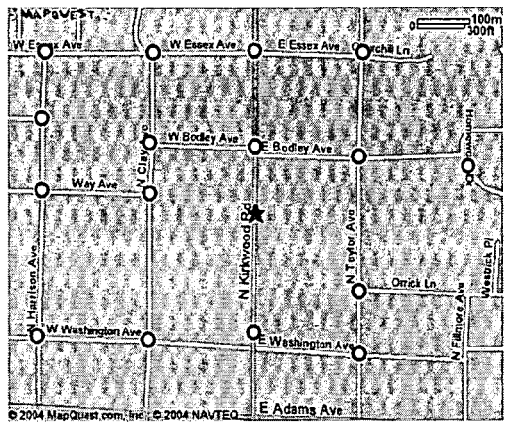
FIG. 71A depicts a MapQuest Map having 16 detected intersection points.
Figure 71B:
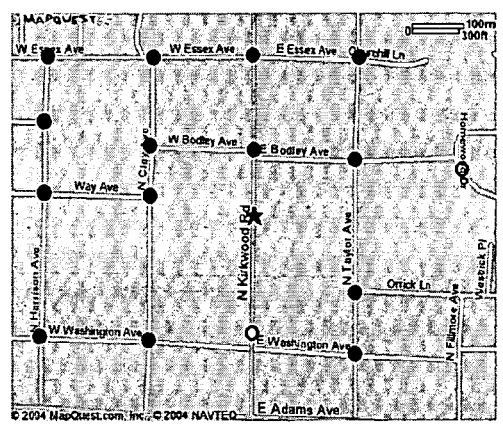
FIG. 71B depicts the MapQuest Map of FIG. 71A, and include black circles marking the point pattern resulting from a GeoPPM process.
Figure 71C:
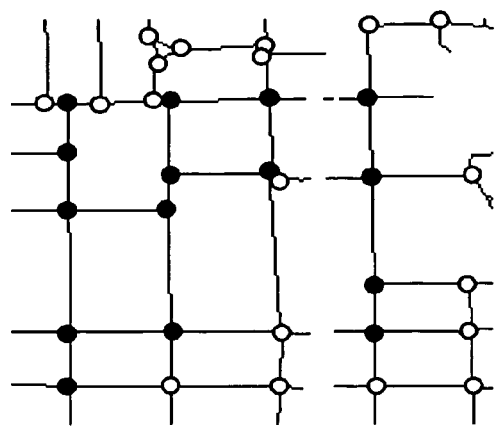
FIG. 71C depicts an image with black circles marking the corresponding point pattern identified in the map of FIG. 71B.

An example of accurately aligning a point pattern on an image is shown in FIGS. 71A-71C. FIG. 71A depicts a MapQuest Map having 16 detected intersections, which are shown as white circles on the map. FIG. 71B depicts the same MapQuest Map, with black circles marking the point pattern resulting from the GeoPPM process. FIG. 71C depicts an image with black circles marking the corresponding point pattern identified in the map of FIG. 71B. In contrast to the example of FIG. 70C, the image of FIG. 71C contains an accurately aligned point pattern, which is shown by the black circles.

The accuracy of the GeoPPM approach may be maximized by focusing on larger maps, which are more likely to contain a unique pattern of points. In general, based upon the data presented in the tables of FIG. 69A-69C, the following observations are possible.

First, GeoPPM performs well with respect to maps queried from diverse online map services. Lower performance may be experienced from a map system, such as TIGER maps, because of the above-noted misaligned point pattern (i.e., precision 0% and recall 0%).

Second, there appears to be no significant difference in the performance over various resolutions of maps. Even for low resolution maps, GeoPPM obtains high precision and recall. However, lower resolution maps, such as those having a resolution lower than 7 m/pixel, have lower recall rates for detected map intersections (with precision 79.4% and recall 21.2%, on average). This is likely the result of the relatively lower degree of performance of the map intersection detector on low resolution maps. This performance may affect the conflation results, even though GeoPPM obtained high precision and recall from these detected map points.

There are two primary reasons for GeoPPM not achieving 100% precision for high to medium resolution maps.

Figure 72A:
FIG. 72A depicts a map having a point pattern resulting from a GeoPPM process.
Figure 72B:
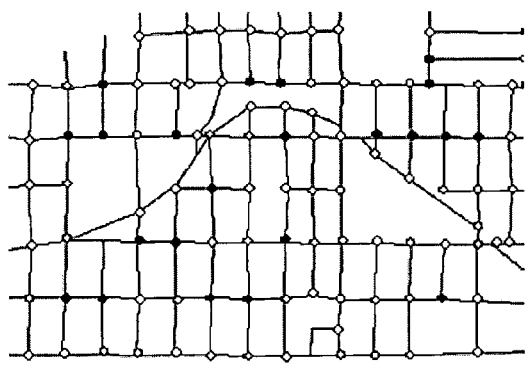
FIG. 72B depicts an image with black circles marking the point pattern resulting from the GeoPPM process.
Figure 72C:
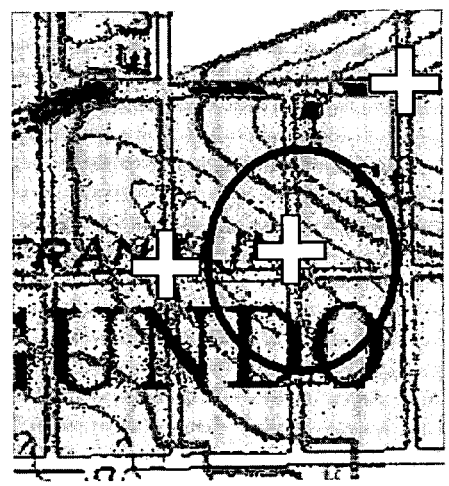
FIG. 72C is an enlarged view of the lower left portion of the map of FIG. 72A.

First, the GeoPPM process may detect some points that are misaligned with the imagery points, but which are very close to the real imagery intersections. Second, GeoPPM tolerates the existence of misidentified intersections in maps. In the example shown in FIG. 72A, GeoPPM filtered the misidentified points in the lower left corner (not shown in this figure). However, it is somewhat difficult to filter out intersection points that are very close to the map intersections. In this figure, the point pattern is identified with white crosses. FIG. 72B depicts an image with black circles marking the corresponding point pattern resulting from the GeoPPM process. FIG. 72C is an enlarged view of the lower left portion of the map of FIG. 72A. The large black circle highlights a matched point which is very close to an associated map intersection. The identified point even has similar degree and directions as the corresponding imagery point.

3.4.3.2 Performance of Overall Map to Imagery Conflation

After applying GeoPPM, an accurate control point pair set for each map is generated. The next operation includes using these control points to conflate the maps with imagery.

FIGS. 73A-73D provide several examples of map-imagery conflation using the conflation techniques disclosed herein. As shown in these aligned images, spatial objects (e.g., streets) may be annotated with imagery using the attribution information contained in the maps.

Figure 73A:
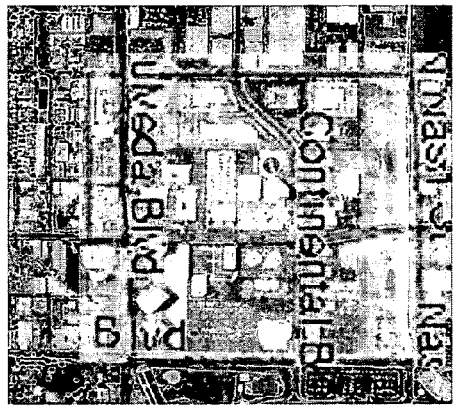
FIG. 73A depicts a conflated image for El Segundo, Calif., which resulted from a MapQuest Map to imagery conflation process.
Figure 73B:
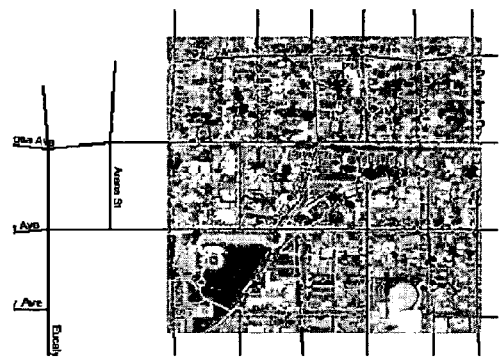
FIG. 73B depicts a conflated image for El Segundo, California, which resulted from a TIGER Map to imagery conflation process.
Figure 73C:
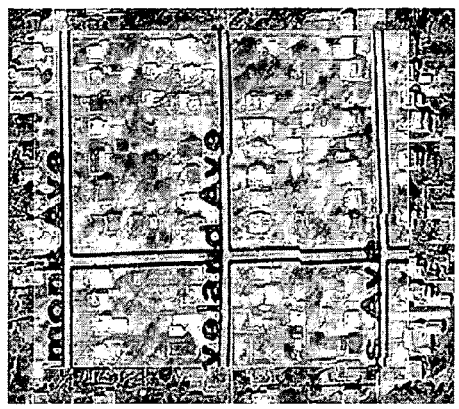
FIG. 73C depicts a conflated image for St. Louis, Mo., which resulted from a ESRI Map to high resolution imagery conflation process.
Figure 73D:
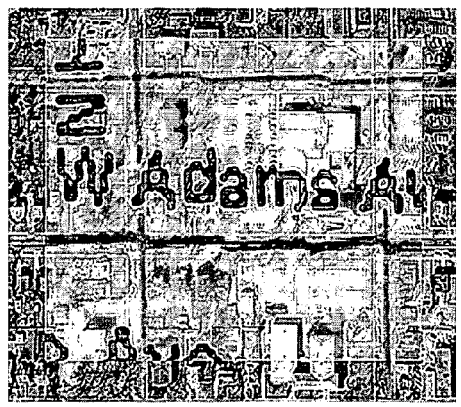

For instance, FIG. 73A depicts a conflated image for El Segundo, Calif. (test data set 1), which resulted from a MapQuest Map to imagery conflation. FIG. 73B also shows a conflated image for El Segundo, Calif., but this image resulted from TIGER Map to imagery conflation. FIG. 73C shows a conflated image for St. Louis, Mo. (test data set 2), which resulted from ESRI Map to high resolution imagery conflation. Lastly, FIG. 73D depicts a conflated image for St. Louis, Mo., which resulted from a MapQuest Map to high resolution imagery conflation.

Figure 74A:
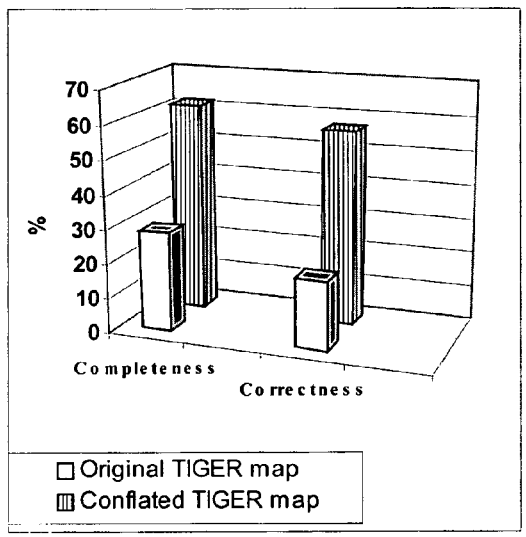
Figure 74B:
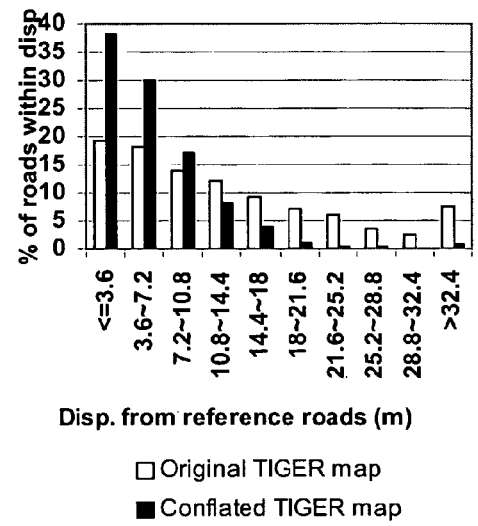

FIGS. 74A and 74B are graphs providing a quantitative analysis of the conflation results. A set of TIGER maps and imagery were randomly selected from test data set 2. The selected maps and imagery cover about 8.3% of the tested area. Furthermore, after applying GeoPPM against the tested TIGER maps and imagery, GeoPPM accurately obtained aligned control point sets (with 100% precision and 82.7% recall). Using the vectorized map roads and applying map-imagery conflation, the results were evaluated by measuring completeness, correctness, and positional accuracy against the same reference roads used in the vector-imagery conflation experiments discussed above. FIG. 74A shows that, in terms of completeness and correctness, the conflated TIGER Map was about 2.5 times better than the original TIGER Map.

TIGER maps were chosen for this evaluation for the following reasons. First, the geographic coordinates are provided by the data source. Therefore, TIGER maps may be combined with the corresponding imagery based on the provided geographic coordinates.

Second, TIGER maps do not require manually specifying (i.e., vectorizing) the streets on the TIGER maps since the road vector dataset TIGER/Lines may be utilized as the vectorized map roads. The roads on TIGER maps align well with the TIGER/Lines because they are generated from TIGER/Lines.

There are several reasons why the completeness and correctness of the conflated TIGER maps are not higher than that indicated in FIG. 74A. First, for a particular road segment, the shape of the original TIGER Map road may be inconsistent with roads in the imagery. As such, the map and image may not align well, although the intersections might be aligned using GeoPPM.

Figure 75A:
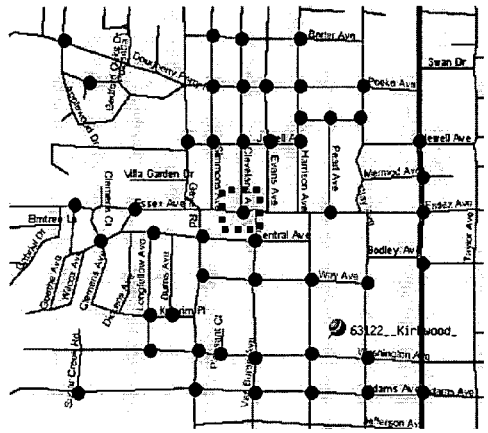
Figure 75B:
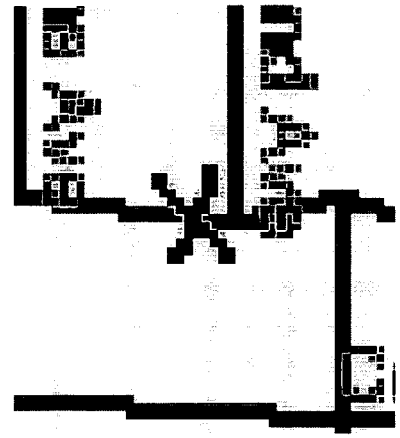

Second, an error may have occurred as a result of resizing. The TIGER Map used in the experiment had a resolution of 4.17 m/pixel, while the imagery had a resolution of 0.3 m/pixel. After finding the matched point pattern, the map was deformed and resized to align the imagery. Because of large differences in resolution for the two datasets, some errors are amplified after resizing. Consider the detected road intersection points shown on the map of FIG. 75A. The dashed lines highlight one such point. FIG. 75B is an enlarged view of the highlighted portion of FIG. 75A. The highlighted point, which is identified with an "X," is an accurately detected map point because it is two pixels away from the exact position of intersection. For this map, the error threshold was five pixels.

Figure 75C:
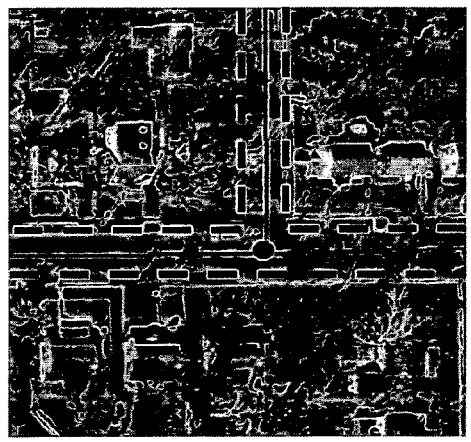
Figure 75D:
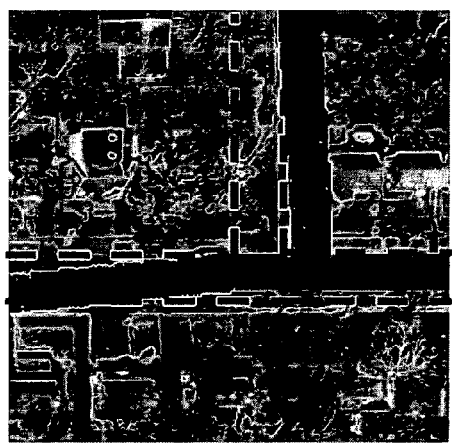

FIG. 75C depicts an image having a black circle, which represents the matched imagery point. The solid lines denote road vector data, and the dashed lines denote roadsides. The location of the matched imagery intersection point is accurately identified. However, as shown in FIG. 75D, a resizing process causes a "2 pixel" displacement, for example, to become a "30 pixel" displacement.

Third, errors may occur as a result of the vectorization process. Although the road vector TIGER/Lines align well with the map roads, there still exists a difference of a few pixels between these pixel sources. When utilizing TIGER/Lines as the map roads, and resizing to the imagery size, these small errors may be amplified.

Higher completeness/correctness measurements may also be obtained by relaxing the "buffer-width" used to measure these parameters. This kind of assessment is illustrated by the positional accuracy shown in the graph of FIG. 74B. Intuitively, "positional accuracy" corresponds to users' demands. For instance, how far is the conflated road network on the map from the centerline of the real (reference) road network. Displacements between two networks were evaluated by gradually increasing the buffer-widths constructed around the reference road network. As an example, the buffer-width was increased by 3.6 m. As shown along the X-axis of FIG. 74B, the displacement values are grouped every 3.6 m. The Y-axis of this graph shows the percentage of conflated map roads lying within the displacement range represented by the X-axis. The conflated TIGER Map did not achieve a significantly high completeness/correctness percent (as stated above). However, this map exhibited better positional accuracy since 85.2% of the conflated map roads are within 10.8 m of the reference roads, as compared to 51.7% of the original TIGER Map. Furthermore, there are very few road pixels (0.7%) which have more than 32.4 m displacement for conflated roads, as compared with 7.5% for the original map. This implies that the conflated map roads are very close to the real roads, although they might not be within the road sides (i.e., road buffer widths).

3.4.3.3 Execution Time

Finally, the running time of the conflation process will be addressed. Since the running time of the conflation process is primarily dominated by the point matching routine, the running time of the GeoPPM routine will be used as the overall execution time. The query time for retrieving online images or maps from the various sources was not included. In addition, the running time of the GeoPPM process generally relies upon the number of road intersections on the maps, not on the map size or map scale. Therefore, the running time was evaluated by gradually increasing the number of points on the imagery.

A Yahoo Map was randomly selected from test data set 2 to compare the running time for maps with known, and unknown, map scales. The selected Yahoo Map contained 57 detected points, which is similar to the average number of intersections of the tested maps. The GeoPPM process was executed against the Yahoo Map using the known map scale. This process was then repeated intentionally using the unknown map scale. In addition, a HiGrid structure was generated by recursively partitioning the imagery space into, for example, four sub-grids.

Parameter n was also adjusted using Eq. (19), which allowed performance examination of these different values. This parameter implies the average number of points in the lowest level. Hence, it controls the depth of HiGrid. Because the number of points on each tested map is relatively small as compared to the entire set of points in the imagery, only the partition of the image space needs consideration, not the entire map space.

FIGS. 76A-76C are tables providing data relating to the execution time of GeoPPM, as applied to a Yahoo Map and images of different area sizes (i.e., there are a different number of image points). FIG. 76A provides data for a first scenario in which the Yahoo Map contains 57 map points and the map scale is known. FIG. 76B provides data for a second scenario in which the Yahoo Map contains 57 map points, but the map scale is unknown. FIG. 76C provides the running time using different values for the HiGrid parameter n. Note that the running time was not collected for the brute force algorithm for several samples because of the extensive running time required by this technique.

The tables of FIGS. 76A-76C provide a number of conclusions. For example, using map scale information, GeoPPM improves overall execution time. For maps with known scale, the performance of using road directions may be better than only using map scale information.

The HiGrid structure was not utilized for maps with known map scale. However, the data indicates that similar performance was achieved for maps with unknown map scale, and which utilized the HiGrid structure. Hence, exploiting the map scale is one effective way to detect a matched point pattern.

Road direction information significantly improves the brute-force algorithm. However, it may still need to examine a large number of potential matching point pairs. Consequently, this results in long running time for datasets with a large number of points.

GeoPPM utilizing HiGrid outperforms processes which only implement road directions.

The matched point pattern may be efficiently located, without losing accuracy, using a small HiGrid parameter n (i.e., HiGrid with large depth).

This implies that the points are scattered in local areas. In addition, as shown in FIG. 76C, there is substantially no performance difference when the HiGrid parameter n has a value of 28 (half of the total map points), and when the HiGrid parameter n has a value of 57 (total map points). This is because, according to Eq. (19), both calculations result in the same HiGrid depth.

4.0 Generalized Conflation Techniques to Process Geospatial Data

As noted above, embodiments of the invention generalize the AMS-conflation process for use with a wide variety of geospatial data sources. The general premise is to exploit and augment whatever information is available about different geospatial products to determine a sufficiently accurate set of control points. Accordingly, the various conflation techniques disclosed herein may be used to conflate a combination of image, map, vector, point and elevation datasets, and the like.

By way of example, two useful types of alignments for which AMS-conflation may be utilized include point-map conflation and elevation data conflation. With regard to point-map conflation, consider the scenario of conflating a database of oil well points with a map of the oil fields, such that the sufficiently precise coordinates of the map are unknown. In this example, certain types of oil wells are shown on the map and some of these points were also in the database.

Since a set of common control point pairs is needed, the map may be analyzed using an image processor to identify the location of the oil wells on the map. Then, the GeoPPM process may be used to find the mapping between the layout (with relative distances) of two sets of points. Once the mapping is found, the database of oil wells could be used to determine the geo-coordinates of some of the points, which could in turn be used to determine the geo-coordinates of the map. Given this information, the database of oil well points can now be superimposed on the map. Now given the geo-coordinates of the maps, other layers such as road vectors could be easily integrated with these maps.

In elevation data conflation, consider the scenario of conflating high-resolution elevation data (e.g. data represented by spot heights) with lower resolution data (e.g., USGS DEM data represented by raster format). This process may be performed using GeoPPM to map two feature point sets. For each of the two elevation data sets, the highest and/or lowest points may be identified. Even though low resolution data may not include the highest or lowest points, GeoPPM may still be used because this is similar to the missing intersections in the maps. Using the points identified in each data set, the mapping between the highest/lowest points in each data set may then be obtained. Because of the difference in resolution, GeoPPM may be extended to support the mapping of points within some threshold.

Once this mapping is found, the two data sets can be conflated. The conflated dataset can show the DEM elevation surface with prominent points (e.g., highest/lowest points) annotated with higher accurate spot height data. Hence, it can be used for subsequent decision-making processes that are based on elevation information. Similarly, hydrographic data in vector format may be conflated with hydrographic data in raster format by matching the points with largest/smallest curvatures. Moreover, additional elevation information (e.g., USGS DEM) may be utilized to prune the search space since the hydrographic data usually has lower elevations.

5.0 Network Environment

Figure 77:
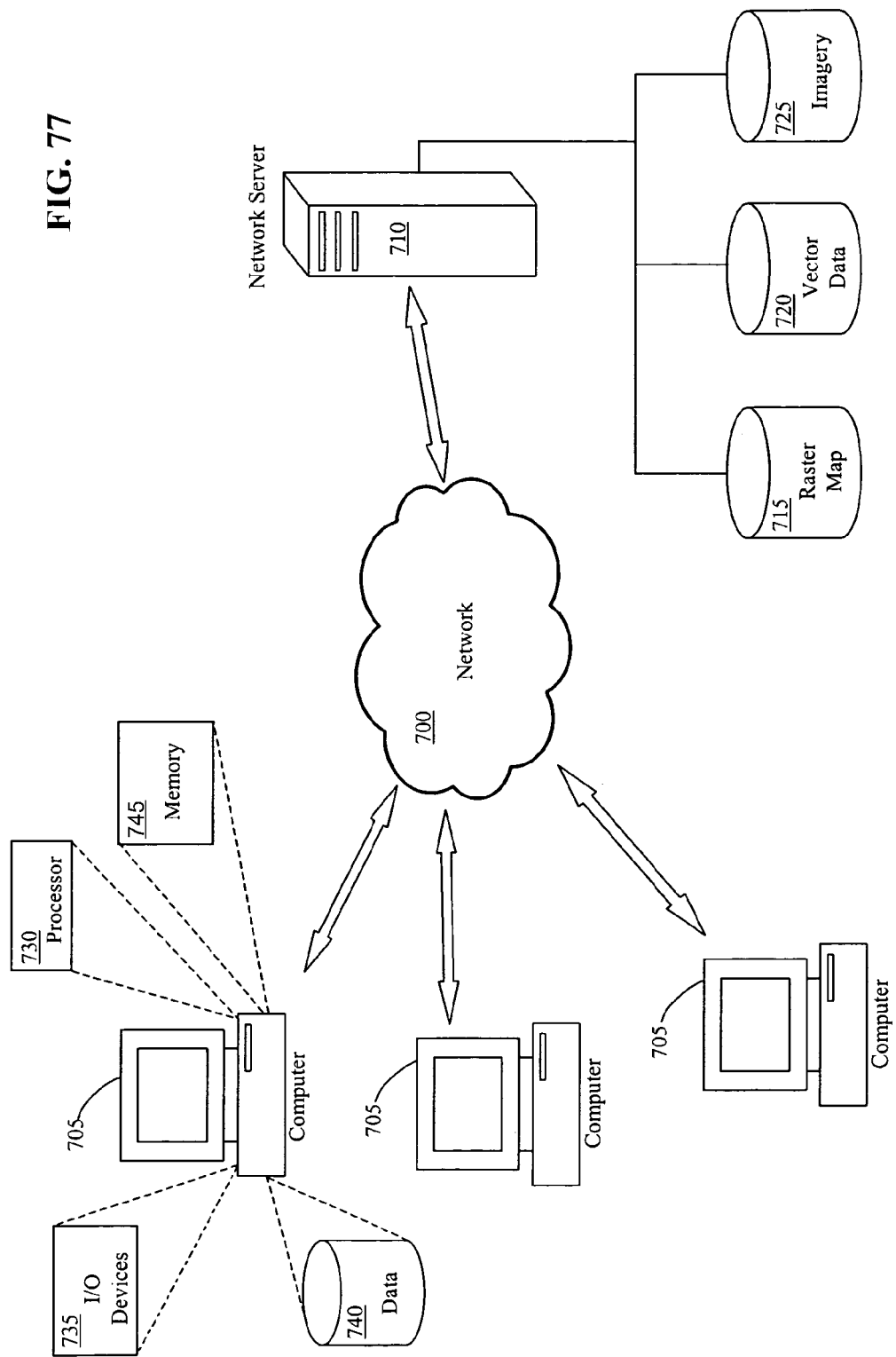

FIG. 77 depicts a representative network environment suitable for implementing the system and methods of the present invention. The illustrated environment comprises network 700 interconnecting a plurality of computers 705 with network server 710. Network 700 may be implemented using a conventional network topology such as a wide area network (WAN), metropolitan area network (MAN), local area network (LAN), virtual private network (VPN), integrated services digital network (ISDN), asynchronous transfer mode (ATM) network, or the Internet, among others.

Network server 710 is shown in communication with three separate databases 715, 720, and 725. Database 715 includes street map raster data, database 720 includes road network vector data, and database 725 includes imagery. Examples of the various data sources which may be used for databases 715, 720, and 725 have been described in the previous sections. By way of non-limiting example, street map raster data may include ESRI maps, MapQuest maps, Microsoft TerraService, Yahoo maps, TIGER/Line maps, Google maps, USGS Topographic maps (scanned), print maps such as Thomas Brothers (scanned), and the like. Examples of road network vector data include vector data provided by TIGER/Lines, NAVSTREETS, and MO-DOT, among others. Suitable sources for the imagery include Microsoft TerraService, National Map, Geography Network from Environmental Systems Research Institute (ESRI), Space Imaging, and the like.

The network server may be implemented using a commercially available network application server capable of responsively providing data to computer 705. For clarity, FIG. 77 shows three separate databases in communication with network server 710, but such an arrangement is not required. In practical applications, such data may be combined in one or two databases, distributed over a number of different databases (each providing a distinct type of data), distributed over a number of network servers, and combinations thereof.

Data communication between the components depicted in FIG. 77 may be implemented using conventional packet switched network communication protocols. Examples of such networking protocols include hypertext transport protocol (HTTP), file transport protocol (FTP), transmission control protocol/internetworking protocol (TCP/IP), Ethernet, fiber distributed data interface (FDDI), token bus or token ring networks, serial line IP (SLIP) protocols, and the like.

Other types of data network interfaces and protocols are within the scope of the present disclosure. In particular, computer 705 described below may generally be configured to transmit data to, and to receive data from, other networked components using wireless data communication techniques such as infrared (IR) or radio frequency (RF) signals, for example, or other forms of wireless communication. Accordingly, it is to be realized that network 700 may be implemented as an RF personal area network (PAN) or a wireless LAN or WAN, for instance. In that regard, various suitable wireless communication standards and protocols may be used including global system for mobile communications (GSM), code division multiple access (CDMA), time division multiple access (TDMA), IEEE 802.11 family of protocols, wireless application protocol (WAP), short message service (SMS), and the like.

It will be appreciated that the foregoing examples of networking technologies are illustrative only, and that the present disclosure is not intended to be limited with respect to the specific networking protocols or communication standards employed by any of the components illustrated and described herein.

Computers 705 may be specific or general purpose computers such as personal computers having an operating system such as DOS, Windows, OS/2, or Linux; Macintosh computers; computers having JAVA OS as the operating system; graphical workstations such as the computers of Sun Microsystems and Silicon Graphics, and other computers having some version of the UNIX operating system such as AIX or SOLARIS of Sun Microsystems; or other network-enabled computing devices, electronic apparatus, or computerized systems including, but not limited to, laptop and handheld computers, personal data assistant (PDA) devices, wireless telephones, and various types of WAP and SMS enabled devices.

FIG. 77 shows three individual computers 705 coupled to network server 710, but the invention is operable with any number of such computers. For clarity, further description of the invention will make reference to a single computer, but the disclosed principles apply equally to any of a number of computers that can be placed in communication with the necessary data (e.g., databases 715, 720, 725). Moreover, FIG. 77 shows a single network server 710 in communication with databases 715, 720, and 725, but the present invention may be implemented using multiple network servers, each containing one or more different types of data (e.g., raster maps, vector data, imagery, and the like).

In accordance with some embodiments, computer 705 may include processor 730, I/O devices 735, database 740, and memory 745. The memory supports operation of the computer and may be implemented using any suitable volatile or non-volatile memory, or both, or a storage device including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar memory or data storage means.

Input/output devices 735 which the computer may be configured with include printers, scanners, display devices such as an LCD, CRT, or plasma monitor, fax machines, digital cameras, digital video cameras, analog-to-digital devices, and the like.

In general, database 740 may be used to store data necessary to perform the various conflation processes disclosed herein. In particular, database 740 may be used to store, for example, conflated images, composite images, as well as some or all of the data provided by databases 715, 720, and 725. This configuration supports standalone operation of computer 705 such that network 700, network server 710 and associated databases, as well as any additional computers, may be omitted. Database 740 may be implemented using any of the storage devices used for memory 745.

The various methods and processes described herein may be implemented in a computer-readable medium using, for example, computer software, hardware, or some combination thereof. For a hardware implementation, the embodiments described herein may be performed by processor 730, which may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures, functions, and the like, each of which perform one or more of the functions and operations described herein. The software codes can be implemented with a software application written in any suitable programming language and may be stored in a memory unit (for example, memory 745), and executed by a processor (for example, processor 730). Computer memory may be implemented within the processor or external to the processor, in which case it can be communicatively coupled to the processor using known communication techniques. Lastly, a number of trademarks and service marks (e.g., MapQuest, Yahoo!, and Windows) have been used herein to refer to various products and services. These marks are the property of their respective owners.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims.

What is claimed is:

1. A method for automatically conflating vector data with geospatial data, said method comprising:
    identifying a first set of feature points associated with said vector data;
    identifying a second set of feature points associated with said geospatial data;
    generating control point pairs, wherein each of said control point pairs includes a distinct one of said first set of feature points and a corresponding distinct one of said second set of feature points; and
    deforming at least one of said vector data and said geospatial data to effectively align said control point pairs, wherein said second set of feature points are identified according to a method comprising:
        generating a template based upon at least one of said first set of feature points and line characteristics associated with said at least one of said first set of feature points;
        identifying geo-coordinates of said first set of feature points;
        identifying approximate locations within said geospatial data of each of said first set of feature points;
        generating a road-labeled image by identifying on-road regions of said geospatial data; and
        comparing said road-labeled image with said template to identify on-road regions in said road-labeled image which have effectively similar dimensions and angles, relative to an orientation of said vector data, as said template, said comparing resulting in said identifying of said second set of feature points.

2. The method according to claim 1, wherein said first set of feature points are identified according to a method comprising:
    identifying a plurality of line segments defined by said vector data;
    identifying a plurality candidate control points, which are each defined by an endpoint of one of said plurality of line segments; and
    determining line connectivity of each of said plurality of candidate control points, wherein if said line connectivity for a particular candidate control point exceeds a threshold, then said particular candidate control point is identified as one of said first set of feature points.

3. The method according to claim 2, wherein said threshold is exceeded whenever more than two line segments of said plurality of line segments share common candidate control points of said plurality of candidate control points.

4. The method according to claim 1, wherein said line characteristics comprise line width of a line segment associated with said at least one of said first set of feature points.

5. The method according to claim 1, wherein said line characteristics comprise line angle of a line segment associated with said at least one of said first set of feature points, wherein said line angle is defined by the angle of said line segment relative to an orientation of said vector data.

6. The method according to claim 1, wherein said generating control point pairs comprises: filtering inaccurate control point pairs from said control point pairs, each of said inaccurate control point pairs including a feature point of said second set of feature points that is located on said geospatial data that exceeds a threshold distance and angle relative to an actual location on said geospatial data.

7. The method according to claim 1, said method further comprising: generating a plurality of control point vectors, each of said plurality of control point vectors being defined by a relative position of a distinct one of said first set of feature points and a corresponding distinct one of said second set of feature points;
  generating a vector median for said plurality of control point vectors;
  associating each of said control point pairs with corresponding control point vectors of said plurality of control point vectors; and
  filtering inaccurate control point pairs from said control point pairs, each of said inaccurate control point pairs having a corresponding control point vector which exceeds a threshold difference in direction and magnitude relative to said vector median.

8. The method according to claim 1, said method further comprising:
  (a) generating a plurality of control point vectors which are individually associated with a particular one of said control point pairs, wherein each of said plurality of control point vectors comprises a tail point defined by a distinct one of said first set of feature points and a head point defined by a corresponding distinction one of said second set of feature points;
  (b) calculating a number of said tail points of said plurality of control point vectors that are located within a predetermined distance relative to a particular head point associated with a particular one of said plurality of control point vectors, wherein if said number falls below a certain threshold, then a control point pair that is associated with said particular one of said plurality of control point vectors is identified as an inaccurate control point pair;
  (c) filtering said inaccurate control point pair from said control point pairs; and
  (d) repeating said calculating operation (b) and said filtering operation (c) for each tail point of said plurality of control point vectors.

9. The method according to claim 1, wherein said deforming includes rubber sheeting at least one of said vector data and said geospatial data to effectively align said control point pairs.

10. The method according to claim 1, said method further comprising:
  obtaining said vector data from a vector data source; and
  obtaining said geospatial data from a geospatial data source.

11. The method according to claim 1, wherein said deforming deforms said vector data to effectively align said control point pairs.

12. The method according to claim 1, wherein said deforming deforms said geospatial data to effectively align said control point pairs.

13. The method according to claim 1, wherein said deforming deforms both said vector data and said geospatial data to effectively align said control point pairs.

14. The method according to claim 1, wherein said vector data comprises road network vector data.

15. The method according to claim 1, wherein said geospatial data comprises orthoimagery.

16. The method according to claim 1, said method further comprising: creating image-aligned vector data based upon said deforming.

17. The method according to claim 16, said method further comprising: generating a composite image comprising said geospatial data and said image aligned vector data.

18. The method according to claim 16, said method further comprising: generating a composite image labeled with attribute data associated with said image-aligned vector data.

19. The method according to claim 1, said method further comprising: finding geo-coordinates and scale of said vector data.

20. The method according to claim 1, wherein said geospatial data comprises vector data.

21. The method according to claim 1, wherein said geospatial data comprises georeferenced imagery.

22. The method according to claim 1, wherein said geospatial data comprises a raster map.

23. The method according to claim 1, wherein each of said first set of feature points comprises a distinct road intersection, and wherein each of said second set of feature points comprises a distinct road intersection.

24. The method according to claim 1, wherein each of said first set of feature points comprises a distinct railroad intersection, and wherein each of said second set of feature points comprises a distinct railroad intersection.

25. The method according to claim 1, wherein each of said first set of feature points comprises a distinct river intersection, and wherein each of said second set of feature points comprises a distinct river intersection.

26. A non-transitory computer-readable storage medium containing instructions for controlling a computer for conflating vector data with geospatial data according to a method comprising:
  identifying a first set of feature points associated with said vector data;
  identifying a second set of feature points associated with said geospatial data;
  generating control point pairs, wherein each of said control point pairs includes a distinct one of said first set of feature points and a corresponding distinct one of said second set of feature points;
  deforming at least one of said vector data and said geospatial data to effectively align said control point pairs;
  generating a plurality of control point vectors, each of said plurality of control point vectors being defined by a relative position of a distinct one of said first set of feature points and a corresponding distinct one of said second set of feature points;
  generating a vector median for said plurality of control point vectors;
  associating each of said control point pairs with corresponding control point vectors of said plurality of control point vectors; and
  filtering inaccurate control point pairs from said control point pairs, each of said inaccurate control point pairs having a corresponding control point vector which exceeds a threshold difference in direction and magnitude relative to said vector median.

27. A system for conflating vector data with geospatial data, said system comprising:
  means for identifying a first set of feature points associated with said vector data;
  means for identifying a second set of feature points associated with said geospatial data;

means for generating control point pairs, wherein each of said control point pairs includes a distinct one of said first set of feature points and a corresponding distinct one of said second set of feature points;

means for deforming at least one of said vector data and said geospatial data to effectively align said control point pairs;

means for generating a plurality of control point vectors which are individually associated with a particular one of said control point pairs, wherein each of said plurality of control point vectors comprises a tail point defined by a distinct one of said first set of feature points and a head point defined by a corresponding distinction one of said second set of feature points;

means for calculating a number of said tail points of said plurality of control point vectors that are located within a predetermined distance relative to a particular head point associated with a particular one of said plurality of control point vectors, wherein if said number falls below a certain threshold, then a control point pair that is associated with said particular one of said plurality of control point vectors is identified as an inaccurate control point pair;

means for filtering said inaccurate control point pair from said control point pairs; and means for repeating said calculating operation (b) and said filtering operation (c) for each tail point of said plurality of control point vectors.

28. A method for automatically conflating vector data with geospatial data, said method comprising:

identifying a first set of feature points associated with said vector data;

identifying a second set of feature points associated with said geospatial data;

generating control point pairs, wherein each of said control point pairs includes a distinct one of said first set of feature points and a corresponding distinct one of said second set of feature points; and deforming at least one of said vector data and said geospatial data to effectively align said control point pairs, said second set of feature points being identified according to a method comprising:

generating a template based upon at least one of said first set of feature points and line characteristics associated with said at least one of said first set of feature points;

identifying geo-coordinates of said first set of feature points;

identifying approximate locations within said geospatial data of each of said first set of feature points;

generating a road-labeled image by identifying on-road regions of said geospatial data; and comparing said road-labeled image with said template to identify on-road regions in said road-labeled image which have effectively similar dimensions and angles, relative to an orientation of said vector data, as said template, said comparing resulting in said identifying of said second set of feature points, said identifying of said on-road regions of said geospatial data being accomplished by a method comprising:

computing a hue value for a plurality of locations on said geospatial data; and for each of said plurality of locations, comparing said hue value with previously calculated hue values obtained from representative geospatial data, comprising on-road and off-road regions, to generate a probability that a particular location of said plurality of locations is either on-road or off-road, said on-road regions of said geospatial data being defined by said plurality of locations on said geospatial data which meet a certain threshold of said probability.

29. A method for automatically conflating vector data with geospatial data, said method comprising:

identifying a first set of feature points associated with said vector data;

identifying a second set of feature points associated with said geospatial data;

generating control point pairs, wherein each of said control point pairs includes a distinct one of said first set of feature points and a corresponding distinct one of said second set of feature points; and deforming at least one of said vector data and said geospatial data to effectively align said control point pairs, said second set of feature points being identified according to a method comprising:

generating a template based upon at least one of said first set of feature points and line characteristics associated with said at least one of said first set of feature points;

identifying geo-coordinates of said first set of feature points;

identifying approximate locations within said geospatial data of each of said first set of feature points;

generating a road-labeled image by identifying on-road regions of said geospatial data; and comparing said road-labeled image with said template to identify on-road regions in said road-labeled image which have effectively similar dimensions and angles, relative to an orientation of said vector data, as said template, said comparing resulting in said identifying of said second set of feature points said identifying of said on-road regions of said geospatial data being accomplished by a method comprising:

computing a saturation density for a plurality of locations on said geospatial data; and for each of said plurality of locations, comparing said saturation density with previously calculated saturation densities obtained from representative geospatial data, comprising on-road and off-road regions, to generate a probability that a particular location of said plurality of locations is either on-road or off-road, said on-road regions of said geospatial data being defined by said plurality of locations on said geospatial data which meet a certain threshold of said probability.

30. The method according to claim 29, wherein said method for identifying said on-road regions of said geospatial data further comprises:

computing a hue value for a plurality of locations on said geospatial data;

for each of said plurality of locations, comparing said hue value with previously calculated hue values obtained from representative geospatial data, comprising on-road and off-road regions, to generate a probability that a particular location of said plurality of locations is either on-road or off-road.

* * * * *